(12) United States Patent
Cheng et al.

(10) Patent No.: US 11,672,050 B2
(45) Date of Patent: Jun. 6, 2023

(54) CONFIGURABLE COOKING SYSTEMS AND METHODS

(71) Applicant: Brava Home, Inc., Redwood City, CA (US)

(72) Inventors: Shih-Yu Cheng, Union City, CA (US); Mark Janoff, Redwood City, CA (US); Richard Metzler, San Antonio, TX (US); John Pleasants, Portolla Valley, CA (US); Dan Yue, Palo Alto, CA (US); Taylor Adams, San Francisco, CA (US); Dennis Denker, Scottsdale, AZ (US)

(73) Assignee: Brava Home, Inc., Redwood City, CA (US)

( * ) Notice: Subject to any disclaimer, the term of this patent is extended or adjusted under 35 U.S.C. 154(b) by 284 days.

(21) Appl. No.: 16/102,683

(22) Filed: Aug. 13, 2018

(65) Prior Publication Data

US 2019/0053332 A1    Feb. 14, 2019

Related U.S. Application Data

(63) Continuation of application No. PCT/US2018/046400, filed on Aug. 11, 2018.
(Continued)

(51) Int. Cl.
*H05B 3/00* (2006.01)
*H05B 6/66* (2006.01)
(Continued)

(52) U.S. Cl.
CPC .......... *H05B 3/0076* (2013.01); *F24C 7/046* (2013.01); *F24C 7/085* (2013.01); *H05B 6/645* (2013.01);
(Continued)

(58) Field of Classification Search
CPC .... H05B 3/0076; H05B 6/6435; H05B 6/645; H05B 6/668; H05B 6/6417; H05B 6/6441;
(Continued)

(56) References Cited

U.S. PATENT DOCUMENTS 3,407,285 A  10/1968 Jacobs
4,117,294 A   9/1978 Appelquist et al.
(Continued)

FOREIGN PATENT DOCUMENTS

CN      1811277 A    8/2006
CN      1942711 A    4/2007
(Continued)

OTHER PUBLICATIONS

Office Action dated Dec. 15, 2021 from corresponding Chinese application No. 201880065581.3, 30 pages.

*Primary Examiner* — Jimmy Chou
(74) *Attorney, Agent, or Firm* — Haynes and Boone, LLP

(57) ABSTRACT

Systems and methods for user configurable cooking appliances include receiving system resources having associated budgets, facilitating user allocation the system resources to a plurality of heating elements without exceeding the associate budgets, applying the system resources to the heating elements to heat one or more food substances within a cooking chamber, and selectively regulating delivery of the system resources to the heating elements such that no more than the associated budget of each of the system resources is delivered to the heating elements. Computing components can execute a heating algorithm to cook at least one food substance in the cooking chamber, detect a state change of the food substance, and modify the heating algorithm to reconfigure the system resources supplied to the heating elements in response to the state change and in accordance
(Continued)

with user configured allocation and associated budgets for the system resources.

26 Claims, 29 Drawing Sheets

Related U.S. Application Data

(60) Provisional application No. 62/695,813, filed on Jul. 9, 2018, provisional application No. 62/643,729, filed on Mar. 15, 2018, provisional application No. 62/544,757, filed on Aug. 11, 2017.

(51) Int. Cl.
| | |
|---|---|
| *H05B 6/64* | (2006.01) |
| *F24C 7/04* | (2021.01) |
| *F24C 7/08* | (2006.01) |
| F24C 7/06 | (2006.01) |
| F24C 15/16 | (2006.01) |
| F24C 15/22 | (2006.01) |
| H04L 67/125 | (2022.01) |
| H04N 7/18 | (2006.01) |
| H04W 88/06 | (2009.01) |

(52) U.S. Cl.
CPC ........... *H05B 6/6435* (2013.01); *H05B 6/668* (2013.01); *F24C 7/065* (2013.01); *F24C 15/16* (2013.01); *F24C 15/22* (2013.01); *H04L 67/125* (2013.01); *H04N 7/183* (2013.01); *H04W 88/06* (2013.01); *H05B 6/6417* (2013.01); *H05B 6/6441* (2013.01); *H05B 6/6452* (2013.01); *H05B 6/6455* (2013.01); *H05B 6/6482* (2013.01)

(58) Field of Classification Search
CPC .. H05B 6/6452; H05B 6/6455; H05B 6/6482; F24C 7/046; F24C 7/085; F24C 7/065; F24C 15/16; F24C 15/22; H04L 67/125; H04N 7/183; H04W 88/06
USPC ........ 219/441, 702, 622, 393, 411, 506, 341
See application file for complete search history.

(56) References Cited

U.S. PATENT DOCUMENTS

| | | | | |
|---|---|---|---|---|
| 4,298,780 | A * | 11/1981 | Suzuki | H05B 6/6482 |
| | | | | 219/685 |
| 4,335,293 | A | 6/1982 | Kobayashi et al. | |
| 4,410,795 | A * | 10/1983 | Ueda | G05D 23/1917 |
| | | | | 345/44 |
| 4,473,732 | A | 9/1984 | Payne | |
| 4,475,024 | A | 10/1984 | Tateda | |
| 4,771,154 | A | 9/1988 | Bell et al. | |
| 4,800,090 | A | 1/1989 | August | |
| 5,349,163 | A | 9/1994 | An | |
| 5,517,005 | A * | 5/1996 | Westerberg | A47J 37/0635 |
| | | | | 219/685 |
| 5,665,259 | A | 9/1997 | Westerberg | |
| 5,990,454 | A | 11/1999 | Westerberg et al. | |
| 6,011,242 | A | 1/2000 | Westerberg | |
| 6,013,900 | A | 1/2000 | Westerberg et al. | |
| 6,069,345 | A | 5/2000 | Westerberg | |
| 6,205,910 | B1 * | 3/2001 | Vaughn | A47J 37/08 |
| | | | | 219/521 |
| 6,232,582 | B1 * | 5/2001 | Minnear | H05B 1/0263 |
| | | | | 219/481 |
| 6,302,095 | B1 | 10/2001 | Tolley et al. | |
| 6,355,914 | B1 * | 3/2002 | Stockley | H05B 3/0076 |
| | | | | 219/482 |
| 6,417,494 | B1 | 7/2002 | Westerberg et al. | |
| 6,843,207 | B2 | 1/2005 | Kanzaki et al. | |
| 6,940,050 | B2 * | 9/2005 | Probst | H05B 1/0225 |
| | | | | 219/205 |
| 7,022,949 | B2 | 4/2006 | Shukla | |
| 7,075,442 | B2 | 7/2006 | Lion et al. | |
| 7,252,402 | B2 * | 8/2007 | Gotz | F24C 15/008 |
| | | | | 362/89 |
| 7,323,663 | B2 | 1/2008 | Cavada et al. | |
| 7,481,153 | B2 * | 1/2009 | Barnes | A47J 37/0821 |
| | | | | 219/521 |
| 7,619,186 | B2 | 11/2009 | Cavada et al. | |
| 7,683,292 | B2 | 3/2010 | Cavada et al. | |
| 8,003,923 | B2 * | 8/2011 | Wilsdorf | F24C 15/024 |
| | | | | 219/508 |
| 8,200,548 | B2 * | 6/2012 | Wiedl | G06Q 30/02 |
| | | | | 705/26.5 |
| 8,563,059 | B2 * | 10/2013 | Luckhardt | F24C 7/08 |
| | | | | 426/523 |
| 8,791,398 | B2 | 7/2014 | De la Cuerda Ortin et al. | |
| 8,929,724 | B1 | 1/2015 | Mograbi | |
| 9,291,528 | B2 | 3/2016 | Galindo et al. | |
| 9,414,444 | B2 | 8/2016 | Libman et al. | |
| 9,460,633 | B2 | 10/2016 | Minvielle | |
| 9,528,972 | B2 | 12/2016 | Minvielle | |
| 9,644,847 | B2 * | 5/2017 | Bhogal | H04W 4/80 |
| 9,927,129 | B2 | 3/2018 | Bhogal et al. | |
| 10,506,671 | B2 * | 12/2019 | Corona | H05B 6/687 |
| 2002/0171674 | A1 | 11/2002 | Paris | |
| 2005/0173400 | A1 | 8/2005 | Cavada et al. | |
| 2006/0289436 | A1 | 12/2006 | Carbone et al. | |
| 2007/0084852 | A1 * | 4/2007 | Shukla | H05B 3/68 |
| | | | | 219/445.1 |
| 2007/0246453 | A1 * | 10/2007 | Nam | F24C 3/126 |
| | | | | 219/413 |
| 2008/0259995 | A1 | 10/2008 | Kuhn | |
| 2009/0034944 | A1 | 2/2009 | Burtea et al. | |
| 2009/0102083 | A1 | 4/2009 | Cochran et al. | |
| 2009/0272814 | A1 | 11/2009 | Granhed et al. | |
| 2010/0133254 | A1 * | 6/2010 | Lehman | A47J 37/0629 |
| | | | | 219/386 |
| 2010/0155392 | A1 * | 6/2010 | Nordh | H05B 6/68 |
| | | | | 219/702 |
| 2010/0178407 | A1 * | 7/2010 | Rizzuto | A21B 3/04 |
| | | | | 426/510 |
| 2010/0186600 | A1 * | 7/2010 | Lewis | A47J 36/32 |
| | | | | 99/327 |
| 2010/0199857 | A1 | 8/2010 | Storiz et al. | |
| 2011/0002675 | A1 | 1/2011 | Cochran et al. | |
| 2011/0002677 | A1 | 1/2011 | Cochran et al. | |
| 2011/0114627 | A1 * | 5/2011 | Burt | F24C 7/087 |
| | | | | 219/396 |
| 2011/0114633 | A1 | 5/2011 | Niklasson et al. | |
| 2011/0260831 | A1 * | 10/2011 | Ieda | B60R 25/246 |
| | | | | 340/5.64 |
| 2012/0051721 | A1 | 3/2012 | Gaertner et al. | |
| 2012/0063753 | A1 | 3/2012 | Cochran et al. | |
| 2012/0097667 | A1 * | 4/2012 | Niklasson | H05B 6/682 |
| | | | | 219/702 |
| 2012/0180775 | A1 | 7/2012 | Waltz et al. | |
| 2013/0092032 | A1 * | 4/2013 | Cafferty | F24C 7/08 |
| | | | | 99/325 |
| 2013/0186887 | A1 * | 7/2013 | Hallgren | H05B 6/686 |
| | | | | 219/702 |
| 2013/0202754 | A1 | 8/2013 | Cochran et al. | |
| 2013/0306627 | A1 * | 11/2013 | Libman | H05B 6/705 |
| | | | | 219/709 |
| 2014/0041530 | A1 * | 2/2014 | Luckhardt | H05B 1/0263 |
| | | | | 99/333 |
| 2014/0203012 | A1 * | 7/2014 | Corona | A23L 5/15 |
| | | | | 219/704 |
| 2014/0231418 | A1 * | 8/2014 | Ikeda | H05B 6/6447 |
| | | | | 219/709 |
| 2015/0040774 | A1 * | 2/2015 | Fung | A47J 37/0635 |
| | | | | 99/337 |
| 2015/0056344 | A1 * | 2/2015 | Luckhardt | F24C 7/081 |
| | | | | 426/233 |

(56) References Cited

U.S. PATENT DOCUMENTS

| | | | |
|---|---|---|---|
| 2015/0285512 A1* | 10/2015 | Matarazzi | H04N 1/00045 99/341 |
| 2015/0285513 A1* | 10/2015 | Matarazzi | F24C 15/00 99/342 |
| 2015/0289324 A1* | 10/2015 | Rober | H05B 6/668 219/707 |
| 2015/0330640 A1* | 11/2015 | Stork genannt Wersborg | G01J 5/0044 99/332 |
| 2015/0334354 A1* | 11/2015 | Uken | B60R 1/04 348/148 |
| 2016/0029829 A1* | 2/2016 | Klein | A47J 37/0641 99/332 |
| 2016/0033140 A1 | 2/2016 | Weaver, Jr. et al. | |
| 2016/0033141 A1* | 2/2016 | Rizzuto | F24C 15/327 219/396 |
| 2016/0082896 A1* | 3/2016 | Mouser | H04N 7/183 348/148 |
| 2016/0100461 A1* | 4/2016 | Park | H05B 6/1272 219/662 |
| 2016/0119514 A1* | 4/2016 | Sugimura | B60R 25/305 348/148 |
| 2016/0196109 A1* | 7/2016 | Wait | H05B 6/062 219/445.1 |
| 2016/0327279 A1 | 11/2016 | Bhogal et al. | |
| 2016/0348918 A1 | 12/2016 | Bhogal et al. | |
| 2016/0366314 A1* | 12/2016 | Pfaffinger, Jr. | F24C 15/04 |
| 2017/0000292 A1* | 1/2017 | Park | H04N 5/2257 |
| 2017/0055535 A1* | 3/2017 | Froelicher | A21B 1/00 |
| 2017/0074522 A1 | 3/2017 | Cheng | |
| 2017/0099988 A1 | 4/2017 | Matloubian et al. | |
| 2017/0115008 A1* | 4/2017 | Erbe | F24C 7/085 |
| 2017/0208652 A1* | 7/2017 | Luckhardt | F24C 7/085 |
| 2017/0211819 A1 | 7/2017 | McKee et al. | |
| 2017/0215233 A1 | 7/2017 | Katz et al. | |
| 2017/0223774 A1* | 8/2017 | Cheng | F24C 15/22 |
| 2017/0261213 A1* | 9/2017 | Park | H04N 5/2257 |
| 2018/0020679 A1* | 1/2018 | Froelicher | A21B 1/40 219/392 |
| 2018/0216830 A1* | 8/2018 | Ivanovic | F24C 7/085 |
| 2019/0053332 A1* | 2/2019 | Cheng | A47J 36/321 |
| 2019/0200797 A1* | 7/2019 | Diao | A47J 27/00 |
| 2019/0234617 A1* | 8/2019 | Bhogal | A23L 5/15 |

FOREIGN PATENT DOCUMENTS

| | | |
|---|---|---|
| CN | 101398197 | 4/2009 |
| EP | 1740018 | 1/2007 |
| EP | 2515044 | 10/2012 |
| RU | 2006102663 | 8/2007 |
| RU | 2007111953 | 10/2008 |
| RU | 2008111110 | 9/2009 |
| RU | 110892 | 11/2011 |
| WO | WO 98/30941 | 7/1998 |
| WO | WO 2014/086487 | 6/2014 |
| WO | WO 2017/044876 | 3/2017 |

* cited by examiner

FIG. 4E

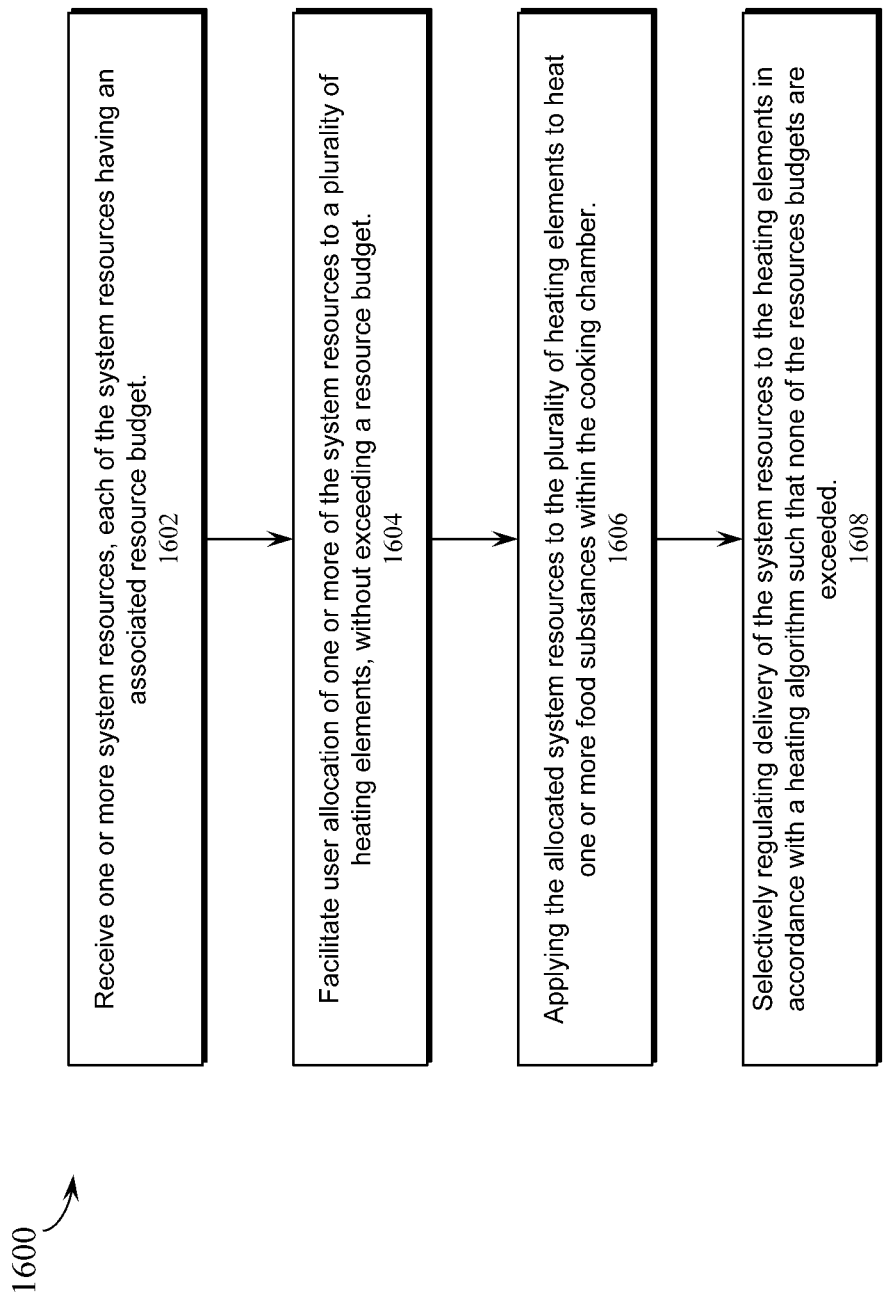

CONFIGURABLE COOKING SYSTEMS AND METHODS

CROSS-REFERENCE TO RELATED APPLICATIONS

The present application is a continuation of International Patent Application No. PCT/US2018/046400, entitled "CONFIGURABLE COOKING SYSTEMS AND METHODS," filed Aug. 11, 2018, which claims priority to and the benefit of U.S. Provisional Patent Application No. 62/544,757, entitled "CONFIGURABLE COOKING SYSTEMS AND METHODS," filed Aug. 11, 2017; U.S. Provisional Patent Application No. 62/643,729, entitled "CONFIGURABLE COOKING SYSTEMS AND METHODS," filed Mar. 15, 2018; and U.S. Provisional Patent Application No. 62/695,813, entitled "CONFIGURABLE COOKING SYSTEMS AND METHODS," filed Jul. 9, 2018; each of which is incorporated by reference herein in its entirety.

The present application claims priority to and the benefit of U.S. Provisional Patent Application No. 62/544,757, entitled "CONFIGURABLE COOKING SYSTEMS AND METHODS," filed Aug. 11, 2017; U.S. Provisional Patent Application No. 62/643,729, entitled "CONFIGURABLE COOKING SYSTEMS AND METHODS," filed Mar. 15, 2018; and U.S. Provisional Patent Application No. 62/695,813, entitled "CONFIGURABLE COOKING SYSTEMS AND METHODS," filed Jul. 9, 2018; each of which is incorporated by reference herein in its entirety.

This application is related to U.S. patent application Ser. No. 15/490,768, entitled "VARIABLE PEAK WAVELENGTH COOKING INSTRUMENT WITH SUPPORT TRAY," filed Apr. 18, 2017, which is incorporated by reference herein in its entirety.

TECHNICAL FIELD

Various embodiments relate to cooking systems, such as ovens.

BACKGROUND

The art of cooking remains an "art" at least partially because of the food industry's inability to help cooks to produce systematically award worthy dishes. To make a full course meal, a cook often has to use multiple cooking appliances, understand the heating patterns of the cooking appliances, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be easily produced systematically using conventional cooking appliances. The industry has yet to create an intelligent cooking system capable of automatically and consistently producing complex meals with precision, speed, and lack of skilled human intervention.

BRIEF DESCRIPTION OF THE DRAWINGS

FIGS. 4B-G are example user interface screenshots for an adaptive cooking appliance, in accordance with various embodiments.

FIG. 16 is a flow diagram illustrating a resource allocation method, in accordance with various embodiments.

Figure 1:
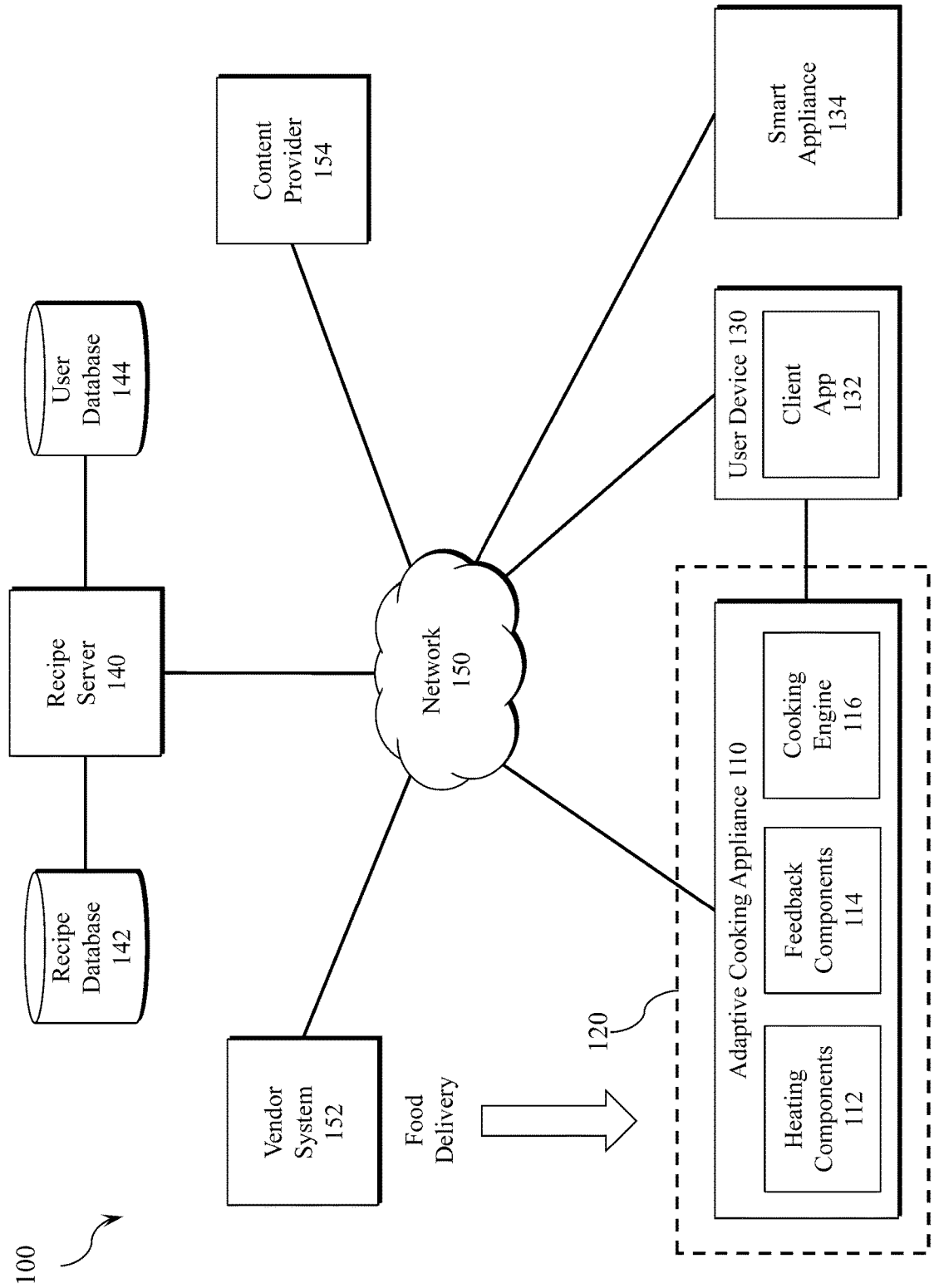
FIG. 1 is a block diagram illustrating an adaptive cooking system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments disclose an adaptive cooking appliance (e.g., an oven, enclosed cooking chamber or otherwise) having one or more heating elements controlled by a computing system (e.g., one or more of a computer processing unit (CPU), a controller, application specific integrated circuit (ASIC), or other components enabling system control). The computing system controls the operation of the adaptive cooking appliance, including the peak emission wavelength of the heating elements. The computing system can implement an interactive user interface to control or assist a user in controlling the adaptive cooking appliance. The computing system can also adapt the operation of the adaptive cooking appliance in accordance with manual user input, user preferences and/or learned user behavior. For example, the interactive user interface can be implemented on a touchscreen of the cooking appliance or a user device in communication with the adaptive cooking appliance that is linked to user-specific information stored in an associated user account. In various embodiments, the adaptive cooking appliance operates within a larger ecosystem linking the user with meal kit providers, grocery stores, a user community, professional chef recommendations and other services and functionality.

In various embodiments, the adaptive cooking appliance can instantiate and execute a heat adjustment algorithm (e.g., also referred to as "heating logic" or "heating algorithm") for implementing a recipe. The heat adjustment algorithm may include a set of instructions for configuring and controlling the operation of the cooking appliance adapted to the user information. In some embodiments, the adaptive cooking appliance can directly emulate one or more types of conventional cooking devices (e.g., an oven, a barbecue, a range, a microwave, a smoker, or any combination thereof). In some embodiments, the adaptive cooking appliance can download or receive (e.g., directly or indirectly) one or more recipes from a computer server system, including cooking logic for implementing the recipe on the cooking appliance.

The computer server system can include a recipe design interface allowing the creation of recipes and the generation of cooking logic for the cooking appliance, including directly specifying how the heating elements should operate to cook the edible substance given one or more system resources (e.g., total power budget, current budget, and total energy budget). For example, the recipe design interface can simulate time series plot of temperature gradients of different food profiles (e.g., corresponding to different edible substance). The recipe design interface can configure an emulation of a conventional cooking device and translate that into a set of heating element configuration parameters for the adaptive cooking appliance. In another example, the recipe design interface can specify temperature, duration, intended cooking appliance emulation type (e.g., direct food roasting, impingement convection cooking, heated tray cooking, searing, etc.), expected user intervention (e.g., flipping the food or adding sauce or spices), operational modes (e.g., low stress mode vs. high speed mode), desired end states of the food (e.g., rare, medium, well-done for meat), or any combination thereof.

Referring to FIG. 1, an exemplary adaptive cooking system 100 will be described. An adaptive cooking appliance 110 includes heating components 112, feedback components 114 and an adaptive cooking engine 116. The heating components 112 include controllable heating elements, such as heated filaments. In various embodiments, the feedback components 114 include one or more cameras, probes and sensors providing real-time feedback during the cooking process. The cooking engine 116 executes cooking logic to adaptively control the cooking of an edible substance, such as food, in accordance with a recipe and information received from the feedback components.

The adaptive cooking appliance 110 is operated at a location 120, such as a user residence. In various embodiments, a user device 130, smart appliance 134 and other system components may be operated at location 120 or distributed across two or more locations, allowing for remote operation of the cooking appliance (e.g., from a user's car) through the network 150. The user device 130 includes a client application 132 for interfacing with the adaptive cooking appliance 110 and a recipe server 140. In various embodiments, the user device 130 may include a mobile device such a mobile phone, tablet or laptop computer, a desktop computer or other computing device adapted to communicate with the adaptive cooking appliance 110 and/or recipe server 140 as described herein. In some embodiments, a smart appliance 134, such as a refrigerator, may provide information to various system components concerning ingredients available for various recipes. In operation, the adaptive cooking appliance 110 may receive a recipe through a user interface of the cooking appliance, the client app 132 on the user device 130, the recipe server 140, or through another device. The cooking engine 116 implements corresponding cooking logic for controlling the heating components 112, while monitoring the feedback components 114 to adaptively control the cooking process.

The adaptive cooking appliance 110 and user device 130 may connect to the recipe server 140 through a network 150, such as the Internet. In one embodiment, the recipe server 140 is connected to a recipe database 142, which stores data associated with recipes and cooking logic for implementation by the adaptive cooking appliance 110, a user database 144, which stores user-specific information, such as favorite recipes, end-user generated recipes, user-specified preferences (e.g., a user may consider "medium rare" to be a few degrees higher than a standard definition), learned user behavior and other user-specific content. In various embodiments, user-specific information stored in the user database 144 includes information learned from the user's behavior. For example, the user database 144 may store information, based on other meals the user has cooked, that the user is likely to want vegetables to be extra crispy. The user database 144 may also store information that the user has a tendency to measure food height 10% lower than actual height, and/or tends to improperly insert a probe into proteins in a particular way. This user-specific information can be used, for example, by the cooking appliance to adapt the cooking logic to the address the user's deviations from the recipe.

In various embodiments, the recipe database 142 stores one or more recipes, food characteristics, heating algorithms, sensor data, cooking logic or other related information. In various embodiments, the recipe server 140 provides cloud-based recipe storage and access. In some embodiments, the user device 130 can be connected to the cooking appliance 110 via a wireless network, local area network, a peer to peer connection (e.g., Bluetooth), or another communications protocol.

In various embodiments, the user database 144 stores information for users of the adaptive cooking system, which may include user preferences, stored recipes, an identification of adaptive cooking appliances 110 associated with the user, learned user behavior, subscription information defining access rights based on paid subscription levels, and/or other user-specific information. In one embodiment, a user may pay for a subscription which provides the user with access to the newest recipes, meal kits, integrated grocery services through one or more vendors 152, specialized content (such as special cooking shows, or live social media events), early access to content, special functionality, discounts and a white-glove service. In one embodiment, a vendor system 152 is connected to the recipe server 140 through the network 150. A user operating the adaptive cooking appliance 110, a user device 130, or other networked device, may access content on the recipe server 140, including recipes and an online shopping option to purchase corresponding meal kits (e.g., an aggregation of prepared ingredients, cooking supplies and/or instructions for preparing a meal in accordance with a user skill level or preference), pre-prepped foods (e.g., uncooked food that has been prepared ready for oven cooking), ingredients, supplies, etc., from the vendor for delivery to the user location 120 or another specified location. Meal kits and pre-pepped foods may also be purchased from brick-and-mortar grocery stores with systems links to the cooking appliance and/or user account. In one or more embodiments, the cooking appliance may be tied into a shopping option to recommend certain meal kits and other items. In one embodiment, when the meal kits or ingredients are delivered, the vendor system 152 may notify the recipe server 140, adaptive cooking appliance 110 or user device 130 that the delivery has arrived, and the recipe server 140 (or vendor system 152, user device 130 or other system device) transmits the recipe and associated cooking logic to the adaptive cooking appliance 110, allowing the user to cook the delivered meal kits or ingredients in accordance with the corresponding recipe.

In various embodiments, the system 100 may also include a content provider 154 providing food-related content to the user, such as food-related videos, cooking instructions, online articles, social media, recipes and other information associate with food. The content provider 154 may include a link in the online content to the recipe server 140 and vendor system 152, allowing the user to access a recipe associated with the content, and purchase associated ingredients or meal kits for delivery. In some embodiments, instructional videos can be provided during meal preparation to provide guidance to the user on meal preparation (e.g., how to measure food height, how to insert the probe). The user can be prompted to watch an instructional video based on a determination (e.g., based on user-specific information stored in the user database) that the instruction would help the user.

In various embodiments, the recipe server 140 provides various recipe browsing, selection and configuration options. For example, the recipe server 140 may recommend recipes based on available ingredients identified by the user or tracked by the system 100 (and based on user history and usage statistics) such as through a smart appliance 134 or based on an order history from a vendor system 152. The user may also manually enter a recipe to the recipe server 140 through the client application 132. In various embodiments, the recipe server 140 and/or adaptive cooking appliance 110 are configured to convert the recipe to oven-specific cooking instructions, including optimized food preparation instructions for the user and cooking logic for controlling the adaptive cooking appliance 110. In one embodiment, the recipe and cooking logic may be configured for accelerated cooking on the adaptive cooking appliance 110, shortening the cooking time as compared to conventional cooking devices. In one embodiment, the recipe server also facilitates an online community allowing users to share and develop recipes and other user generated content.

Figure 2:
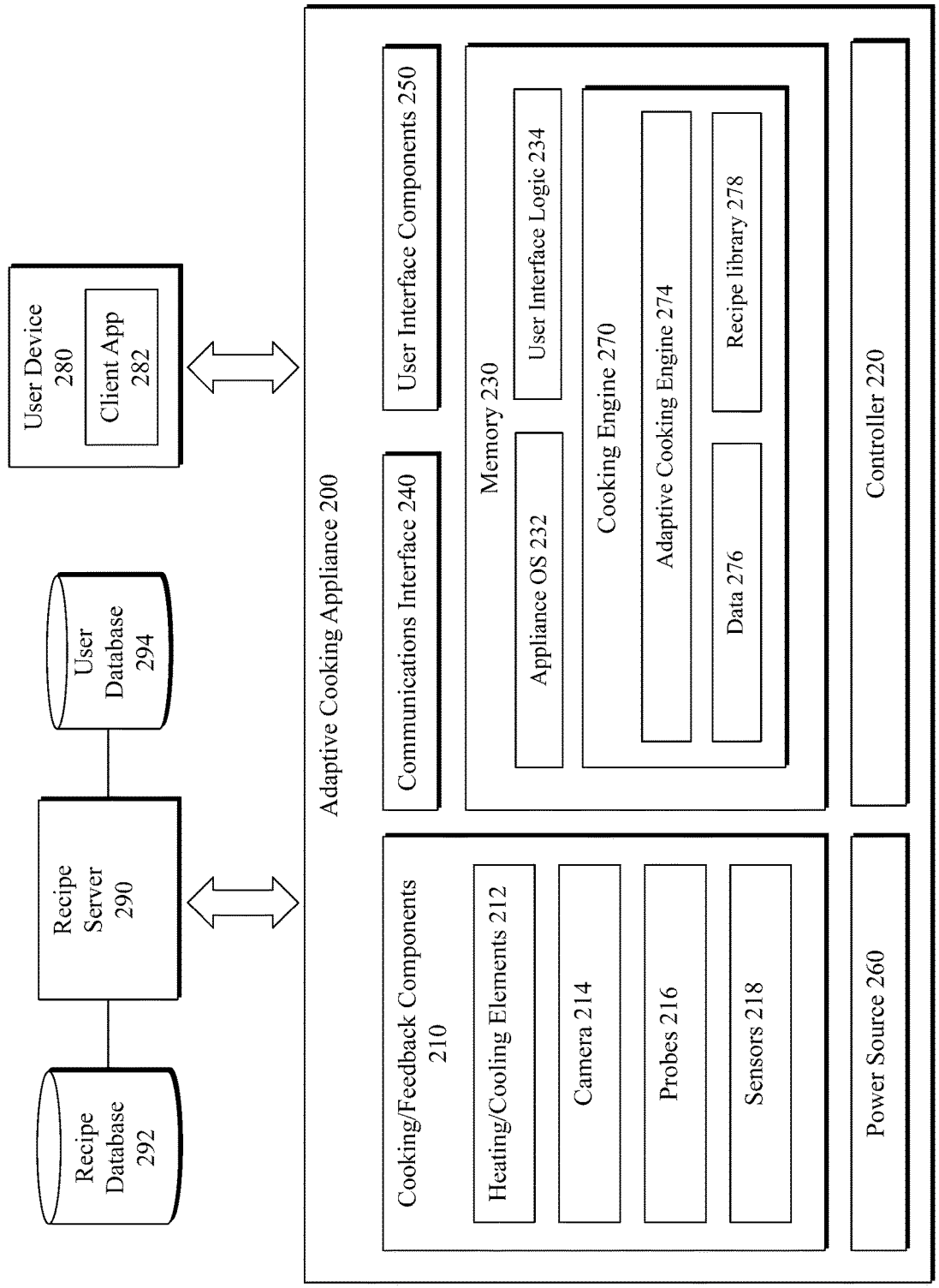
FIG. 2 is a block diagram illustrating functional components of an adaptive cooking appliance and related systems, in accordance with various embodiments.

FIG. 2 illustrates functional components of an adaptive cooking appliance and related systems, in accordance with various embodiments. The adaptive cooking appliance 200 may include cooking/feedback components 210, a controller 220, a memory 230, communications interface 240, user interface components 250 and a power source 260. The cooking/feedback components 210 may include one or more heating/cooling elements 212, a camera 214 or other machine vision components, one or more probes 216, and a plurality of sensors 218.

The controller 220 controls the operation of cooking appliance 200, including executing various functional components, such as the components represented in memory 230. For example, the memory 230 can store program instructions for execution by the controller 220, which may include an appliance operating system 232, user interface logic 234 and a cooking engine 270. The cooking engine 270 controls the cooking/feedback components 210 through cooking logic to implement a recipe. In various embodiments, data storage 276 stores configuration, recipe, cooking logic, food characterizations, and system information, including image files or video files captured by the camera 214.

In one embodiment, the heating elements 212 are wavelength controllable. For example, the heating elements 212 can include quartz tubes, each enclosing one or more heating filaments. Because the operating temperature of the heating filaments can be extremely high, cooling components may be provided to provide convection cooling to prevent damage to the heating elements.

The camera 214 may include one or more optical or thermal cameras, or other machine vision device, providing digital representations of the inside of the cooking appliance 200. In one embodiment, the camera 214 in conjunction with a display provides a virtual window to the inside of the chamber of the cooking appliance 200, which may be windowless. In one embodiment, the camera includes a fish eye lens. In various embodiments, the camera streams images to a display on the adaptive cooking appliance (e.g., user interface components 250), to a client application 282 executing on a user device 280 (through communications interface 240) or to cooking engine 270 for analysis during cooking. The camera 214 can serve as a food package label scanner that configures the cooking appliance 200 by recognizing a machine-readable optical label of the food packages. In some embodiments, the camera 214 can provide the cooking engine 270 with a stream of images, which can be analyzed for providing feedback during execution of the cooking logic (e.g., to monitor a level of doneness). In several embodiments, the camera 214 includes a light source which can illuminate the interior of the cooking appliance 200 such that the camera 214 can capture an image of the food substance therein.

In one embodiment, the probe 216 may include a temperature probe that is inserted into an edible substance to take temperature readings of the edible substance during cooking. For example, the temperature probe can be a multipoint temperature probe sending multiple streams (e.g., respectively corresponding to points along the length of the temperature probe) of temperature readings to the cooking engine 270. In several embodiments, the probe is electrically coupled to an interior surface of the oven through a connection adapted to receive one or more signals corresponding to the temperature readings. The cooking engine 270 can receive one or more continuous feeds of temperature readings from the temperature probe 216 via the connection interface. In these embodiments, the cooking engine 270 can determine the temperature readings by analyzing/decoding the signals. In response to changes to the temperature readings from the continuous feeds, the computing device can execute a heat adjustment algorithm that is dynamically controlled by the cooking engine 270.

When the adaptive cooking appliance 200 is used to cook an edible substance, cooking logic corresponding to a recipe is executed to control the cooking process. The cooking logic may include a heating algorithm that specifies the heat adjustments for the cooking engine to execute during cooking. In several embodiments, the cooking engine 270 is configured to detect a center of the edible substance such that the cooking engine 270 can accurately assign a stream of temperature readings as corresponding to the center of the edible substance. This enables the cooking engine to monitor the temperature gradients at different portions of the edible substance and thus enables precise cooking methodologies. In one example, the computing device can detect the center of the edible substance based on user input of an insertion angle and/or an insertion depth of the temperature probe 216 and/or the temperature readings from the continuous feeds. In another example, the exertion angle and/or the insertion depth of the temperature probe 216 is specified by the heating recipe.

In some embodiments, a display of the cooking appliance can present the insertion angle and the insertion depth to the user to have the user insert, according to those specifications, the temperature probe 216 into the edible substance. In several embodiments, the connection interface is configured to mechanically couple to a portion of a food tray and to communicate with a relay interface of the food tray to the controller 220.

In various embodiments, the cooking engine 270 may analyze images received from the camera 214, and data received from probes 216, sensors 218 and other feedback devices to enable dynamic control of the heating algorithm. The temperature probe 216 can extract (e.g., harvest) power from the power supply 260 by harvesting power from capacitive coupling to the AC current through the conductive chamber wall and the food tray. In turn, the temperature probe 216 can utilize the harvested power to generate a wired electrical signal, an audio signal, a radiofrequency signal, an inductive coupling signal, and/or a capacitive coupling signal to the connection interface. For example, the signal can be generated using one or more passive electronic components that produce different signals in response to receiving electrical power at different temperature ranges. In one embodiment, the probe includes temperature sensors and is configured for use in temperature gradient detection.

The communications interface 240 facilitates communication between the cooking appliance 200 and external computing devices. For example, the communications interface 240 can enable Wi-Fi (e.g., 802.11) or Bluetooth connections between the cooking appliance 200 and one or more local devices such as the user device 280 or a wireless router providing network access to a remote server 290, such as through the Internet. In various embodiments, the communications interface 240 can include other wired and wireless communications components facilitating direct or indirect communications between the cooking appliance 200 and another device. In turn, the cooking appliance can have access to a cloud service over the Internet connection.

The user interface components 250 may include a touchpad display, a keypad, one or more buttons and other input/output components (e.g., a knob or dial for scrolling through menu and recipe options, an audio microphone) to enable a user to directly interact with the functional components of the cooking appliance 200. For example, the display can present images from the camera 214. The display can also present a user interface implemented by the controller 220 and user interface logic 234. Input components can include a touch panel overlaid with a display (e.g., collectively as a touchscreen display). In some embodiments, the input component is one or more mechanical buttons, switches, or capacitive sensing devices. In some embodiments, the output component includes a speaker or one or more external lights. Embodiments of an exemplary user interface are illustrated herein in FIGS. 14A-14F, described below. In various embodiments, the cooking appliance 200 is adapted to receive user input from a user interface provided through one or more of the user interface components 250 physically coupled to the adaptive cooking appliance 200, and the user device 280, which may be remotely connected to the adaptive cooking appliance 200. In one embodiment, the adaptive cooking appliance 200 includes one or more features to prevent unauthorized or inadvertent operation of the adaptive cooking appliance 200, such as requiring a user to physically interact with a physical user interface component 250 that is physically coupled to the adaptive cooking appliance 200 (e.g., by pressing a physical button on the adaptive cooking appliance 200) in order to start a recipe/heating algorithm.

The cooking appliance 200 can implement an adaptive cooking engine 274, a data store 276 and a recipe library 278. In some embodiments, the adaptive cooking engine 274 can execute cooking logic to analyze feedback components such as an image from the camera 214, probes 216 and sensors 218. For example, an oven configuration such as the position of shelves within the oven or the oven door being open or closed can be determined through feedback from one or more sensors 218 or feedback from the camera 214. In some embodiments, the sensors 218 include one or more of a plurality of temperature sensors, a plurality of power output sensors, an ambient light sensor, a door open sensor, a rack placement sensor and other sensors providing feedback during cooking operations. In one embodiment, images from the camera 214 may be analyzed to dynamically adjust the cooking algorithm to eliminate potentially harmful blackening and smoke generated from overcooked meat fats. In another embodiment, the image from a camera may be illuminated by a specific color of a specific light source when facing toward an interior of the cooking appliance 200.

In some embodiments, the adaptive cooking engine 275 is configured to analyze an image from the camera to determine whether a machine-readable optical label is within the image. For example, the adaptive cooking engine 274 can be configured to select a recipe from the recipe library 278 based on the machine-readable optical label and implement corresponding cooking logic. In some embodiments, the communications interface 240 is configured to send a message to the user 280 to confirm the automatically selected recipe. In some embodiments, the adaptive cooking engine 274 is configured to present the recipe to the user on a local display and to receive confirmation via a local input component when the recipe is displayed. In response to the selection of the recipe, the adaptive cooking engine can execute cooking logic by controlling the heating elements according to the heating algorithm.

The user device 280, such as a mobile device, can connect to the adaptive cooking appliance 200 through the user interface components 250. For example, the user device 280 (e.g., a computer or a mobile device) can configure the cooking appliance 200 in real time through user interface logic 234. In one example, the user can select a recipe via the client application 282 running on the user device 280, and the client application 282 can communicate through the user interface logic 234 to cause the cooking appliance 200 to execute the corresponding cooking logic. The client application 282 also includes an interface with the cooking appliance 200, which may include casting the recipe for any meal the user buys or any recipe the user saves to the cooking appliance 200, making the cooking appliance ready to cook the recipe with the push of a button. The communications interface 240 can also enable the cooking appliance 200 to access network services, such as cloud services available from recipe server 290, to facilitate execution of cooking logic from the recipe database 292. User account information, preferences, recipe history, meal kit order history and other user functionality may be facilitated through use of the user database 294.

Components (e.g., physical or functional) associated with the cooking appliance 200 can be implemented as devices, modules, circuitry, firmware, software, or other functional instructions. For example, the functional components can be implemented across one or more components in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

In one embodiment, the cooking engine optimizes the oven operation in accordance with various user objectives (e.g. objectives for sear level, doneness or internal temperature, juiciness, internal moisture content), which may include cooking the best quality meal, reducing cooking time, and cooking multiple meals at once. Using the various components of the cooking appliance 200, the cooking engine identifies the current state of the cooking and adjusts the cooking parameters to reach a future state in terms of temperature, moisture content, shape and surface flavor and texture.

The power source 260 provides the power necessary to operate the physical components of the cooking appliance 200. For example, the power source 260 can convert alternating current (AC) power to direct current (DC) power for the physical components or deliver AC directly. In some embodiments, the power source 260 can run a first powertrain to heating elements 212 and a second powertrain to the other components.

Figure 3:
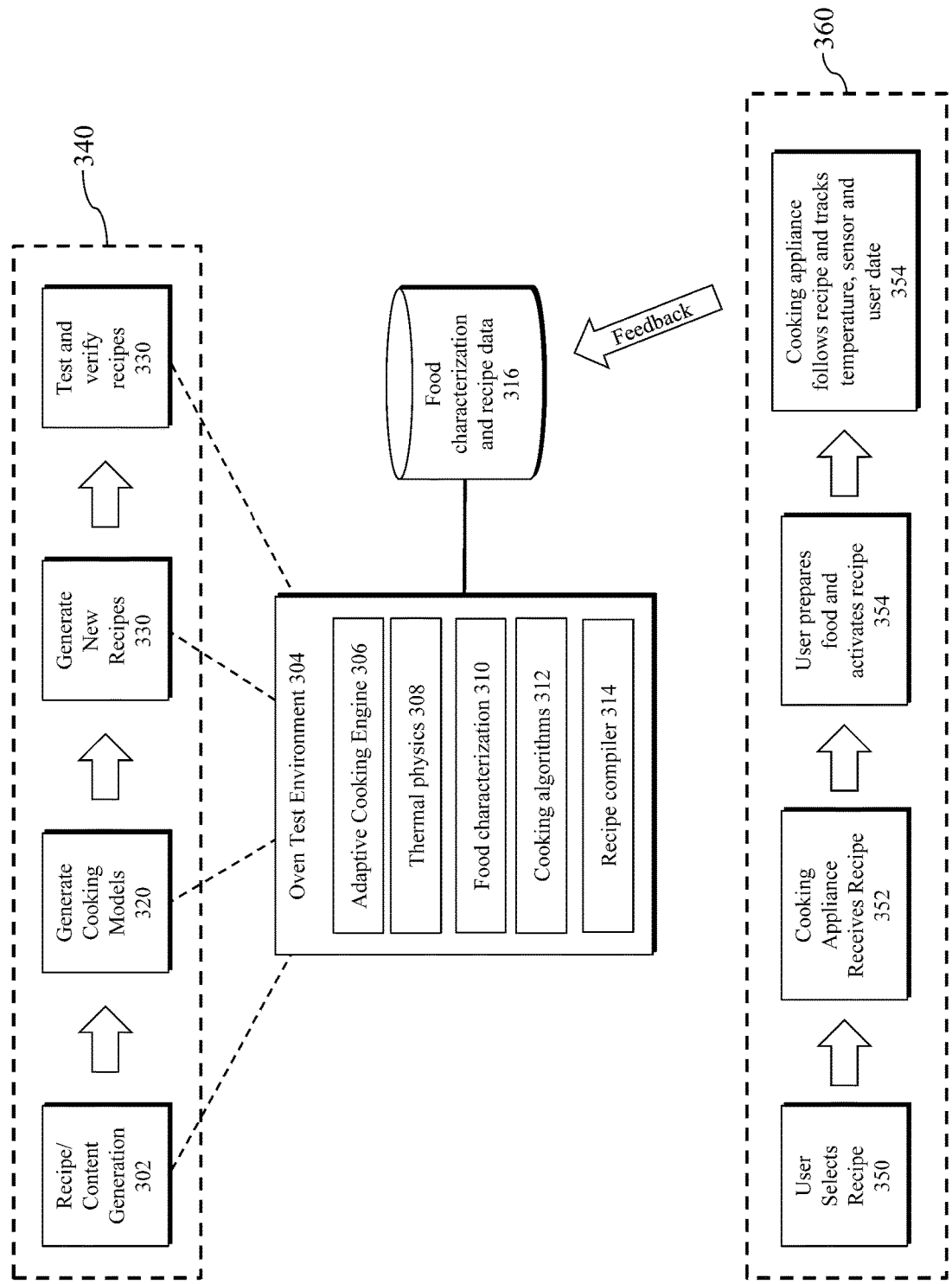
FIG. 3 is a block diagram illustrating a process for implementing an adaptive cooking system, in accordance with various embodiments.

Referring to FIG. 3, a block diagram illustrating a process for implementing an adaptive cooking system, in accordance with various embodiments, will now be described. In step 302, an initial set of recipe data is created for the system using an oven test environment 304 which may include the components of cooking appliance 200, recipe server 140 and user device 280. The test environment 304 may include functional components including an adaptive cooking engine 306, thermal physics 308, food characterization algorithms 310, algorithms 312 and a recipe compiler 314. The system includes a database 316 for compiling recipe, sensor, food characterization and other data. The recipes may include pre-existing recipes or specialized recipes developed for the adaptive cooking appliance 200. In some embodiments, the user can select a recipe that's conventional (e.g. bake at 400 degrees for 30 minutes) or one that's end-based (e.g., cook until medium-rare with heavy sear). In one embodiment, the recipes are developed and tested by professional chefs who define basic food characterizations for use in multiple recipes (e.g., chicken cut to a certain weight and shape) and test various cooking parameters such as cooking temperature, time and results. The food characterizations and test information is stored in the database 316. The food characterization parameters may include type of food, cut of food, size, shape and cooking temperature, sensor data during cooking, and various other cooking parameters. In one embodiment, the food characterization includes a heat algorithm for controlling the adaptive cooking appliance to properly cook the identified food.

Next, in step 320, cooking models are generated defining the operation of the adaptive cooking appliance 200 for various recipes comprising one or more food characterizations. The cooking models may include a range of acceptable cooking parameters, including cooking temperatures, time, sensor, and probe and image data for proper cooking. This information is compiled to create cooking logic which is provided to the cooking appliances. In step 330, the cooking models are used by the chefs to generate new recipes. For example a food characterization for chicken may be used in various chicken recipes. The system then generates recipes and adaptive cooking logic for further testing and verification. The verified recipes are then stored in network accessible storage for access by a user of an adaptive cooking appliance through a recipe server, which may be accessible through cloud or Internet services. The content generation procedures 340 may be repeated at various times during the life of the adaptive cooking appliance and related systems. In various embodiments, in step 350 a user accesses the recipe server and selects a recipe as described herein, for example, by selecting a recipe, inputting a new recipe or ordering a meal kit with an associated recipe. In step 352, a cooking appliance receives the recipe and corresponding cooking logic which may be started by the user in step 354 to cook a recipe. In various embodiments, the recipe and cooking logic may depend on preferences input by a user and parameters stored by the adaptive cooking appliance representing learned user behavior. For example, the user may select a single-item cook with desired end-state parameters selected by the user, multi-item cook with such end-state parameters selected, double-decker cook for cooking on multiple oven levels with such parameters selected, a one-stop-shop "cook this" recipe for a pre-designed meal kit, a conventional cook process with a selected process such as bake/roast/broil selected, or acceleration. The cooking appliance follows the heating algorithm from the recipe and tracks temperature, sensor, user data and other information during the cooking process. After the recipe is complete, the user may perform additional manual operations (e.g., additional cooking to achieve a desired level of doneness), discard the recipe, save the recipe, or provide other user initiated feedback. In various embodiments, selected data accumulated during the cooking process may be uploaded to the recipe server for further processing. In one embodiment, the recipe is stored for the user in cooking appliance after adjusting for user feedback and deviations in the sensor data, image and other tracked information as compared to the initial cooking model. In one embodiment, the tracked system feedback information includes images from a camera, and results of image analysis during cooking. In some embodiments, the accumulated data includes data about the food including properties before, during and after the cook, the source of the food, used-inputted feedback during or after the cook, user-related parameters such as how the probe was inserted (e.g., angle, depth), how certain edible substances were cut (e.g., relatively smaller or larger than a one-inch dice), and/or other tracked information (and the relations between two or more data items).

In various embodiments, the user subscribes to a recipe service which includes prepackaged meals or grocery delivery service. For example, the user may pay a small monthly subscription fee and then purchase individual meal kits or groceries online. A vendor may prepare a meal kit with fresh ingredients and in accordance with an associated recipe. The vendor may track the delivery and download the recipe and cooking logic to the adaptive cooking appliance after the meal kit arrives. The user may then place the meal kit in the cooking device and select the recipe for cooking. In one embodiment, the recipe appears on a display of the cooking device (e.g., prominently displayed as a suggested recipe at the top of the home screen) when meal kits arrive at the user location. In another embodiment, the camera of the cooking device images the meal kit as it is placed in the cooking device and identifies the associated recipe and cooking logic. These approaches allow the user to cook a fresh meal with the push of a single button to activate the cooking logic. In another embodiment, the user selects one or more recipes and a vendor selects optimal ingredients for delivery to the user for the selected recipes. The cooking appliance receives the recipes, which include preparation instructions for the user and automated cooking logic for the cooking appliance. In some embodiments, the recipe service, cooking appliance and/or other device tracks user data and makes meal kit and/or grocery recommendations based on user preferences and usage statistics. For example, the recipe service might offer a particular species of salmon because the user likes salmon that tastes relatively more well done when brought to a particular internal temperature.

Figure 4A:
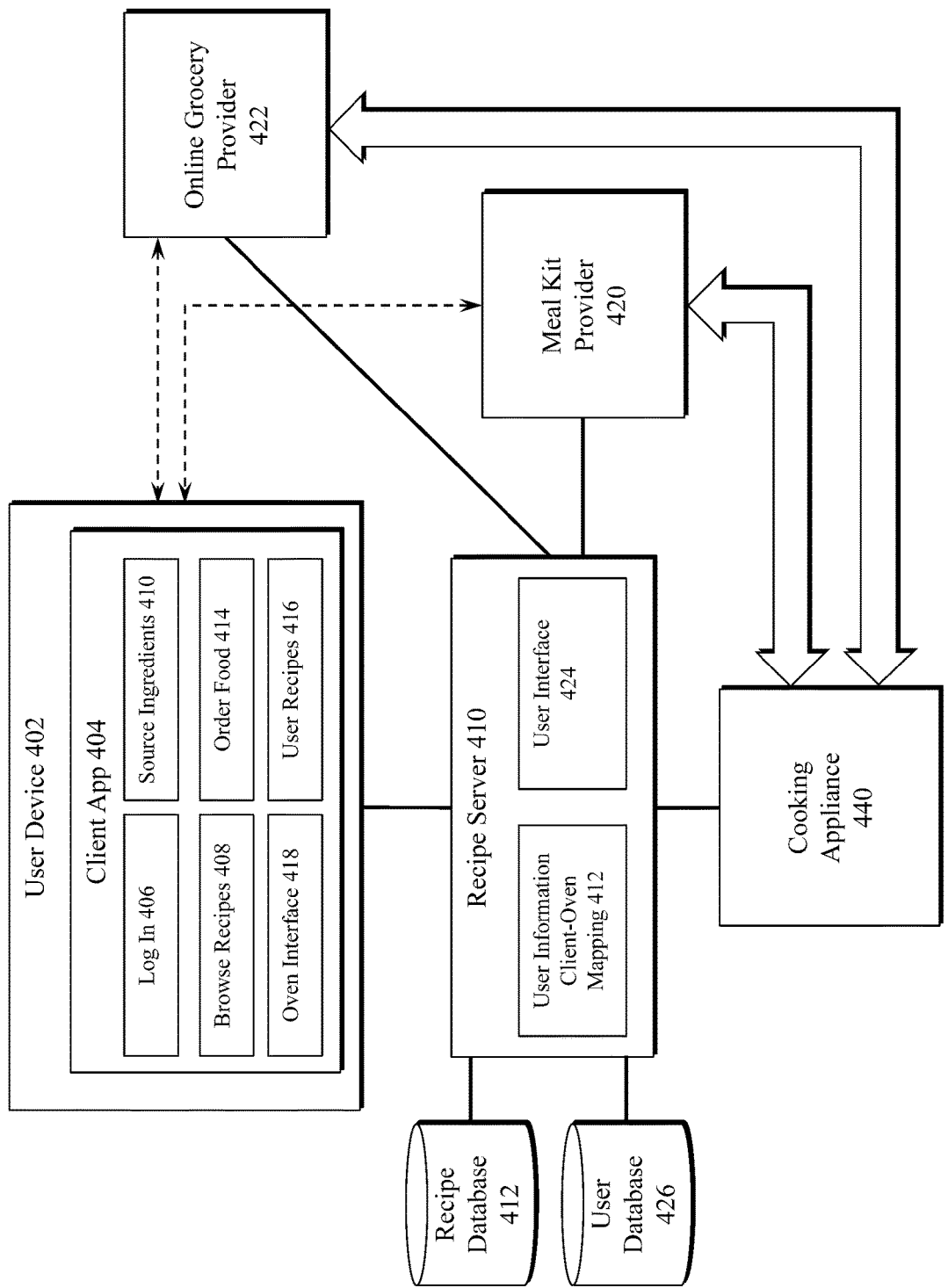
FIG. 4A is a block diagram illustrating a process for implementing an adaptive cooking system, in accordance with various embodiments.

Referring to FIG. 4A, an exemplary subscription model will be further described. A user, through a user device 402, subscribes to a recipe service, which may include discounts, early access to new recipes, meal kit delivery and online grocery integration. In various embodiments, one or more subscription options may include other features such as free shipping, expedited shipping, enhanced functionality on the oven (i.e. functions that are available only to subscribers), access to special content (cooking videos, local events, parties), and early access to content. In one embodiment, a subscription feature may include automatic casting of recipes to the oven (e.g., recipes corresponding to food and other recipe-related items ordered from a vendor) and special recommendations based on user-specific information.

Meal kit provider 420 prepares meals in accordance with one or more recipes available in a recipe database 412. In various embodiments, a meal kit may include an aggregation of ingredients (e.g., raw ingredients for meal preparation; pre-prepped ingredients ready to cook), cooking supplies and/or instructions for preparing a meal in accordance with a user skill level or preference. In one embodiment, meal kit providers 420 prepare meal kits for existing recipes. In other embodiments, meal kit providers (e.g., a restaurant) may also provide meal kits for proprietary recipes in accordance with the provider's food options. A meal kit provider 420 may be, for example, a standalone business, a restaurant offering takeout meals, or a grocery store. The meal kit provider 420 may be a third party business, or a food preparation service associated with or provided by the same entity that operates the recipe server 410. In one embodiment, the meal kit provider 420 may access the recipe server 410 through a web interface and associate a meal kit with recipe options.

The user may have an associated user account and a cooking appliance with an identifier that are associated through a user database 426 of the recipe server 410. In operation, the user accesses the recipe server 410 through the user interface of the cooking appliance 440 or the client application 404 on the user device 402. The client application 404 includes a login screen 406 for logging into the user's subscription account. The user may then browse recipes 408, identify source ingredients for selected recipes 410 and order food 414 through a provider, such as meal kit provider 420 and online grocery provider 422, who deliver uncooked food for the selected recipe to a location associated with the cooking appliance 440. In one embodiment, the recipe appears on the screen along with options from providers for meal kits or groceries. The providers 420 and 422 track delivery of the order to the cooking appliance location and notify the recipe server 410 to download the recipe and corresponding cooking logic after the order is received. In another embodiment, the recipe and cooking logic may be available from the client application on the user device, such as through the user's stored recipes 416, and the recipe may be cast to the oven through an oven interface 418. In various embodiments, the user may order a meal kit for pickup at a provider location, and the corresponding recipe and cooking logic may be cast to the cooking appliance after the user receives the order from the provider. In some embodiments, the user may access the recipe server 410, meal kit provider 420, and online grocery providers 422, through a user interface of the cooking appliance 440 to implement online shopping functions as described herein.

In one embodiment, a user may select a plurality of recipes from the recipe server 410, such as a meal plan for the week, and the online grocery provider 422 may aggregate the necessary ingredients, including food prepared and cut to the desired proportions, in accordance with optimal food characteristics, and prepare and deliver the order as described herein. The selected recipes and cooking logic are then available to the cooking appliance and through the client application. In another embodiment, available ingredients may be provided to the recipe server 410, which identifies recipes based on available ingredients, user preferences and other user-specific information. The system may also integrate with smart devices, such as smart refrigerator, which provides the current food options to the recipe server for recipe selection.

In one embodiment, a premium food service is provided. Professional chefs create recipes specifically for the cooking appliance using controlled portions of ingredients available through one or more providers. The recipes are tested and optimized as described herein for professional quality cooking and a fast cooking option is available which may increase the cooking speed, such as cooking in $\frac{1}{3}$ to $\frac{1}{8}$ the time of a conventional oven. The providers provide quality ingredients specifically prepared for each recipe. In this manner, the recipe may be reproduced accurately by different users, with different skills, in different regions. The provider may deliver the ingredients fresh to the user's door according to a delivery schedule, such as delivery within 2 days of ordering. In one embodiment, the ingredients or meal kits will arrive with instructions for the user and cooking logic previously downloaded to the oven. In this manner, chef quality meals can be reproduced by novice users with little effort. The quality of the ingredients may be controlled and the system described herein produces simple, easy to follow instructions for the user.

Figure 4B:
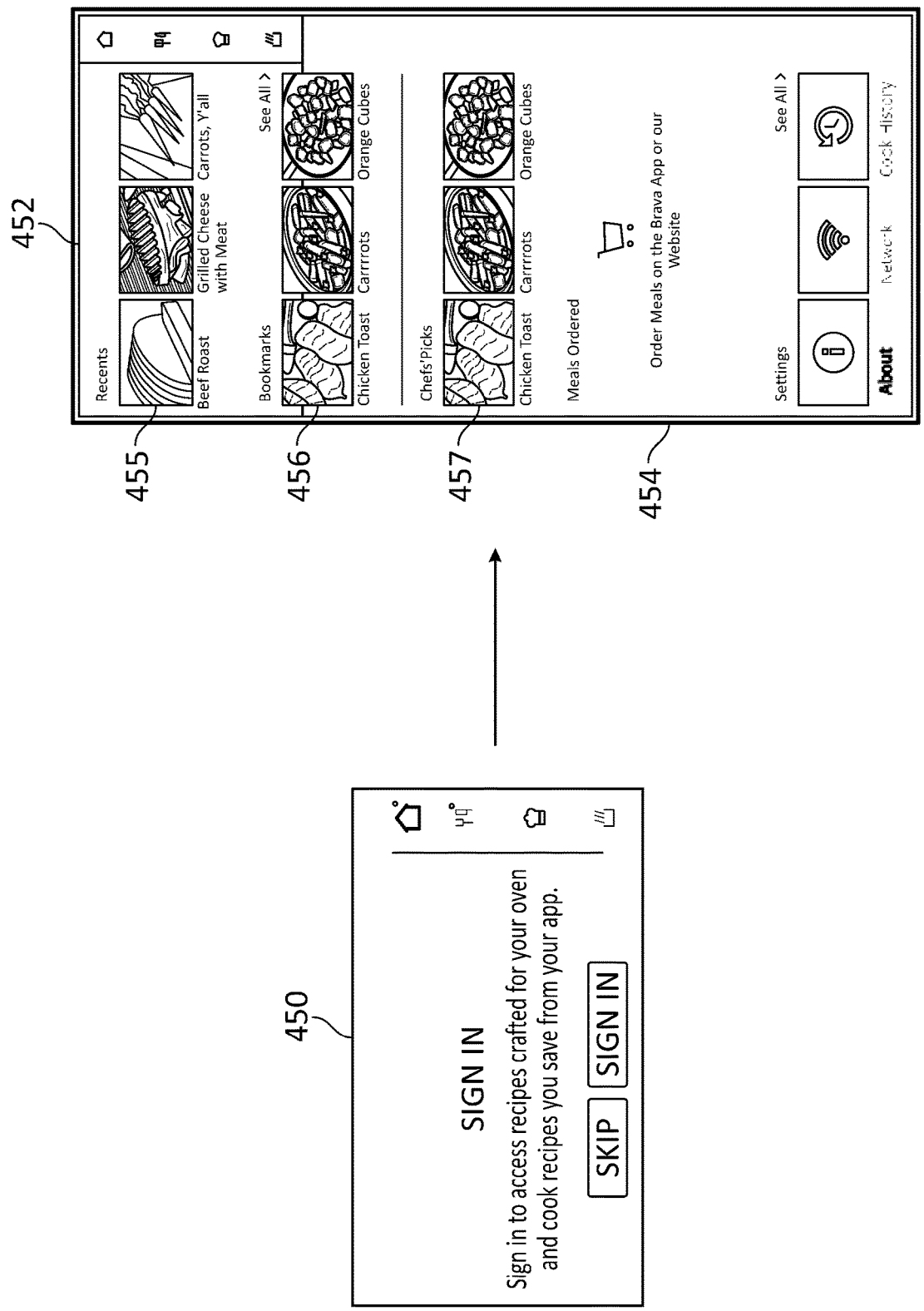

In various embodiments, the user may order a meal kit through a user interface associated with the cooking appliance (e.g., a touchscreen interface, voice controlled interface, an interface through a communicably connected mobile device, etc.). The cooking appliance may be linked to one or more user accounts through one or more servers (e.g., recipe server 410 of FIG. 4A). After a user purchases a meal kit through (or associated with) the user account, the corresponding recipe and cooking algorithm may be automatically transmitted to the cooking appliance. In various embodiments, the cooking appliance may further tie user-related and cooking-related information (e.g., food and cooking environment initial data, food and cooking environment throughout the cook, user assessments of cooking outcomes through a user feedback interface such as illustrated in FIG. 4G, etc.) to a particular user account via a user account, email, credit card or other user identifier.

In some embodiments, a user may desire to cook a particular ingredient (e.g., from a particular supplier/partner and/or independently acquired by the user) or meal to achieve a desired result. For example, the user may acquire a meal kit from an online marketplace or recipe store (e.g., via the user interface on the cooking appliance, via an app on a mobile device, through a web browser) or via a grocery store (e.g., using a frequent shopper card on a system linked to the cooking appliance through a communications network). The user may order the food while logged into a user account associated with the cooking appliance, allowing the meal kit contents and recipes to be downloaded to the cooking appliance for the user. A frequent shopper card associated with a physical or online store may be associated with a third party store account that could be linked to an account associated with the user's cooking appliance. For example, the user may have a subscription account that automatically downloads food purchases to the user's cooking appliance. The subscription account could link to third party account services associated with the user (e.g., grocery store) to provide meal kit information or other food purchase information to the cooking appliance and other benefits to the user (e.g., subscriber benefits).

In some embodiments, a recipe, cooking algorithm, and user-specific information associated with the meal kit may be downloaded to the cooking appliance. User-specific information may include user preference information including recipe preferences selected by the user (e.g., cook a meat medium rare) and/or stored parameters based on past user experiences or settings. For example, a user may order a meal kit and execute a recipe to cook a meat medium rare, but then determine that the cooked meat was too rare and instruct the cooking appliance, post-cook, to cook the meat for longer. The user may also "touch up" cooked meat to add additional searing. User interactions received by the cooking applicant before, during and after the cook that deviate from the meal kit recipe may be stored as user preferences and applied to the next execution of the recipe with the meal kit or similar meal kits (e.g., another meal kit including the same meat). For example, after cooking the meal kit, the user may be prompted to provide feedback to the cooking appliance through a user interface, such as the user interface feedback screens presented in FIG. 4G, which prompts the user to give a rating and other feedback.

In various embodiments, the meal kit recipe information and settings may be accessible through a user interface on the cooking appliance. The user interface may also guide the user to prepare the meal kit in a particular way before placement in the chamber of the cooking appliance. Example screen shots of a user interface for facilitating various aspects of the present disclosure are illustrated in FIGS. 4B-G. Similar interfaces may be presented to the user for other, non-meal kit, cooking scenarios, such as cooking ingredients that the user picked up at a local farmer's market.

In one embodiment, the user interface provides meal kit information in a prominent location allowing the user to select the meal kit and execute the recipe. For example, as illustrated in the embodiment of FIG. 4B, a user may sign into a user interface of the cooking appliance (e.g., screen 450) to link the cooking appliance to the user's account. The user interface may then provide user specific data such as meal kits ordered 454, recent recipes 455 cooked by the user on a cooking appliance, bookmarked recipes 456 of interest, recommendations for new recipes 457, and other information such as a date/time when the meal kit is expected to arrive via delivery, frequently cooked recipes and preferences, identification of the person/people each meal kit or recipe is intended to feed and their individual preferences such as level of doneness and sear.

A meal kit may include a collection of groceries or foods that are combined into the proper amounts and ratios to create a convenient and appealing meal for the user with less food preparation than conventional meal preparation techniques. However, many users will choose to use the cooking appliance and meal kit functionality by preparing their own ingredients. The contents of the meal kit can be communicated to the user via a recipe. However, a user may find it convenient to substitute different ingredients in the otherwise well specified meal kit or recipe is necessary. For example, a meal kit may include filet mignon with broccoli and potatoes, and a user may replace the broccoli with green beans, which has different thermal and cooking properties. In some embodiments, a known recipe, such as a meal kit recipe, can be cloned via a user interface and modified slightly to accommodate different meal preferences. In some embodiments the user may be prompted to input changes to the recipe through the user interface. The recipe generator could then adapt the recipe for the changing conditions. For example, if broccoli is substitute out for green beans, the green beans would typically require less heat in order to properly cook (and not burn) the green beans. In one embodiment, the user can clone the entire recipe of fillet mignon broccoli and potatoes, and the cooking engine can adjust the cooking zone in which the broccoli is placed in order to accommodate the green beans without negatively impacting the remaining food items.

In various embodiments, recommended recipes 455 (e.g., chefs picks) may be determined based on one or more of user preferences, information gathered from the user's prior cooks, usage statistics and ratings of similar users, user preferences and ratings associated with the user's past cooks, and/or other data tracked by the cooking appliance and/or user accounts. In some embodiments, recipe suggestions might also take into account the user's geographic location (e.g. based on preferences of users in a particular geography), which location may be determined through IP address determination, user delivery address, an address associated with the user account, point-of-sale location, GPS, or through other means.

After the user selects the meal kit (or a recipe using user-procured ingredients) for cooking on the cooking appliance, the user may be prompted by the user interface on the steps to be completed by the user to prepare the meal. An example embodiment of a user interface will now be described with reference to the screen shots of FIG. 4C. In this embodiment, the user is prompted to take certain actions that determine certain properties of the food or cooking environment. For example, the user may be prompted to measure the height of the protein or other edible substances that are to be cooked to configure the heating algorithm for a desired result. A measurement indicator or reference object associated with the meal kit or cooking appliance may assist the user in providing information on the food properties.

Figure 4C:
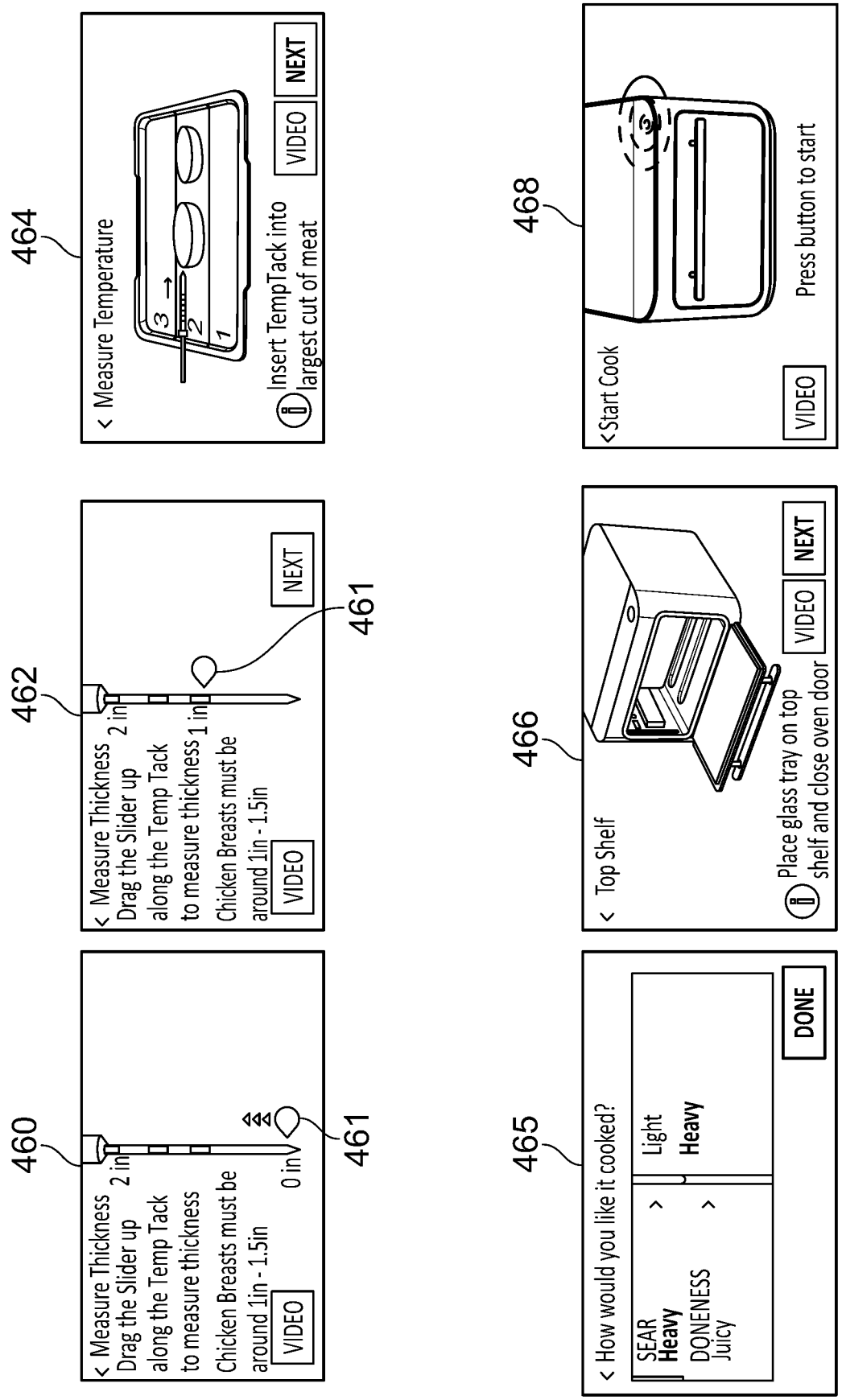

For example, as illustrated in the screen shots of FIG. 4C, the user may be prompted (screen 460) to use a temperature probe (such as the temperature probe used to measure internal temperature of edible substances during the cook) to measure the height of the protein (e.g., chicken). In various embodiments, the temperature probe may include a pointed/lance portion that has certain markings or colorings that could assist with height measurement. The user may then be prompted to enter the measured height, such as by entering a numerical measurement or indicating the height graphically (such as by moving a graphical slider 461 to an appropriate location on the probe displayed on screen 462). In various embodiments, the cooking algorithm may be adapted based on a detected height of the edible substance and other known food properties. The user interface may further include graphical, audio, and/or video prompts and information so the user can conveniently enter food properties (e.g., the height of the food) in a straightforward manner even if the user has no prior knowledge about measuring food for cooking, or if the user has had difficulty accurately measuring height in the past.

In various embodiments, the cooking appliance can determine whether the user has had height measurement difficulty in prior recipes, and what kind of difficulty the user has had (e.g. over or under-estimating height, and the statistics associated with each) by determining, for example, whether the food under-seared or over-seared during the cook. In this manner, the oven learns about user behavior and determines user-related parameters that can be stored and used for future cooks (for example, by adjusting the cooking logic to account for a user's likely mis-measurement).

The user may also be prompted to place the food items on a certain location on a tray and how and where to insert a temperature probe (such as a multi-point temperature probe) into the protein or other edible substance (screen 464). The user interface may further provide prompts to customize the meal (screen 465), instructions on where to place the food tray in the oven (screen 466) and when to start the cook (screen 468).

In various embodiments, the cooking appliance may include one or more processes that, alone and/or together, may be configured to learn and adapt the operation of the cooking appliance to the characteristics of the ingredients, user, and environment. For example, the cooking appliance and/or recipe may include initial configurations that may be updated throughout and/or after the cook based on sensed, calculated and/or user supplied information (e.g., food and cooking environment data throughout the cook, user assessments of cooking outcomes, etc.) that is used to adapt the operation of the cooking appliance to achieve one or more desired cooking outcomes. In some embodiments, multiple adaptive processes are utilized in conjunction with a robust user ecosystem to achieve cooking results that far exceed conventional cooking methods in terms of speed and quality—particularly when executed by inexperienced cooks.

In addition, the cooking appliance may determine certain data about the food or cooking environment without direct user input. For example, the cooking appliance may include one or more sensors that provide feedback to validate the type of tray being used (e.g., correct material, size and shape) and/or the position of the tray in the cooking appliance (e.g., top shelf vs. bottom shelf) The cooking appliance may then provide feedback to the user prompting the user to change the tray position, change a probe position or other changes to produce an optimal cooking environment. For example, a certain probe orientation (e.g. horizontally oriented parallel to the plane of the cooking tray) may be desired for optimal tracking of temperature changes during cooking, and the probe may be equipped with certain hardware/software (e.g., an accelerometer and associated software) to determine the probe orientation.

Figure 4D:
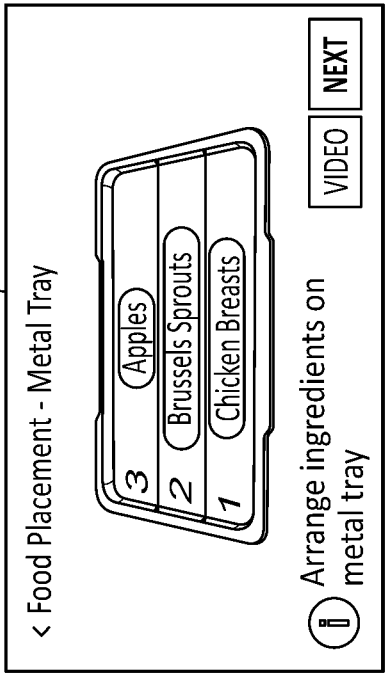
Figure 4D:
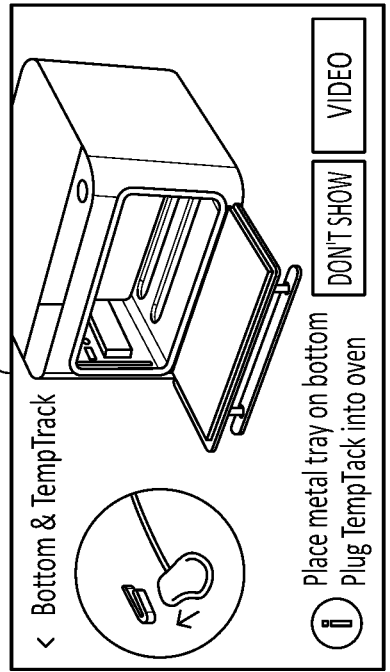
Figure 4D:
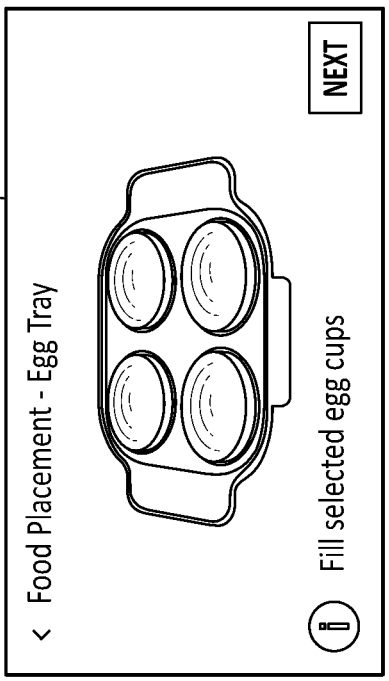
Figure 4D:
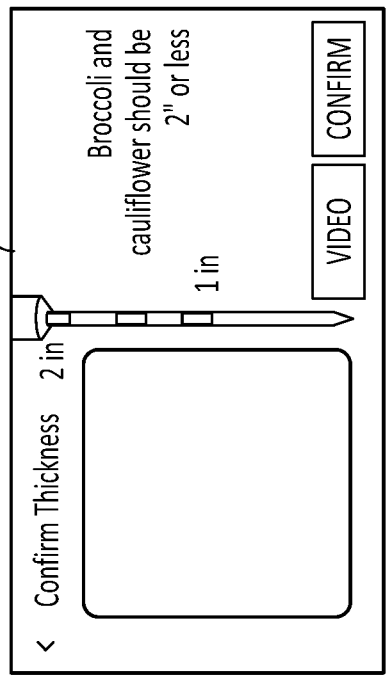

The user may be prompted via a user interface (e.g., touchscreen, audio feedback) of suggested and/or mandatory corrections to optimize the cooking environment for food properties, the chosen recipe and user preferences. Feedback may indicate, for example, that the tray position and/or probe insertion are incorrect or non-optimal, and the user may be advised to modify such position or orientation. In various embodiments, the cooking appliance may also provide the user with instructional audio tracks, graphics and/or videos via the user interface to explain or demonstrate how to change tray position, properly orient the probe, or even how to properly prepare the food and place it on the tray (e.g., size to cut vegetables, whether to stack or spread out certain edible substances on the tray, where to position the food, etc.). For example, FIG. 4D shows various user interface screen shots for user food placement of eggs in an egg tray (screen 470), flood placement of meal items for multi-zone cooking (screen 472), instructions on determining the height of certain foods (screen 474) and tray location in the cooking appliance (screen 476).

The cooking appliance may also adapt the cooking algorithm or instruction based on other information about the food, for instance the grocery store, distributor, wholesaler or producer of the food item. Source-related information may be transmitted to the oven via direct user input, by having the oven scan barcodes or food IDs, by tracking food purchased by the user, or via other means. The cooking appliance may include a database that stores data about food from these sources and may optimize recipes based on data gathered about how this food (or similar foods) cooked when executing a current or similar recipes. The food-related data may also include user feedback about how the food item cooked in the recipe. The cooking appliance, a recipe server other processing system may track food, recipe and user information to learn from the gathered data and adjust future cooks to produce desirable results. Supply chain and marketplace offerings can also be optimized based on characteristics of the food and users (food and cooking environment initial condition data, food and cooking environment data throughout the cook, user assessments of cooking outcomes, etc.).

Although the cooking appliance may instruct the user to correct identified errors in the environment, the cooking appliance does not require perfect execution of the recipe to produce a desirable result. In various the embodiments, the cooking appliance may adjust the cooking algorithm to adapt to learned or detected user behavior. The cooking appliance may learn over time that a particular user tends to deviate from the perfect cooking environment, such as a user that prepares and/or arranges food in a certain way that differs from the recipe, consistently orients a probe incorrectly in the food, and other detected changes. The cooking appliance may use this learned behavior to adjust the recipe based on the learned behavior to still achieve a desirable cook given the changed environmental conditions. For example, the cooking appliance might learn that the user inserts the probe in such a manner that typically offsets the lowest temperature reading a certain number of millimeters away from the point in the food that would have the lowest temperature throughout the cook (e.g., by inserting the probe too far or not far enough into a protein), and the cooking appliance would then anticipate that the sensor would read a certain number of degrees higher than it would read if properly oriented. The cooking appliance may then cook the food to a point at which this probe reads a temperature that is a number of degrees higher than the end temperature.

In another example of learned behavior, the cooking appliance may learn that a user tends to "over-rest" a meal after the recipe has completed cooking (e.g., the user cuts into the food later than recommended, such that the post-cook temperature flow within the food raises the center temperature beyond the desired level of doneness), and the cooking appliance may alter the recipe to increase the amount of time post-cook that the center of the protein will remain in the desired temperature regime, thus giving the user a longer window in which to cut into the food. The user interaction during the rest phase may be guided by a user interface that displays to the user via a touchscreen, or communicates to a user via audio, how long the food should rest before it will hit the desired temperature, and how much time the user will have available to cut into the food once it hits that temperature before the temperature rises to a temperature beyond the desired doneness level (see, e.g., FIG. 14B). Thus, the cooking appliance may assess user behavior and take appropriate actions (e.g., modifying how the oven prompts the user to cut into the food, such as by generating a louder or different auditory indication), using a multivariate learning environment based on a number of factors available to the cooking appliance, including sensed data (e.g., user placement of tray or probe), user preferences, food properties (e.g., food type, height, arrangement) and user interactions tracked through a user interface. The cooking appliance can determine whether the user is learning and adapting to the instructions over time, whether certain assessments are individual events and/or whether the user assessment suggests a historical trend, and adjust the recipe accordingly. In one or more embodiments, the learning environment is a neural network trained to adapt a cooking algorithm in response to various environmental conditions before, during and after cook.

Figure 4E:
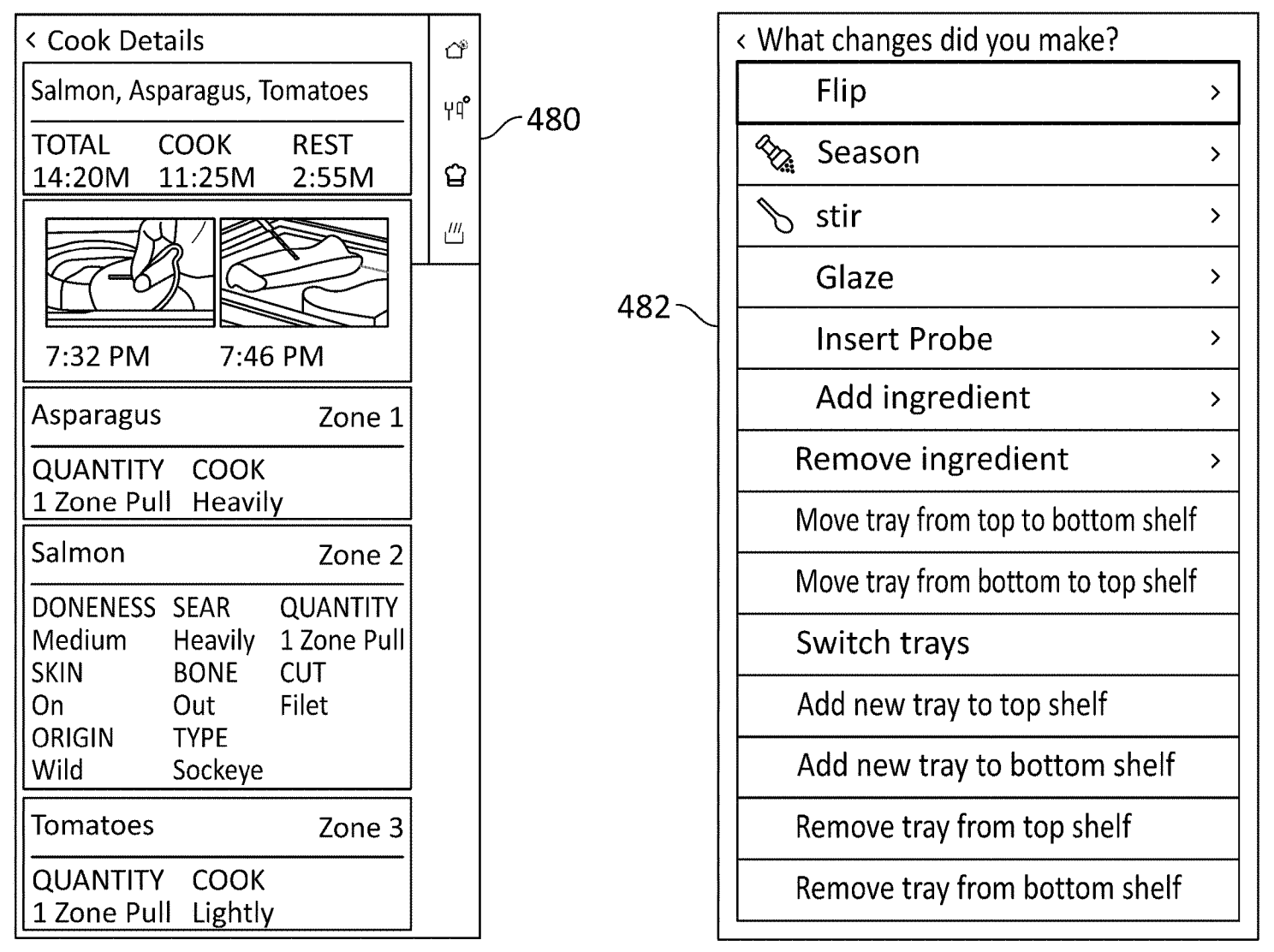

In various embodiments, the user-generated recipes may be input and adapted in a variety of manners. In one embodiment, the user may take an existing recipe and meal kit and make changes to the ingredients, preparation and cooking time/desired results. FIG. 4E shows example user interface screens that may be presented to a user including a detailed summary of a meal kit recipe, downloaded recipe, user-entered recipe or other recipe (screen 480) and a screen prompting the user to enter changes to the recipe made by the user (screen 482). The cooking appliance can analyze the changes entered by the user and modify the cook to achieve the desired result.

Figure 4F:
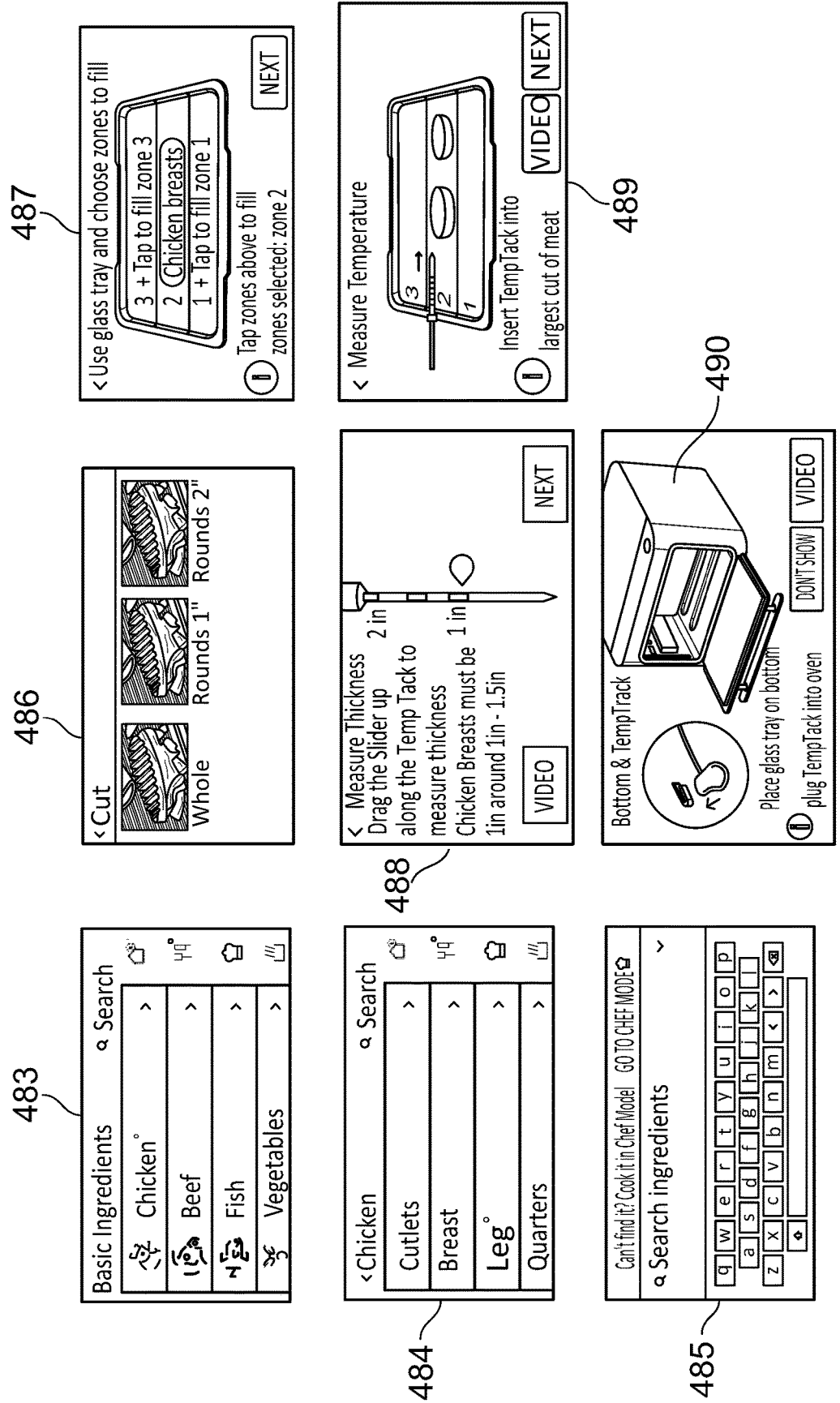
Figure 4G:
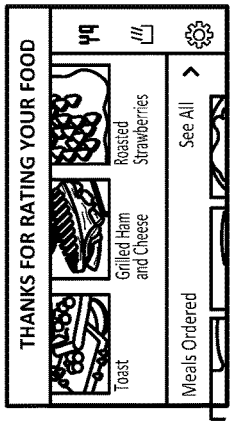

In some embodiments, the user may build a recipe from scratch. Referring to FIG. 4F, the cooking appliance may include user interface components configured to guide the user through the process, allowing the user to input a recipe and food properties in as much detail as available. The cooking appliance and/or a server may identify a related recipe and/or cooking parameters for the food types selected by the user, and generate a basic cooking algorithm associated with the recipe, which may then be further adapted based on food properties, environmental properties, user preferences, user feedback, and other available information. An example user interface for collecting user feedback in accordance with one or more embodiments is illustrated in FIG. 4G. The adapted recipe may then be automatically adjusted each time the user execute the recipe to achieve the desired cooking result. In this manner, a failed attempt to cook a new recipe will be automatically corrected the next time the user attempts to cook the recipe, with instructions and further adaptations as discussed herein. It will be appreciated that the cooking appliance of the present disclosure may produce a recipe in less time and effort than conventional approaches.

Referring to FIG. 4F, example user interface screens for single ingredient cooking are shown. The user may be prompted to select the ingredient (screen 483) and a type of the selected ingredient (screen 484), and the cooking appliance automatically selects an appropriate heating algorithm as described herein. The user may then be prompted to select a cut of the selected food (screen 486), and identify where the food should be placed on the tray (screen 487). During the process, the cooking appliance prompts the user for information for optimizing the recipe and cooking algorithm, such as the height of the protein (screen 488), placement of a probe into the protein (screen 489) and placement of the tray in the cooking appliance 490. The user may also chose to enter a "chef mode" which provides more detailed control over the recipe creation that may not be available through the basic user interface prompts.

Based on user preferences, similar recipes, properties of the basic food ingredients, and other available data, the cooking appliance may prompt/suggest to the user to adjust the food dimensions, cooking times and other aspects of the new recipe. The cooking appliance may track the cooking through various sensors and user feedback allowing an unsuccessful recipe to be corrected automatically during the cooking, and further improved for the next cooking attempt. If the user does not like the result, the cooking appliance can automatically adjust the recipe and/or suggest changes to the user. As disclosed herein, the cooking appliance can produce desirable results even if a poor quality recipe is executed. In various embodiments, corrections/adaptations can be applied on the next cook to quickly produce desirable results, even from poor quality recipes.

It will be appreciated that a chef who doesn't follow directions as stated and who attempts to cook a using an incorrect recipe, may still produce a good result using the cooking appliance of the present application. In various embodiments, user-generated recipes may include suggestions of recipes that are similar to the recipe entered by the user, liked by the most users and/or liked by users who have similar profiles to the user of the cooking appliance. The user interface may also analyze certain information about user-generated recipes to make suggestions to users about how to create new recipe content—for example, popular templates of heating logics to base certain recipes or portions of recipes on.

In various embodiments, the cooking appliance generates heat using multispectral light based heaters. Such heaters are relatively sensitive to the geometry of food and various food properties such as food-specific heat capacity and moisture content. Knowledge of the food properties and location in the over allows heating algorithms to be adjusted to provide improved cooking outcomes. In some embodiments, the food height is determined, in part, using an identifier ("ID") of the food and food source. The food identifier may be associated with a meal kit, a food brand or other identifier that may be stored to track cooking properties of the edible substance, allowing such properties to be incorporated into the recipe and cooking algorithm In one approach, an identifier such as a bar code, of the meal kit or food source may be used to identify expected food properties. The particular properties of the edible substance would then be associated with the cooking appliance, user or database communicably coupled to the cooking appliance. The particular food properties could include expiration date, geometry, height, specific heat capacity, weight, surface infrared absorption properties, moisture content, recommended recipes, and/or images of the food matter or its plated form after cooks or images of recommended recipes.

When a user substitutes ingredients it changes not only the properties of the food, but the proximity of the ingredients to the heating elements. If the user's selected food is unknown to the cooking appliance, then the food may be improperly cooked. A cooking appliance can produce a more accurate cooking result by accounting for the height of the food and other geometric considerations. The error rate of a manually entered the food height profile, however, may be incredibly high. In some embodiments, the height of the food can be entered by using automated height measurement systems such as LiDAR, stereo vision, and/or other technologies.

The cooking appliance may have access to the food ID, which allows the cooking device to access properties of the food item. In some embodiments, if the food identifier is unknown, known properties may be identified by the user, which may include measuring the food using a probe, imaging the food, allowing the cooking appliance and/or an online server to identify the food or another food having similar properties. The associated heating algorithms may then be applied to the recipe based on the expected properties of the food.

It will be appreciated that conventional ovens don't operate based on knowledge of the food matter being cooked as disclosed herein. The user experience of the present disclosure guides the user to a desired outcome regardless of cooking experience and ingredients, even if the food not optimally prepared or sourced. For example, Brussels sprouts can be as large as a small fist, or as small as a thumbnail, and the desired heating algorithm will change depending on the properties of the Brussels sprouts used in the recipe. In various embodiments, the cooking appliance knows the approximate size of the batch of Brussels sprouts and is able to lightly brown and bring out a desired (or "best") taste of the Brussels sprouts in accordance with the recipe. In some embodiments, the cooking appliance can adjust to the expected food properties with or without using other advanced sensing systems, such as a camera, capable of determining the doneness of Brussels sprouts. The user does not always need to specify the type of Brussels sprouts and the average diameter (e.g., 0.7 inches), but can rely on the information already in the cooking appliance and related systems based on an identifier of the food and user account at the point of sale.

In various embodiments, prior knowledge about a food being cooked allows the cooking device to more accurately estimate cooking time. The amount of energy expended to bring the center temperature of the food to a desired temperature can vary by orders of magnitude depending on the surface to volume ratio of the food. For example, the cooking times for fingerling potatoes versus large potatoes may vary greatly and heating methods that may be used to generate high quality meals may also vary greatly.

For some food items, it may be difficult to create a unique ID that associates particular food items at the point of sale. For example, if a user were to buy food items from grocery store instead of online, obtaining a food identifier may be difficult if the grocery store isn't connected to the cooking appliance and/or user account. In those particular cases, the system may use the user's credit card number or other unique billing-related identifiers in combination with the list of items purchased, in combination with time of purchase to allow the cooking appliance to determine the specific properties of food. For example, if a user purchases organic Brussels sprouts, fingerling potatoes, and purple corn at 10 AM using the user's credit card, a correlation system can associate the credit card with a user account and the items purchased, which may have a unique food identifier.

In various embodiments, the cooking device can determine the food parameters from a food identifier, purchase date and location and other available information. The food parameters may include information such as geometry, moisture content, and recommended recipes for the food items recently purchased. The user interface allows the user to choose a suggested recipe, select an existing recipe or enter a new recipe. The recommended recipes presented to the user may be selected to prioritize ingredients that have recently been purchased and their associated recipes. The recommended recipes may be further prioritized by incorporating the user's preferences and activity history, such as through statistics or collaborative filtering. Prioritizing food matter this way allows the cooking device to dramatically cut down on scrolling and otherwise unpleasant user interface interactions that are not necessary. For example, a user may purchase Brussels sprouts from a grocery store, go home and find suggested Brussels sprouts related recipes on the cooking device, selected based on prior recipes liked by the user. In this manner, the user won't be required to scroll through tens of pages of food items to find a desired recipe.

The information obtained by the cooking appliance can also be provided to the grocery store or other point of sale operator to enhance the grocery store's logistics and purchasing decisions. For example, the cooking appliance can provide additional information concerning when and how different items were prepared and used, allowing the store to optimize its supply chain and reduce the amount of items it must hold in reserve because it knows the cumulative amount of food the users have consumed, approximately when they have consumed it and what other foods they consumed it with. Online stores can also use food consumption and recipe preferences and feedback to suggest new recipes and food items for purchase. For example, if a user bought steak and Brussels sprouts, but only cooked the Brussels sprouts, the online store can recommend Brussels sprouts (knowing the user recently consumed the Brussels sprouts and may still have the steak). This can help present the user with a more convenient user interface for ordering food and selecting recipes.

One way to mitigate problems with manual entry of food height is to allow the user to compare the height of the food matter to some other reference object, and display the same reference object on the user interface such that the user can make an intuitive comparison between the reference object and portrayal of food that her height in the user interface.

There are many reference objects that are convenient and are shipped with the cooking device in question. For example, the temperature probe lance may be a relatively convenient reference object for measuring food height during preparation. Another possibility is the user interface display itself which can have a ruler like image for height measurement purposes. Another possible embodiment is two engrave or otherwise mark part of the cooking chamber or tray such that height or other life units are relatively obvious. That user can then enter the height of the food matter by visually comparing or manipulating markers relative to the reference object to indicate height.

Figure 5:
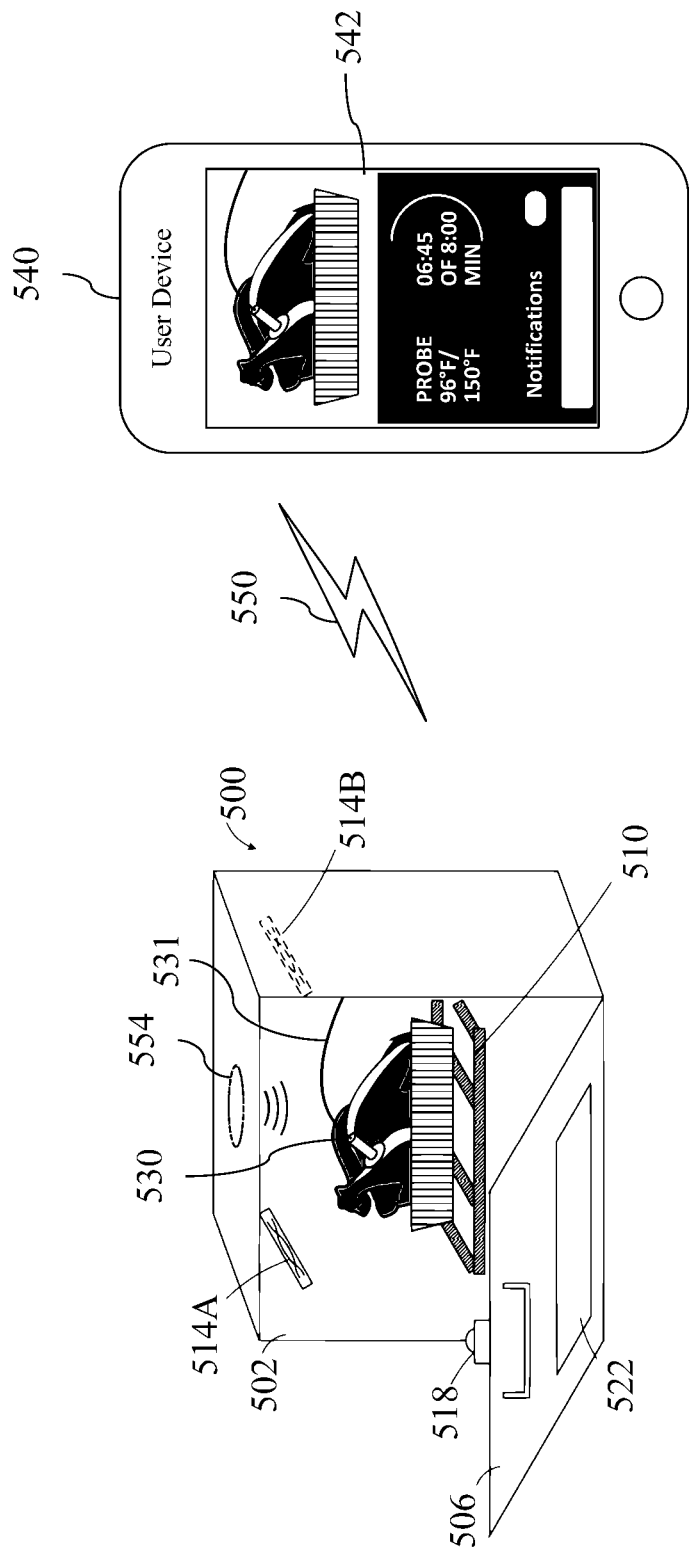
FIG. 5 is a block diagram illustrating an adaptive cooking apparatus and user device, in accordance with various embodiments.

FIG. 5 is a block diagram illustrating an adaptive cooking apparatus and user device, in accordance with various embodiments. In one embodiment, the cooking appliance can dynamically adjust the cooking logic during operation by analyzing images received from the camera. The cooking appliance can use the camera to determine several parameters prior to or while cooking food matter, which include, but are not limited to: food geometry and thickness, surface texture changes, level of browning or searing, presence of burn, food shrinkage, expansion or distortion, seepage of liquids, presence of smoke, presence of steam, liquid boiling, or any combination thereof. The camera may also be used for safety by detecting unsafe events such as the presence of smoke detection, fire detection, or extreme temperature, which may trigger an alarm and shutoff the oven.

Camera feedback control is useful for cooking methods where the cooking process follows an exponential or non-linear trajectory. For example, in browning foods, the darker the food, the more heat the food will absorb. This is particularly evident in toasting where 2 minutes usually produces a beautiful brown, but 2 minutes 30 seconds could burn the toast. Real time image analysis of the food during cooking could enable the toast to be browned perfectly every time, by stopping or adjusting the cooking process when an appropriate level of toasting is detected. Additionally, for sequential cooking sessions where the cooking device has already been preheated by the previous cooking session, camera control of browning can be used to produce consistent results.

In addition, the 3-D geometry of the food matter can also be determined by the camera. For example, a 3-D image can be obtained by adding an additional camera where stereoscopic vision can be used to determine the 3-D geometry or by adding another structured light source such that a predetermined light pattern is projected onto the food matter so that the 3-D structure of the food matter can be deduced by the distortion of the light pattern.

It is also possible to determine food geometry by using only a single camera because the cooking device cavity is well controlled. However, for food with very little contrast or visible edges, determining the precise 3-D structure using a single camera can be more challenging. In these cases, different lighting sources, different camera filters and sensors can be simultaneously used to improve the three-dimensional resolution. The 3-D geometry is useful in several ways: the cooking sequence can be optimized based on the thickness of the food matter in question. The 3-D geometry can also help in generating a preview of the result of a browning or searing session.

In some embodiments, machine vision via one or more in-oven cameras may be used to improve the user experience. For example, the camera may be used to identify and correct visible errors in the food preparation, cooking algorithm and/or food placement. One common error is insertion of the food in the wrong tray rack. The different tray racks position the food at different distances from the heating elements, which can significantly impact the food matter being cooked. In some embodiments, one or more cameras image the interior of the cooking chamber from a fixed location, including the food placed within the oven, and determine the relationship between the tray and the interior of the oven to compute the tray position. If the tray position is wrong, then the user may be informed through the user interface to correct the tray placement and/or override the assessment by the algorithm and continue the cooking algorithm.

In several embodiments, the cooking appliance can implement various mechanisms to facilitate programming process of developers who intend to build virtual heating recipes for the cooking appliance, where the virtual heating recipes include use of camera feedback control. The optical properties of the food can be determined by a camera library, which then translates the state of the food into easily applicable application programming interfaces (APIs). In one example, the control of searing or browning can be programmatically divided into 10 segments: zero being not browned at all, and 10 being black. The camera can use the initial shade of the food to calibrate this browning scale to be the value zero. Based on the type of food, browning level of 10 can be computed. In operation, the user may specify the desired browning level.

While the food is being cooked, the camera can compare the initial browning level with the current browning level to compute the current browning level presented. Additionally, in cooking processes where there are nonlinear changes, the camera feedback library can further use that nonlinear change to calibrate its browning scale. For example, in foods where a crust can form from baking, formation of the crust can be calibrated to a level 7, for example.

In another example, presence of steam emanating from the food or presence of bubbles indicates that the surface temperature of the food has reached 100° C. This information combined with cooking equipment temperature, other optical information mentioned above and timing can be used to model the interior temperature for the food and/or the state of the cooking process.

Referring to FIG. 5, a user device 540 runs a client application 542 that includes an interface to the cooking appliance features, such as temperature and sensor information, and an image of the meal while cooking. This allows the user to view the meal in real time with diagnostic information about the cooking progress.

A cooking appliance 500, in accordance with various embodiments, can include a chamber 502 having a door 506. At least one cooking platform 510 is disposed inside the chamber 502. The cooking platform 510 can be a tray, a rack, or any combination thereof. The chamber 502 can be lined with one or more heating elements 514 (e.g., a heating element 514A, a heating element 514B, etc., collectively as the "heating elements 514"). Each of heating elements 514 can include a wavelength controllable filament assembly. The wavelength controllable filament assembly is capable of independently adjusting an emission frequency/wavelength, emission power, and/or emission signal pattern in response to a command from a computing device of the cooking appliance 500. In various embodiments, the wavelength options allow for various cooking modes directed to (from shortest wavelength to longest wavelength): direct mode (surface of edible substance), direct mode (internal cooking of edible substance), pan mode, oven mode, depending on the wavelength used. In one embodiment, two different wavelengths may be implemented, a first shorter wavelength to cook the exterior surface of the food, and a second longer wavelength to cook the interior of the food. Computer vision may be used to ensure the desired sear and a desired internal temperature may be tracked with use of probe technology.

In several embodiments, the chamber 502 is windowless. That is, the chamber 502, including the door 506, is entirely enclosed without any transparent (and/or semitransparent) parts when the door 506 is closed. For example, the chamber 502 can be sealed within a metal enclosure when the door 506 is closed, and one or more cameras, such as camera 518, can be arranged to image an interior portion of the chamber 502 during operation. In some embodiments, the camera 518 is attached to the door 506. For example, the camera 518 can face inward toward the interior of the chamber 502 when the door 506 is closed and upward when the door 506 is opened as illustrated. The camera 518 can be attached to the door 506 or proximate (e.g., within three inches) to the door 506 to enable easy cleaning, convenient scanning of labels, privacy, heat damage avoidance, and etc.

In several embodiments, the heating elements 514 include one or more wavelength-controllable filament assemblies at one or more locations in the chamber. In some embodiments, each of the one or more wavelength-controllable filament assemblies is capable of independently adjusting its emission frequency (e.g., peak emission frequency) and/or its emission power. For example, the peak emission frequency of the wavelength controllable filament assemblies can be tuned within a broad band range (e.g., from 20 terahertz to 500 terahertz). Different frequencies can correspond to different penetration depth of heating the food substances.

The heating elements can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking appliance 500 can hold the power constant while lowering the peak emission frequency by activating more heating elements, each at a lower power. The cooking appliance 500 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In various embodiments, the camera 518 includes an infrared sensor, the cooking appliance 500 includes multiple cameras, and the camera 518 includes a protective shell. In some embodiments, the heating elements 514 and the camera 518 are disposed in the chamber 502 such that the camera 518 is not directly between any pairing of the heating elements. For example, the heating elements 514 can be disposed along two vertical walls perpendicular to the door 506. The heating elements 514 can be quartz tubes (e.g., with heating filaments therein) that runs horizontally on the vertical walls and perpendicular to the door 506.

In some embodiments, a display is provided, such as display 522 attached to the door 506 or a display at another location, such as on the top of the oven. The display 522 can be a touchscreen display. The display 522 can be attached to an exterior of the chamber 502 on an opposite side of the door 506 from the camera 518. The display 522 can be configured to display a real-time image or a real-time video of the interior of the chamber captured by and/or streamed from the camera 518. In another embodiment, the image from the camera 518 is streamed to the user device 540 across a wireless connection, such as Wi-Fi or Bluetooth. In various embodiments, repeated opening and closing of the door 506 during cooking allows heat to escape, affecting the cook time and reliability of a cooking algorithm. By providing the user with a real-time video of the interior of the chamber during cooking, in addition to real time progress status and feedback information as described herein, the user is discouraged from opening the door 506 (e.g., to check on the edible substance on the interior of the chamber 502) during cooking, thereby facilitating reliable meal preparation results.

In one embodiment the display presents a listing of recipes, which may include pictures of food, a recipe name and main ingredient, and an option to select recipes by touching or clicking on each recipe. Options such as crispness, sear level and level of doneness may be selected for various recipes, or the cooking appliance may select the options based on the ever adapting algorithm.

The user device 540 includes a display 542 that may be viewable from the oven, through a local area network, or through the recipe server across the internet, allowing the user to monitor and issue commands to the oven from any location. In one embodiment the user may adjust the recipe in accordance with the image on the user device. For example, if the food is a desired shade of brown.

Figure 6:
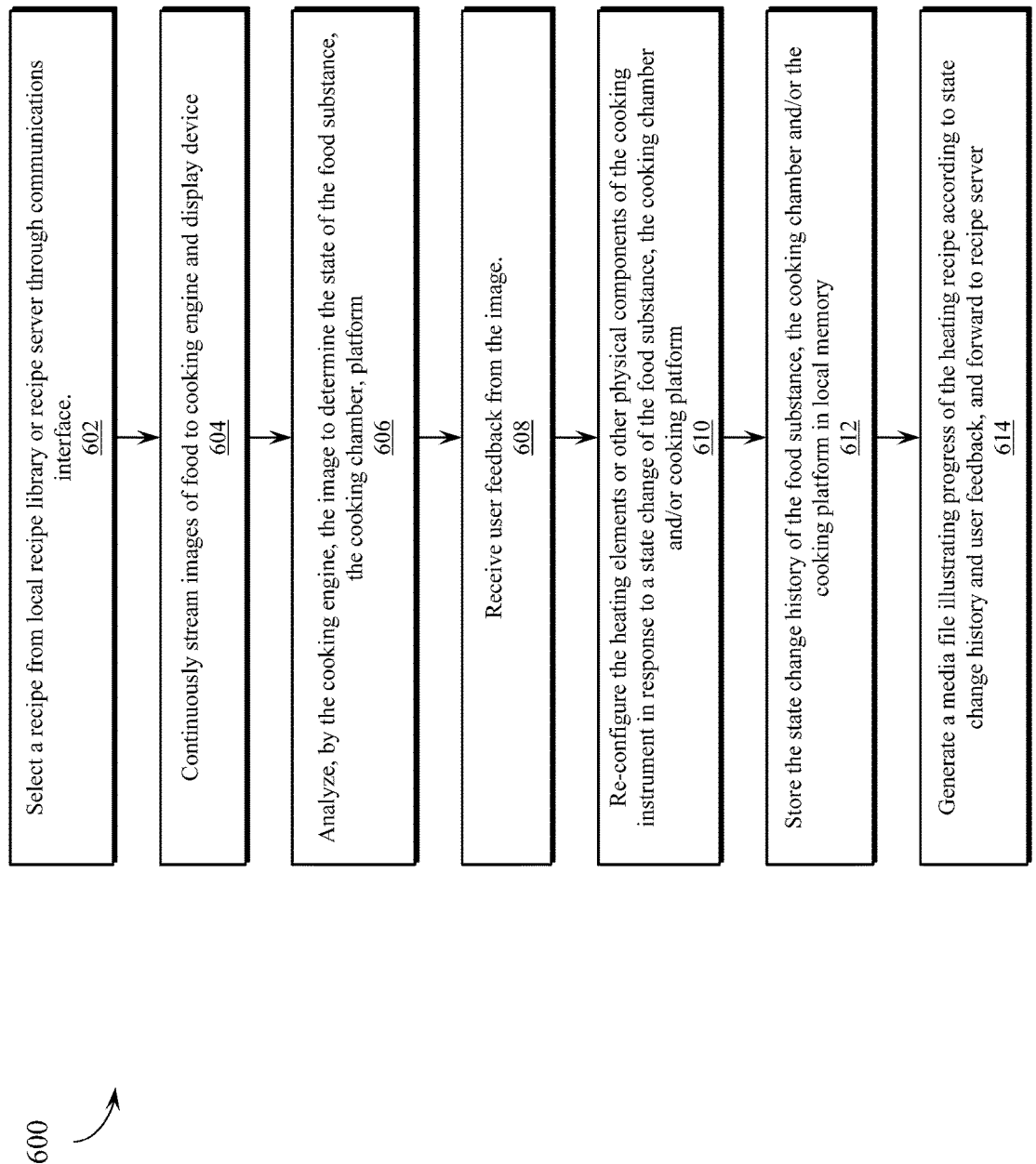
FIG. 6 is a flowchart illustrating a method of operating an adaptive cooking apparatus utilizing image feedback, in accordance with various embodiments.

FIG. 6 is a flowchart illustrating a method 600 of operating the cooking appliance (e.g., the cooking appliance 500, the cooking appliance 110, and/or the cooking appliance 200) to cook a food substance utilizing camera feedback, in accordance with various embodiments. The method 600 can be controlled by an adaptive cooking appliance (e.g., the adaptive cooking appliance 200).

At step 602, the user selects a recipe for use by the cooking appliance. In one embodiment, the cooking appliance presents the user with one or more recipe options, such as a recipe from its local recipe library or from a recipe library implemented by a cloud service accessible through a network interface (e.g., the communications interface 240). At step 604, a camera (e.g., the camera 518) inside the cooking appliance can stream images of the food substance to the computing device and to a display device, such as a display on the oven or one or more user devices. For example, the camera can be pointed toward a cooking platform (e.g., the cooking platform 510) of the cooking appliance.

At step 606, when the cooking appliance receives an image, the cooking appliance can analyze the image, to determine a state of the food substance, the cooking chamber, or the cooking platform. In some embodiments, the computing device can segment the image into portions corresponding to the food substance, portions corresponding to the cooking platform, and/or portions corresponding to the cooking chamber. According to the segmentation of the image, the computing device can determine separate states for the food substance, the cooking platform, and/or the cooking chamber. The state can be a known state (e.g., matching a set of potential states specific to the heating recipe or global to cooking operations of the cooking appliance in general) or an unknown state. In various embodiments, the states may be determined with or without the aid of other sensors.

In one example, a recipe and cooking logic is generated for cooking a steak. The set of potential states specific to the steak recipe can include states corresponding to different searing levels. In another example, the recipe is for making popcorn. The set of potential states specific to the popcorn making recipe can include states corresponding to a yet-to-pop state, a popping state, and an all popped state. In yet another example, the recipe is for boiling an egg. The set of potential states specific to the egg boiling recipe can include a water boiling state and a water not boiling state. In another example, the heating recipe is for toasting bread to a desired shade of brown. Global states can include a smoke alarm state (e.g., when there is smoke inside the cooking chamber) or a fire alarm state (e.g., when there is fire inside the cooking chamber or the food substances on fire). An unknown state is an image that deviates from all known states, such that it is so unusual that the computing device would either stop the operation of the cooking appliance or at least alert the user.

At step 608, the user device provides feedback to the computing device, which may include instructions for modifying the cooking algorithm, overriding current settings or setting additional preferences for the heating process.

At step 610, the computing device can re-configure the heating elements or other physical components of the cooking appliance in response to a state change of the food substance, the cooking chamber, and/or the cooking platform. For example, the reconfiguration can include turning off the heating elements, changing the peak emission frequency of one or more of the heating elements, changing the intensity of one or more of the heating elements, controlling the cooling system, sending a natural language or media message via the network interface (e.g., communications interface 240), displaying a message on the display (e.g., the display 522 or display on user device), or any combination thereof.

At step 612, the computing device can store the state change history of the food substance, the cooking chamber, and/or the cooking platform in local memory (e.g., the memory 240). In some embodiments, at step 614, the computing device can generate a media file (e.g., a visualization image or video) illustrating the progress of the heating recipe according to the state change history and provide feedback to the recipe server or store locally for the user. The user preferences can then be modified in accordance with user feedback.

Figure 7:
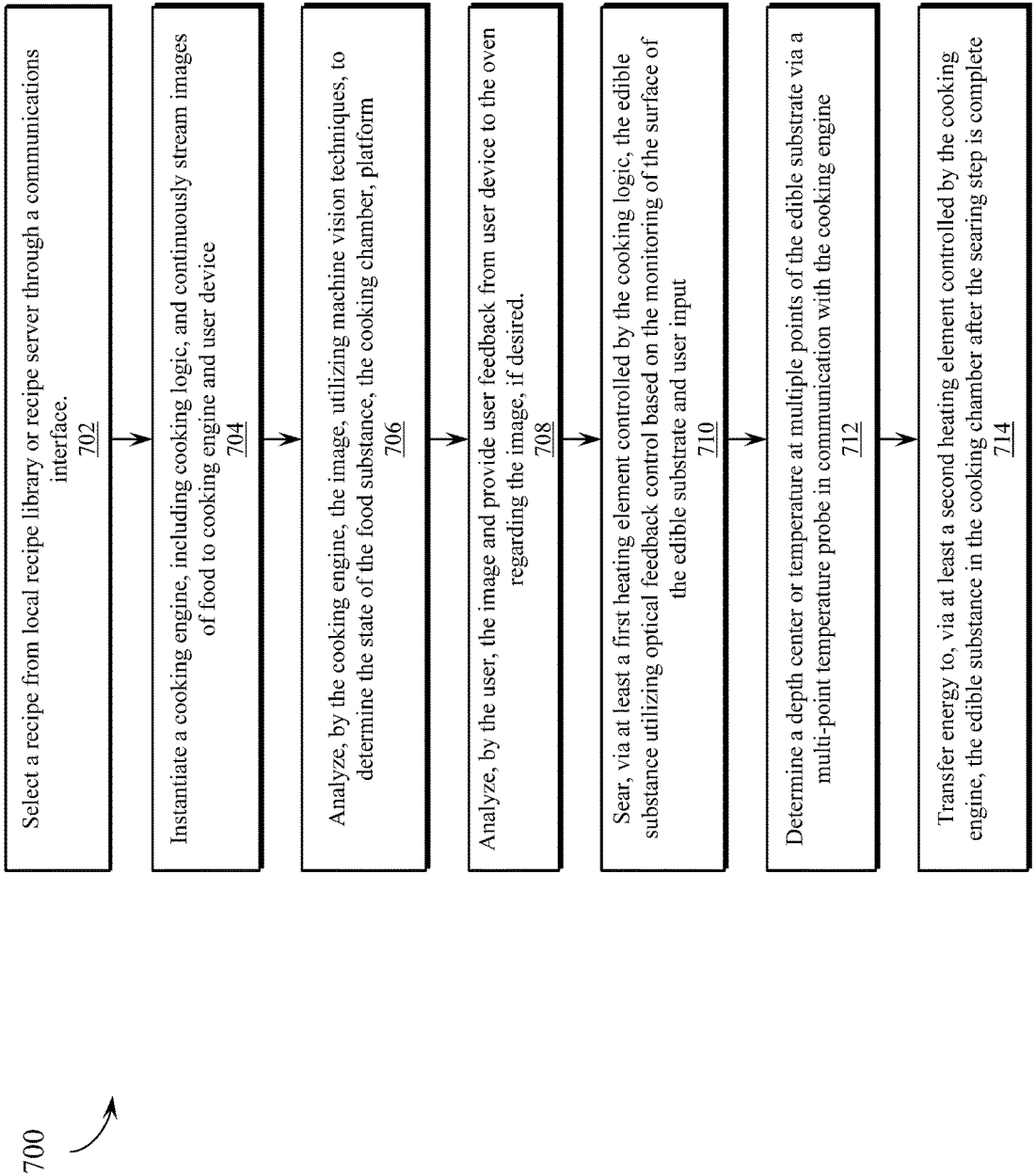
FIG. 7 is a flowchart illustrating a method of operating an adaptive cooking apparatus utilizing image and probe feedback, in accordance with various embodiments.

FIG. 7 is a flowchart illustrating a method 700 of operating a cooking appliance (e.g., the cooking appliance 500, the cooking appliance 110, and/or the cooking appliance 200) to cook an edible substance evenly, in accordance with various embodiments. At step 702, the cooking appliance can identify a food profile of the edible substance from a database. For example, the cooking appliance can identify the food profile by scanning (e.g., optically scanning or near-field-based) a packaging of the edible substance prior to starting to heat (e.g., searing and/or roasting) the edible substance. For another example, the cooking appliance can identify the food profile by receiving a user indication of the food profile via an interactive user interface. The interactive user interface can be implemented on a touchscreen of the cooking appliance. The interactive user interface can be implemented on a mobile device (e.g., smart phone or electronic tablet) having a network connection with the cooking appliance.

In other embodiments, the recipe and cooking logic can be automatically available on the cooking appliance through a subscription or vendor relationship, which also tracks and adapts the cooking experience to user-specific information, as disclosed herein. For example, the user could order a meal kit and have it delivered to a location associated with the cooking appliance. The vendor can track delivery and instruct the recipe server to push the recipe to the cooking appliance when the meal kit is received. Alternatively, the user may purchase groceries and associated recipes may be presented to the user for availability on the cooking appliance. In another embodiment, the user selects recipes, a grocery delivery order is executed and the recipe and cooking logic is downloaded to the oven when the groceries are delivered. In another embodiment, the recipes in the cooking appliance are tracked by smart devices in the home and adjusted to only show recipes having available ingredients.

At step 704, the cooking engine (e.g., via a processor or a controller) instantiates a cooking logic including a heat adjustment algorithm based on the selected recipe from the database. For example, the cooking appliance can identify one or more recipes associated with the food profile and display the recipes for user selection. The computing device can then receive a user selection of at least one of the recipes. The computing device can instantiate corresponding cooking logic including the heat adjustment algorithm based on the selected recipe. In one example, the selected recipe includes a searing step.

At step 706, the cooking appliance can monitor, via a camera, a surface of an edible substance in a cooking chamber. At step 708, the user, receiving the image through the user device, may also monitor the cooking and provide feedback if desired.

At step 710, the cooking appliance can sear, via at least a first heating element controlled by the computing device, the edible substance utilizing camera feedback control based on the monitoring of the surface of the edible substance by the cooking engine and the user of the user device. For example, the computing device can set the cooking appliance to sear by tuning a peak emission wavelength of the first heating element. For example, the heating concentration of longer peak emission wavelengths can penetrate the edible substance more. Accordingly, when searing, the computing device can shorten the peak emission wavelength of the heating elements. When searing, higher-frequency and shorter peak emission wavelength is used. The radiant heat transfer efficiency during the searing operation can be more than 20 times the radiant heat transfer efficiency of an oven running at conventional filament temperatures (e.g., a conventional nichrome oven). At this much higher radiant heat transfer efficiency, various parts of the edible substance may not ever reach a balanced thermal equilibrium (e.g., radiant heat is added to the surface of the edible substance at a faster pace than the heat being thermally conducted away into the inner parts of the edible substance). Hence, the inner portion of the edible substance does not completely act as a heat sink for the surface of the edible substance. As a result, when searing the surface of the edible substance, the internal portion of the edible substance is also roasted.

At step 712, the cooking appliance can determine a depth center of the edible substance and/or the temperature at multiple points via a multi-point temperature probe in communication with the computing device. At step 714, the cooking appliance can roast, via at least a second heating element controlled by the cooking appliance, the edible substance in the cooking chamber after the searing step is complete (e.g., according to camera feedback). The first heating element and the second heating element can be the same heating element or different heating elements. Each of the heating elements can include one or more filament assemblies capable of adjusting their peak emission wavelengths. For example, the cooking engine can set the cooking appliance to roast by tuning peak emission wavelengths of the second heating element.

When roasting, the cooking engine can configure the peak emission wavelength of the second heating element to correspond with a penetration depth through the edible substance to the determined depth center. The cooking engine can proportionally adjust the peak emission wavelength to a level that corresponds to the penetration depth. The food profile identified in step 702 can specify a depth adjustment function. The depth adjustment function can map penetration depths to peak emission wavelengths. The computing device can thus proportionally adjust the peak emission wavelength to correspond to the penetration depth according to the food profile/depth adjustment function.

The cooking engine can operate the heating elements differently when roasting versus when searing. In some embodiments, when roasting, the cooking engine drives (e.g., sending a control command to a driver) a filament assembly of the second heating element to emit at a peak emission wavelength longer (e.g., lower peak emission frequency) than when searing the edible substance. In some embodiments, when roasting, the cooking engine drives a filament assembly of the second heating element at a higher power than when searing the edible substance. When roasting, the peak emission wavelength is longer, the radiated power is lower, and the radiant heat transfer efficiency is lower than when searing. This enables the roasting operation to cook the inner parts of the edible substance without affecting the surface of the edible substance. For example, this can be partly because the edible substance reaches equilibrium quicker since the surface heat of the edible substance is quickly conducted to the center of the edible substance.

While roasting, the computing device can tune the power driving the heating elements (e.g., the second heating element) based on temperature feedback control from a temperature probe inserted into the edible substance. The temperature probe can be in communication with the cooking engine. For example, the cooking engine can monitor temperature readings from the temperature probe via an electrical wire connection, a radiofrequency (RF) wireless connection, or a near field inductive or capacitive coupling connection with the temperature probe.

In various embodiments of the method 700, the cooking appliance sears (e.g., surface cooking utilizing high-power) before roasting. For example, roasting is performed with less power. In some embodiments, there are three (see, e.g., screen 487 in FIG. 4F) or four large cooking areas with multiple heating elements in a multi-zone cooking environment. Due to power limitation, it may be impractical to use all heating elements at max power or shortest wavelength when searing. For example, the cooking appliance can have three heating elements on the top portion of its inner chamber. The cooking appliance can run the heating elements on the top portion sequentially to sear (e.g., to overcome the power limitation). When roasting, the cooking appliance can drive the heating elements at lower power sequentially, or running all heating elements or all top portion heating elements at the same time, all which have a lower filament temperature with longer wavelength as compared to when searing.

Generally, driving heating elements to emit longer wavelengths cause the emitted power to penetrate deeper into food. However, thermal gradient of the food can contribute to penetration as well. Very hot surface can cause a relatively sharp temperature gradient from the surface to the center of the food. A relatively lower temperature can have even heating from all sides of the food, similar to how radiant heat can cause a lower/smoother temperature gradient.

In various embodiments, the recipe server and compiler are designed to increase the cooking speed for various foods. In one embodiment, cooking ranges and heating algorithms are developed on the front end for food characterizations and other recipe components. Each component has a cooking range that can be adjusted depending on the outcome desired by the user, such as speed or best flavor. For any recipe, ingredients include a food characterization, a food type and typical cooking parameters. A recipe may be compared to similar recipes and may be modified to result in faster cooking, which may include food preparation (such as the portion size to cut meat) and a heating profile algorithm to adjust the cooking time. User configurable parameters may be selected to adjust the factors taken into consideration in selecting the speed cooking option. In one embodiment, the recipe input is modified in accordance with known food categorizations and further provided as an input to a heating algorithm.

Figure 8:
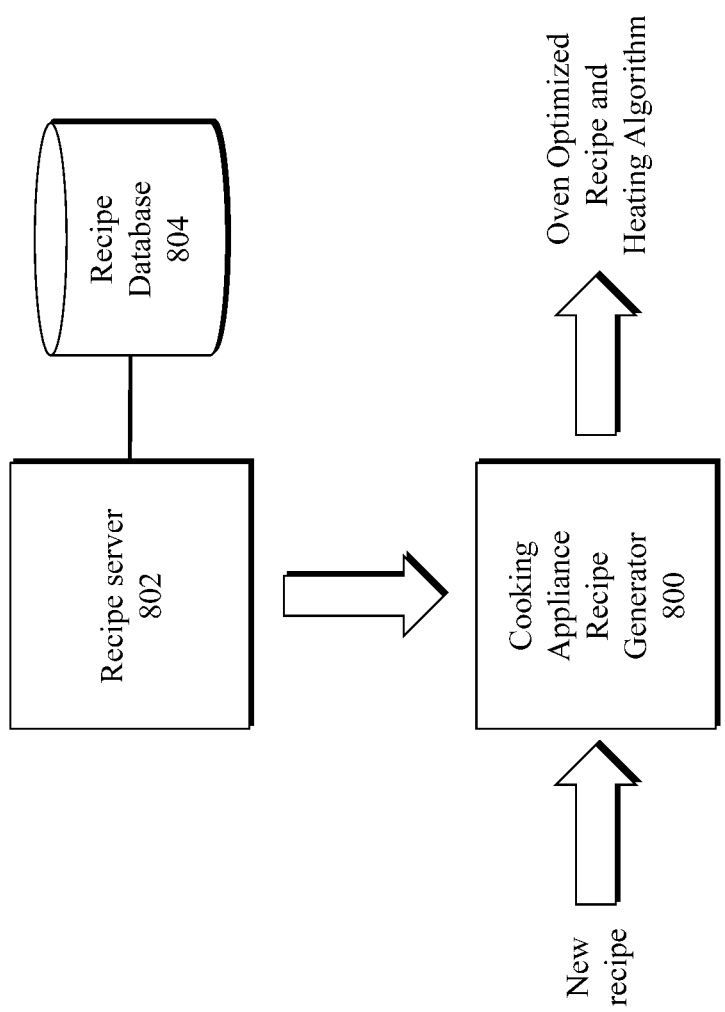
FIG. 8 is a block diagram illustrating a recipe generation process, in accordance with various embodiments.

An exemplary embodiment of a recipe generation process is illustrated in FIG. 8. As illustrated, the recipe database 804, including food characterizations and cooking logic, may be used as a knowledge base for use in an artificial intelligence or machine learning system for converting recipes to cooking appliance-specific cooking logic, including heating algorithms, and food preparation parameters. In one embodiment, a new recipe may be input to a recipe generator 800 to produce an optimized output recipe and cooking logic for the oven, including a heating algorithm. Through the machine learning system, recipes and cooking logic may be generated that are optimized for cooking speed and efficiency, while maintaining simplicity and flavor. In one embodiment, a recipe and cooking logic are implemented and run in a controlled cooking appliance with controlled ingredients. The recipe is cooked using different combinations of ingredients and preparations and various dishes are tested in a cooking appliance and results are tracked in the database 804. The system can then adjust the recipe and cooking logic to speed up the cooking process, adjust heating model or sensor information, and provide logic for dynamic control.

In one embodiment, a conventional recipe is provided to the recipe server. The recipe is parsed into a series of high level instructions which can be translated into cooking elements and a heating algorithm. The high level instructions include commands for controlling the cooking appliance (set temperature, set timers), monitoring sensors such as probe, camera, and timers. Analysis information to detect future events such as an image showing the proper edible substance profile, timers for adjusting the heating and cooling may also be included in the instructions. In one embodiment, the recipe is converted into cooking appliance instructions. A recipe may be constructed based on cooking appliance data, such as best ingredients, sensor monitoring, foot preparation, and heating adjustments.

A fast cook recipe may also be constructed to speed up timing in accordance with the stored user data. After a recipe has been followed, the user may provide additional feedback and adjustments to the recipe. The cooking appliance may also provide automatic adjustments (e.g., based on sensor feedback and camera image analysis) and user-specific information learned during the cook, as discussed previously herein. In one embodiment, the user selects from a set of options such as undercooked and overcooked and the recipe is adjusted for future use. In one embodiment, the recipe may be stored, including the sensor and image information. The user recipe is added to the recipe database and may affect other generated recipes, depending on factors such as region, ingredients, user profile, user feedback, and user preferences. For example, user experiences with certain sourced ingredients or regional preferences may lead to changes in a recipe (e.g., if recipes executed with a particular sourced ingredient are regularly overcooked, then the heating algorithms for other recipes using the source ingredient may be adjusted accordingly). In another embodiment, the recipe may change the user's recipes based on factors such as the user's history of improper ingredient selection and preparation, inaccurate ingredient measuring, common user errors and/or user preferences. The feedback is used to modify and optimize the recipe for the user (e.g., if the user consistently cuts proteins to a greater thickness than expected, then the heating algorithm can be adjusted to apply searing power to the protein for a shorter duration than expected). In one embodiment, the user is recommended recipes from other users having similar user profiles, feedback and experience. The next recipe is used to generate cooking logic which may be downloaded to the cooking appliance and modified by the user as desired. In one embodiment the user may modify the recipe on the oven, user device or through the recipe server.

In one embodiment each recipe includes a thermal script. Thermal modeling is performed by the recipe server for various food characterizations and recipes. Thermal modeling includes timing and sensor based temperature adjustments. During cooking, timing, temperature sensor readings are tracked. After cooking the tracked information is compared to the initial model along with user feedback. In this approach, a user or oven adjusted model is available for use the next time the user runs the same recipe. In one embodiment, the user is prompted whether to use the adjusted model, the original model or make further adjustments to the model. In one embodiment, the adjustments occur automatically in the background, providing the user with the best recipe and thermal model every time.

In one embodiment, the cooking appliance allows for user-generated recipes. A user may create a new recipe for the oven, for example, from scratch, from a recipe in another medium, or by modifying a recipe received from the cloud recipe store. The recipe may be compared to stored recipes, in terms of similar dishes, ingredients, heat models, sensor data and timing information and user feedback and converted into a user-generated recipe for the adaptive cooking appliance. The recipe is then available to the user through the oven, client application or recipe server as desired. In one embodiment, recipes on the user device may be sent to the cooking appliance over a wireless connection. The oven may then compile the recipe into cooking appliance commands for cooking. In one embodiment, the oven includes recipe compiler for providing basic recipe adjustments. In various embodiments, the cooking apparatus may include a "chef mode" providing the user with detailed control over the recipe generation and cooking appliance operation (e.g., allowing for selection of emitted wavelengths from heating elements or controlling allocation of available power resources during the cook).

The user-generated recipe may be further adjusted based on the user feedback and other user-specific information gathered during execution of the recipe as previously discussed herein, which may be updated each time the user executes the recipe. For example, after the edible substance is cooked in accordance with a user-generated recipe, the user may be prompted for feedback on whether the user liked the result ("Did you like the meal?") as well as feedback on specific changes that may be made to the recipe. In one embodiment, bad recipes (as determined by the user feedback) may be removed from the recipe storage, for example, by prompting whether the user desires to improve or remove a bad recipe.

In other embodiments, the cooking appliance may track various parameters before, during and after cooking such as heat and sensor data and user interactions during preparation and execution of the recipe. For example, temperature and timing are tracked, as well as how often the cooking appliance door is opened to check on the food, how often the user interacts with a user interface of the oven or user device, how often the edible substance is viewed on the application, and any user adjustments that are made during execution of the recipe and any additional user feedback provided after the cook. The cooking appliance events and user events may be used to update the recipe. In various embodiments, user-generated and conventional recipes, including data, adjustments and interactions received during cooking or feedback from a user, are compiled into a heating algorithm and cooking appliance commands for various cooking modes. For example, the cooking appliance may determine low stress and high speed cooking options for each recipe. The low stress and high speed self-curated recipes may be compiled using known food characterizations and cooking models (e.g., as stored in food characterization and recipe database 316 of FIG. 3), which include a range of acceptable cooking parameters, including cooking temperatures, time, sensor, and probe and image data for proper cooking in each of the available cooking modes. When cooking a meal, the user may be prompted by the user interface with an offer to cook the recipe using a low stress or high speed cooking mode.

Figure 9:
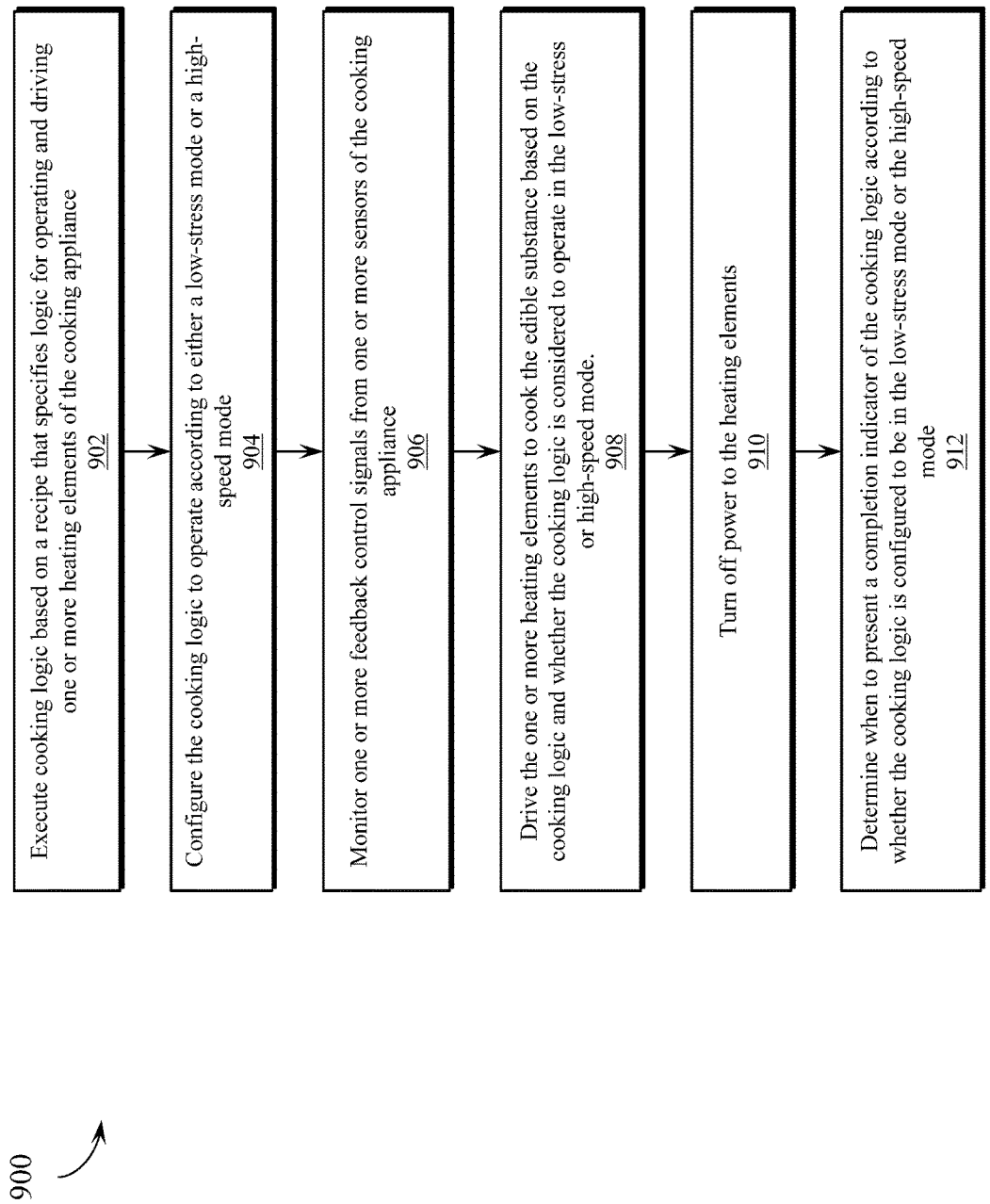
FIG. 9 is a flowchart illustrating a method of operating a cooking appliance to cook an edible substance in different modes, in accordance with various embodiments.

FIG. 9 is a flowchart illustrating a method 900 of operating a cooking appliance (e.g., the cooking appliance 100, the cooking appliance 200, the cooking appliance 300, and/or the cooking appliance 500A) to cook an edible substance in different modes, in accordance with various embodiments. At step 902, a computing device of the cooking appliance can be configured to execute a heat adjustment algorithm/process based on a recipe that specifies driving logic for operating one or more heating elements of the cooking appliance.

For example, the cooking logic can specify which of the heating elements to turn on (e.g., controlling the directionality of heating). For example, the recipe can dictate that heating elements from below a tray are turned on and heating elements from above the tray are turned off. In this example, the cooking appliance can be simulating a range top. In another example, each heating element can be driven independently (e.g., a heating element located at a front top location can be driven independently from a heating element at a back top location). The cooking appliance can heat up the edible substance in a number of ways. The cooking appliance can be configured to heat the edible substance directly. The cooking appliance can be configured to heat its internal chamber (e.g., its chamber walls and its tray) and let the radiant heat from its internal chamber to heat the edible substance. The cooking appliance can be configured to heat the internal chamber and the edible substance simultaneously. The heated air in the internal chamber can also heat up the edible substance. The cooking appliance can further be configured to provide airflow of heated air to cook the food as an impingement convection oven. At a lower airflow speed, the cooking appliance can be configured as a regular convection oven.

Because items (e.g., the edible substance, the air, the chamber walls, and the tray) inside the cooking appliance may each have one or more excitable wavelengths, by controlling the peak emission wavelengths of the heating elements, the computing device can specifically target different items to heat up. Because an item can have multiple excitable wavelengths, the computing device can select different peak emission wavelengths to control the cooking speed/efficiency provided by the heating elements.

At step 904, the computing device can configure the heat adjustment algorithm to operate according to either a low stress mode or a high speed mode. In one embodiment, available cooking modes are presented to the user through a user interface (e.g., User Interface Components 250 of FIG. 2). An exemplary user interface is illustrated in FIG. 14B, in which the user is prompted to select a low stress mode (e.g., a comfort mode) or a high speed mode. In some embodiments, the user may be provided additional information on the differences between the available cooking modes, including total cooking time and an estimated range of times at which the user should expect to remove the edible substance from the cooking appliance.

In some embodiments, the low stress cooking mode is configured with various safeguards to prevent overcooking, for example, by configuring the heating algorithm to turn off before overcooking, adaptively adjusting the cooking in response to feedback control signals to prevent overcooking, configuring the cooking algorithm with a relatively long window of time during which the user may remove the edible substance from the cooking appliance, and providing user completion indicators and other feedback to the user to prompt removal of the edible substance from the cooking appliance.

In conventional cooking methods, the internal temperature of the food typically continues to rise after the food is removed from the cooking apparatus (as heat continues to flow within the food). It is often desirable to allow the food to "rest" outside of the cooking apparatus for a period of time before it reaches the desired internal temperature (desired level of doneness), at which point the user may cut into it. In the "high speed" cooking mode, more energy is applied to the food in a short period of time to speed up the cooking, which results in the food continuing to heat up (more rapidly than it would if cooked using a conventional cooking method) after being removed from the oven. In the "low stress" mode, the cooking can be performed more slowly than in the high speed mode (but may still be faster than the conventional cooking methods) and which includes strategically applying energy in various amounts at various points in the cook to ensure that the internal temperature is close to the desired level of doneness when the food is removed from the oven, and the temperature rises relative slowly thereafter. This creates a much longer period of time after the cook during which the user can cut into the food and have it be at the desired internal temperature (desired level of doneness).

At step 906, the computing device can monitor one or more feedback control signals from one or more sensors of the cooking appliance. For example, the feedback control signals can include a temperature reading signal from a temperature probe, a feedback signal from a camera, or a combination thereof.

At step 908, the computing device can drive the one or more heating elements to cook the edible substance based on the recipe and whether the recipe is configured to operate in the low stress mode or the high speed mode. In some embodiments, the computing device can drive the one or more heating elements further based on the feedback control signals. In some embodiments, the computing device can calculate a projection (e.g., heating trajectory) of when to complete cooking and turn off the heating elements. In some embodiments, the control of the heating elements is dynamic (e.g., based on feedback control signals from the temperature probe or from the camera), and hence completion time is not yet known.

At step 910, the computing device can turn off power to the heating elements. At step 912, the computing device can determine when to present a completion indicator of the heat adjustment algorithm according to whether the recipe is configured to be in the low stress mode or the high speed mode. In some embodiments, the computing device can determine when to present the completion indicator based on the feedback control signals (e.g., when the searing is "visually" done according to an optical sensor or when the edible substance has reached a certain temperature for a certain period of time).

The high speed cooking process may include extraction of the edible substance from the cooking appliance when the completion indicator is presented (e.g., otherwise the edible substance will overcook). The low stress mode allows for the extraction to occur within a preset time range (e.g., from immediately to within 30 minutes or from immediately to within two to three hours). In various embodiments, the completion indicator is presented to a user through a user interface of the cooking appliance (e.g., User Interface Components 250 of FIG. 2) or through a user interface on a user device (e.g., User Device 280 of FIG. 2). Exemplary completion indication messages are illustrated in FIG. 14B, which include an instruction to remove the edible substance at a certain time to rest, an indication that the food is done, and a time until the edible substance is overdone.

Various embodiments of systems and processes for implementing resting control will now be described. Because the cooking appliance manages an entire cook, a food (typically a protein) rest guidance systems and methods are implemented. In operation, the cooking appliance would indicate that cooking (and all heating) have ended and that additional time will be used to rest the food so that the food achieves a higher-quality finish and the correct doneness. In other embodiments, the heating system might completely shut off and the food may begin and continue to rest in the cooking appliance without any indication that the food is resting. In those embodiments, there may only be an indication that the user will need to cut into the food during a certain duration of time (and the indication could come at any time, including when the heating system is active). In one embodiment, proteins may rest for 5 minutes in order to have the protein fibers relax and absorb the moisture that is partially lost through the cooking process. With light-based heating elements, the increase in the efficiency and health delivery accentuates the carryover cooking in certain circumstances. For example, it is not uncommon to see carryover cooking on the order of 15° compared to a conventional oven which may see a 5° climb under similar cooking conditions.

In some embodiments, a cooking appliance is configured to makes a first indication that cooking has stopped. The indication to the user may comprise an audible signal, visual cue, vibration-based notification or other method of notifying a user. The cooking appliance is further configured to generate a second indication to the user that indicates resting is complete.

In some embodiments, a progress indicator such as a graphical indicator or countdown timer (as illustrated, for example, in FIG. 14B) shows the user the current status of the meal and the time remaining. Additional computational algorithms can be involved which take account of the history of the food cook to compute the amount of time necessary for the rest. In other embodiments, the cook history is used to compute the cut off temperature and time so that the user always experiences the same number of resting minutes. For example, the cooking appliance can lock down the resting time to exactly 3 minutes by computing exactly when to shut off all heating.

In some embodiments, under the high speed mode, the cooking appliance can present the completion indicator when the computing device turns off the power to the heating elements. In some embodiments, under the low stress mode, the computing device can present the completion indicator a certain amount of time after the computing device turns off the power to the heating elements. For example, after the power to the heating elements is turned off, the tray and/or the chamber walls of the cooking appliance remains as radiant heat sources. The internal air is also still at a high temperature. Under the low stress mode, the computing device can simulate the radiant heat and the hot air using a computerized model to compute the heating trajectory of the edible substance. The computing device can present the completion indicator once the heating trajectory has reached a point where the radiant heat has died down sufficiently and the hot air has cooled such that they do not cause the edible substance to be overcooked or go stale even if the edible substance remains in the chamber for a preset range of time.

In some embodiments a recipe is provided using variable stress cooking. In one embodiment, a low stress recipe is provided to produce safe results with less monitoring. The low stress recipe is designed to be easy to prepare for a wide variety of users and can produce consistent results with less care and monitoring. In one embodiment, low stress cooking will adjust a heat algorithm to turn off after cooking and allow the food to remain in the oven. Using the low stress recipe, the oven will be configured to not overcook food. A fast cooking option provides high speed cooking, but may be susceptible to a greater degree of human error. For example, in one embodiment, high speed mode may require the user to remove the food after cooking to reduce the risk of overcooking. High speed cooking may include greater reliance on sensors such as probe, temperature sensors, optical camera and thermal cameras and analysis of data during cooking. Recipes can be adjusted for each mode including a heat model, heat trajectory model, and sensor and timing models.

A computing device (such as cooking engine) can be configured to control the peak emission wavelengths of the filament assemblies or other heating elements. For example, the computing device can be configured to identify a food profile associated with an edible substance from a database and determine one or more excitable wavelengths associated with the food profile. The computing device may be configured to emit at a peak emission wavelength corresponding to at least one of the excitable wavelengths to heat the edible substance.

In some embodiments, the cooking appliance may be configured for side-by-side cooking of two or more different edible substances, such as by controlling heating elements, including shields for certain portions of the cooking appliance. For example, the cooking appliance may independently control the heating elements that are above/below a first cooking zone and above/below a second cooking zone. This enables some control of side-by-side cooking in addition to direct radiant heating. Multi-zone cooking is also contemplated in the current disclosure and may be optimized through the same methods as discussed above. Zone cooking technology allows simultaneous cooking of different foods, even if they require different temperatures and times. In other embodiments, heating elements may be controlled for a double-decker cook, allowing simultaneous cooking of different foods on multiple oven levels, even if they require different temperatures and times.

Figure 10:
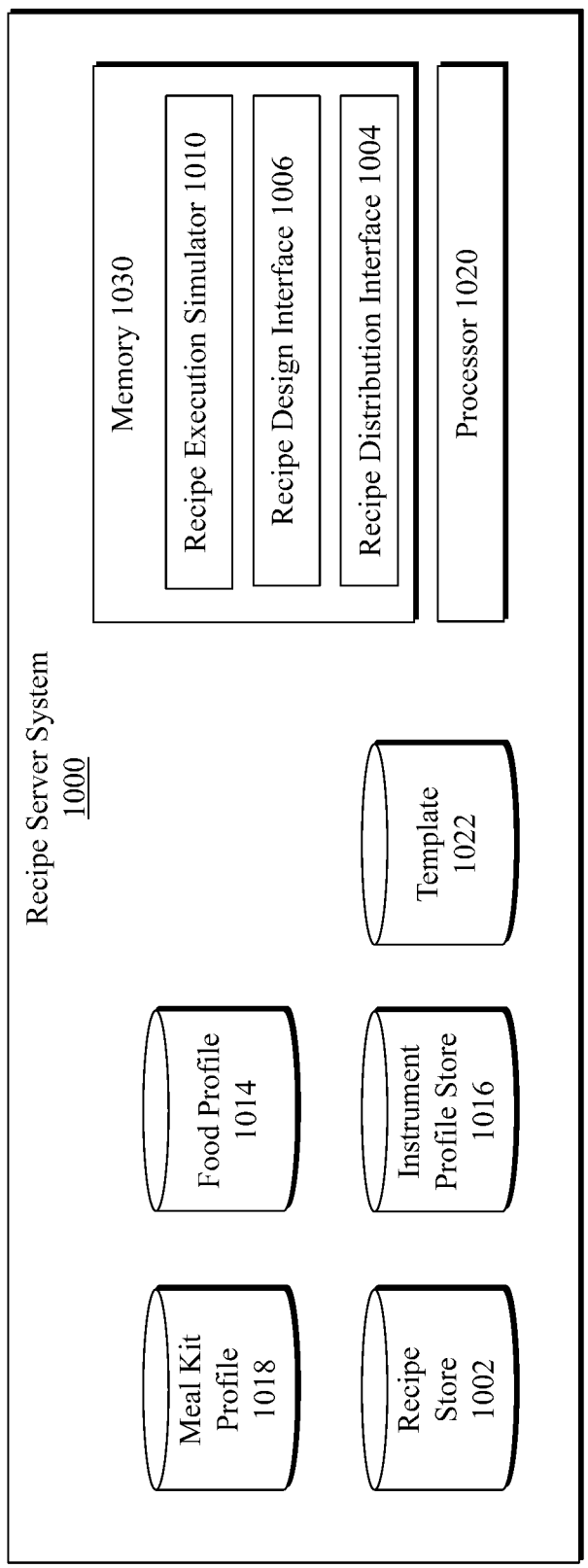
FIG. 10 is a block diagram of a server system that implements a cloud-based recipe store, in accordance with various embodiments.

FIG. 10 is a block diagram of a recipe server system 1000 that implements a cloud-based recipe store, in accordance with various embodiments. The server system 1000 can include a recipe store 1002, a recipe distribution interface 1004, a recipe design interface 1006, a recipe execution simulator 1010, a food profile database 1014, an instrument profile store 1016, a meal kit profile database 1018, a template database 1022, or any combination thereof. The recipe store 1002 stores one or more recipes. Each of the recipes can include one or more heating logic algorithms (e.g., heat adjustment algorithms). The recipe distribution interface 1004 can present and provide the content of the recipe store 1002 via a web interface or an application programming interface (API) for external devices to download. For example, a cooking appliance (e.g., the cooking appliance 110) can access the recipe distribution interface 1004 over a wide-area network, such as the Internet. In at least one example, a user can download a recipe and associated cooking logic onto a mobile device and then transfer the recipe and cooking logic to the cooking appliance. In at least one example, a user of the cooking appliance can download a recipe and cooking logic directly into the cooking appliance.

In various embodiments, the server system 1000 provides the recipe design interface 1006 to facilitate the design of the recipes in the recipe store 1002. When designing a recipe, the recipe designer can access the template database 1022 to copy a recipe template or a cooking logic template into the recipe. The server system 1000 can provide the recipe execution simulator 1010 to simulate the recipe from the recipe designer. The server system 1000 can generate one or more visuals (e.g., videos, charts, graphs, combinations thereof, etc.) to depict the transformation of a food target corresponding to the recipe. The server system 1000 can present the simulated transformation represented by the visual via the recipe design interface 1006. The simulation can result in a visual simulation and/or a temperature gradient simulation. The simulation can access a food profile database 1014 to determine how a unit amount of target food (e.g., referred to as a "food target") transforms visually in response to ambient or internal temperature change. The food profile database 1014 can also specify heating capacitance and conductance characteristics of a unit amount of target food to facilitate the simulation. The recipe execution simulator 1010 can thus provide feedback to the recipe designer to ensure that the recipe can work as intended in a cooking appliance.

The instrument profile store 1016 can store specifications of multiple versions or embodiments of the disclosed cooking appliance. In some embodiments, the designer can select from the instrument profile store 1016 to determine which version/embodiment of the disclosed cooking appliance can work with the specified cooking logic. In some embodiments, the recipe execution simulator 1010 can run the simulation based on one of the version/embodiment in the instrument profile store 1016.

The meal kit profile database 1018 can store package identifiers of one or more known meal kits/food packages. In some embodiments, logic of the recipe can refer to one or more of the package identifiers. This enables the designer to specify a change of tactic/logic based on a cooking appliance's recognition of a package identifier. In various embodiments, the database can include more detailed info about the meal kits, including physical properties (height/weight/dimension), exact type of food (e.g. species of fish), source of food (e.g. ranch where beef originated), etc.

In various embodiments, the heating logic may include timing and monitoring of cooking including monitoring heat, cooking time, probes and sensors, and camera feedback. The heating logic will include expected heat/time profile and sensor readouts. The heating logic may also include events, such as a temperature of a probe, a cooking time or detection through optical image analysis to further adjust the heating algorithm for next stage of cooking.

Figure 11:
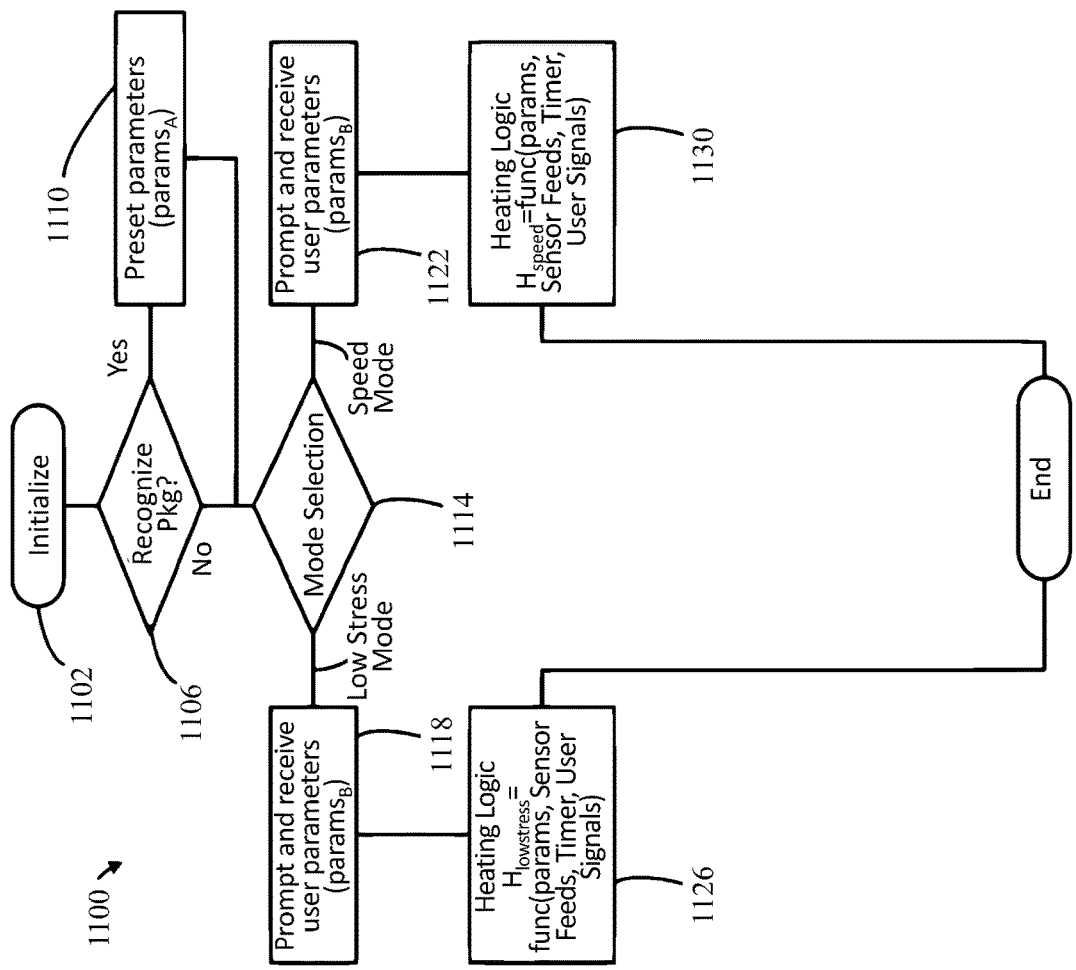
FIG. 11 is a control flow diagram illustrating an example of a recipe, in accordance with various embodiments.

FIG. 11 is a control flow diagram illustrating an example of a recipe 1100, in accordance with various embodiments. The recipe 1100 can be a set of instructions (e.g., electronic and/or computer-readable instructions) adapted to configure a cooking appliance to process a target food type. In various embodiments, the recipe may be configured to provide instructions for cooking multiple items in different zones, instructions for cooking multiple items on different trays, acceleration of traditional cooks, meal kit recipes or for other cooking options.

A cooking appliance (e.g., the cooking appliance 110) can download the recipe 1100 from a server system (e.g., the server system 1000) and execute the cooking logic. The recipe 1100 can include cooking logic (e.g., a heat adjustment algorithm) and instructions to configure the cooking logic. For example, at step 1102, the cooking appliance can initialize the recipe 1100. At step 1106, the cooking appliance determines whether it recognizes a meal package (e.g., the cooking appliance can utilize its camera to scan for a package identifier or prompt a user of the cooking appliance to enter a package identifier). At step 1110, responsive to recognizing the meal package (e.g., a package corresponding to an entry in the meal kit profile database 1118), the cooking appliance configures a set of cooking logic preset parameters corresponding to the recognized package identifier. For example, the cooking appliance can access (e.g., locally or over a network) a meal kit profile database to identify the corresponding set of cooking logic preset parameters. In this example, regardless of whether the meal package is recognized, the cooking appliance can proceed to step 1114.

In other embodiments, the cooking appliance may be configured to identify other cooking conditions such as multi-zone cooking, accelerated cooking, multi-level cooking and multi-tray cooking.

At step 1114, the cooking appliance selects an operational mode that a user of the cooking appliance prefers and makes other user-specific adjustments as appropriate. For example, the cooking appliance can prompt the user to enter a mode selection via its touchscreen, its one or more buttons, or a mobile device connected to the cooking appliance. At step 1118, responsive to selecting a first mode (e.g., the low stress mode), the cooking appliance can prompt for (e.g., the user) and receive cooking logic user parameters relevant to the first mode. Similarly, at step 1122, responsive to selecting a second mode (e.g., the high speed mode), the cooking appliance can prompt for and receive cooking logic user parameters relevant to the second mode. When the first mode is selected, the cooking appliance can execute, at step 1126, cooking logic, including a heat adjustment algorithm/heating logic of the recipe 1100 associated with the first mode (e.g., referred to as "heating logic A"). When the second mode is selected, the cooking appliance can execute, at step 1130, cooking logic, including a heat adjustment algorithm/heating logic of the recipe 1100 associated with the second mode (e.g., referred to as "heating logic B").

The cooking logic parameters can be a function of the cooking logic user parameters specified at step 1118, the cooking logic preset parameters at step 1110 (if any), one or more sensor feeds, a timer, one or more user signals, or any combination thereof. Similarly, additional cooking logic parameters can be a function of the cooking logic user parameters specified at step 1122, the cooking logic reset parameters at step 1110 (if any), one or more sensor feeds, a timer, one or more user signals or any combination thereof.

In some embodiments, a state machine can represent a heating logic sequence. For example, the recipe can include multiple cooking logic sequences. At least some of the cooking logic sequences can be alternatives of each another. For example, the recipe 1300 can dictate the basic settings of the state machine. State machine can be further configured by the cooking logic preset parameters and/or the cooking logic user parameters. Based on these settings, the state machine can configure components of the cooking appliance differently according to a current state of operation. For example, the state machine can specify heating element configuration (e.g., of one or more heating elements) based on the current state of operation. The sensor feeds, the timer, and/or the user signals of the cooking appliance can be the input signals to the state machine. A cooking logic sequence can dictate whether changes to the input signals can change the current state of operation. The recipe 1100 can specify heating element configuration (e.g., of one or more heating elements) based on the current state of operation. In some embodiments, one of the states is a termination state. Once a termination state is reached, the cooking appliance can notify (e.g., via an output component) a user that the content in the cooking appliance is ready. When designing a recipe, the designer can block access to any of the above steps. For example, the designer can skip step 1114 and force a cooking appliance to operate only in the low stress mode or only in the high speed mode.

Figure 12:
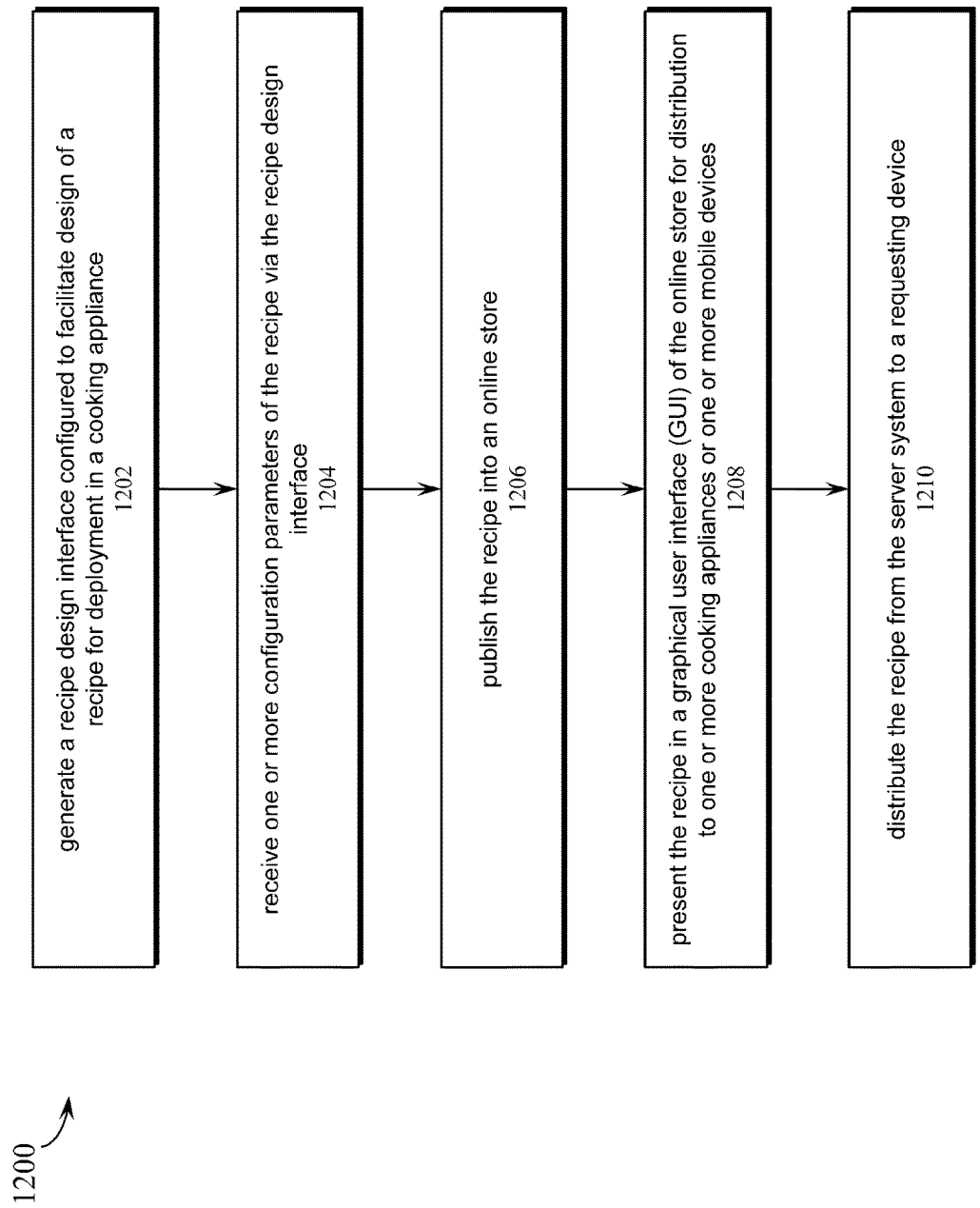
FIG. 12 is a flow diagram illustrating a method of operating a server system that implements a cloud-based recipe store, in accordance with various embodiments.

FIG. 12 is a flow diagram illustrating a method 1200 of operating a server system (e.g., the server system 1000) that implements a cloud-based recipe store, in accordance with various embodiments. At step 1202, the server system can generate a recipe design interface (e.g., the recipe design interface 1006) configured to facilitate design of a recipe for deployment in a cooking appliance (e.g., the cooking appliance 110). In various embodiments, a recipe design interface may be implemented on the cooking appliance itself through a "chef mode" interface for creating user-generated recipes. In some embodiments, the recipe design interface has an integrated developer environment (IDE) for inputting the cooking logic. The IDE can enforce a format convention for specifying the cooking logic. The recipe design interface can provide access to a recipe execution simulator (e.g., the recipe execution simulator 1010). The recipe execution simulator can compute a simulation of the recipe against a known food profile (e.g., from the food profile database 1014). For example, the simulation can include a visual depiction (e.g., a chart or a graph) of a food target undergoing transformation according to the cooking logic and/or a visual depiction of temperature progression of the food target or parts of the cooking appliance. The recipe execution simulator can then present the simulation via the recipe design interface. The known food profile can specify how a food target transforms visually in response to ambient or internal temperature change, and the heat capacity and conductance characteristics of a unit amount of the food target.

The recipe design interface can provide access to one or more cooking logic templates (e.g., in the template database 1022). A cooking logic template can be configurable as the cooking logic. A cooking logic template can be inheritable. For example, when the cooking logic inherits from the cooking logic template, the cooking logic template can serve as a basis for the cooking logic that prompts the designer to fill-in subroutines required by the cooking logic template. For example, a cooking logic template can provide the basic logic to emulate a conventional cooking appliance (e.g., a range, a grill, a nichrome oven, etc.), and allow a designer to specify parameters intended for the conventional cooking appliance. The cooking logic template can then translate the parameters intended for the conventional cooking appliance into heating element configurations for one of the disclosed cooking appliance (e.g., the cooking appliance 110). A cooking logic template can be imported into the cooking logic as a subroutine of the cooking logic.

At step 1204, the server system can receive one or more configuration parameters of the recipe via the recipe design interface. The recipe can include one or more cooking logic sequences. For example, a cooking logic sequence can be represented as a state machine (e.g., deterministic finite automaton or a workflow). The state machine can be defined by at least an initial state, a completion state, a state transition function, an output function, an input symbol set (e.g., possible inputs), and an output symbol set (e.g., possible outputs). In one example, an input can be a sensor feed value within a preset range. In another example, an output can be a filament driver parameter associated with a heating element for configuring the heating element after transitioning into a specific state of operation.

The configuration parameters can include an available state in the state machine. The configuration parameters can include a user instruction associated with the state. The user instruction is configured to be displayed in the cooking appliance or a mobile device connected to the cooking appliance. The configuration parameters can include a heating element configuration associated with the state. In some examples, the heating element configuration is specified as a filament driver parameter (e.g., wavelength, amplitude, signal pattern, power, duty cycle, etc.) and a heating element selection (e.g., which heating element to use). In some examples, the heating element configuration is specified as a target temperature, a target spatial region (e.g., cooking depth and position relative to a chamber of the cooking appliance), a target material (e.g., food, tray, chamber wall, perforated sheet, or air), an instrument emulation mode, or any combination thereof.

The configuration parameters can also specify a state change condition associated with a state. The state change condition is a conditional trigger that specifies when to change a current state of operation and to which state to change to. The state change condition can be a function of one or more sensor feeds, one or more timers, one or more user signals, or any combination thereof. For example, the sensor feeds can include a temperature probe inserted into a food target, a temperature sensor in the cooking appliance, a camera in the cooking appliance, or any combination thereof. The user signals can be from a mobile device connected to the cooking appliance, an input button of the cooking appliance, a touchscreen of the cooking appliance, other input component of the cooking appliance, or any combination thereof.

In some embodiments, the server system can cross-check the configuration parameters entered by the recipe designer for errors. For example, the server system can detect (e.g., through simulation or pattern recognition of known problematic logic) a potential error or hazard associated with the recipe or the heating logic. The server system can then present the potential error or hazard via the recipe design interface to notify the recipe designer.

In various embodiments, the configuration parameters may be pre-populated with parameters from an existing recipe stored in the database, allowing the user to modify existing recipes available to the cooking appliance, including recipes generated by other users. For example, a user may identify another user's recipe, the server system can import the parameters into the recipe design interface, and then configure the recipe as desired to change ingredients, preparation instructions, cooking modes, times and temperatures and other recipe parameters.

At step 1206, the server system can publish the recipe into an online store (e.g., the recipe store). In some embodiments, the server system provides version control of the recipe. In these embodiments, the server system can maintain multiple versions of the recipe (e.g., at least some of these versions are published). After the publication of the recipe, at step 1208, the server system can present the recipe in a graphical user interface (GUI) (e.g., the recipe distribution interface 1004) of the online store for distribution to one or more cooking appliances or one or more mobile devices. Each of the mobile devices can include an application capable of communicating with a cooking appliance.

At step 1210, the server system can distribute the recipe from the server system to a requesting device (e.g., a device that selects a recipe to download). In some embodiments, prior to distributing the recipe, the server system can configure the recipe with a digital rights management (DRM) mechanism to prevent further unauthorized distribution of the recipe after said distributing to the requesting device.

Figure 13:
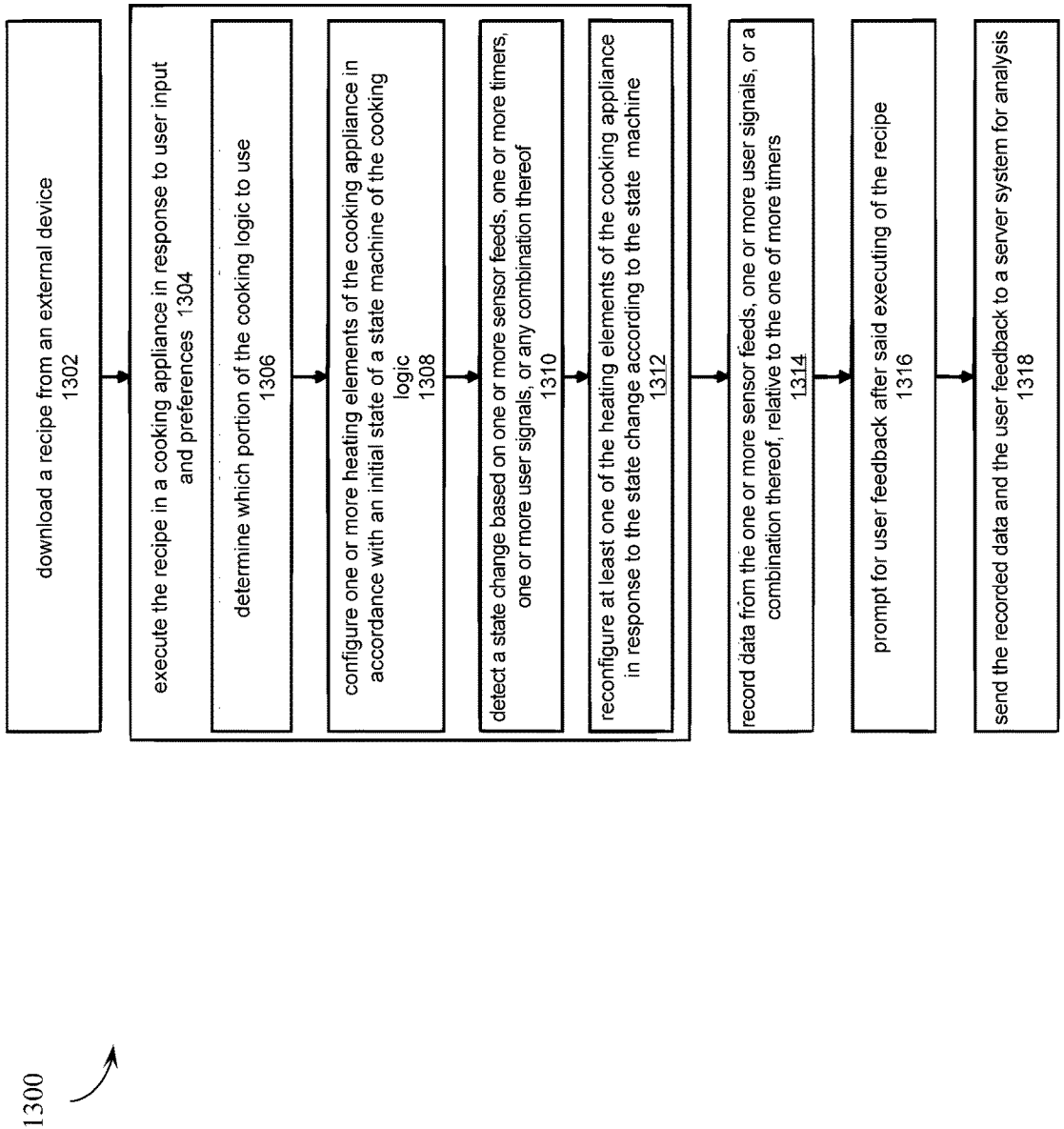
FIG. 13 is a flow diagram illustrating a method of configuring a cooking appliance with a recipe, in accordance with various embodiments.

FIG. 13 is a flow diagram illustrating a method 1300 of configuring a cooking appliance (e.g., the cooking appliance 110) with a recipe, in accordance with various embodiments. At step 1302, the cooking appliance can download a recipe from an external device. For example, the external device can be a server system (e.g., the server system 1000), a mobile device, or a portable memory device. The external device can be connected via a wireless network, a physical port of the cooking appliance, or a peer to peer connection established by the cooking appliance.

At step 1304, the cooking appliance can execute the recipe and associated cooking logic in the cooking appliance in response to a user input and other user-related parameters. For example, the cooking appliance can detect placement of food into the cooking appliance. The cooking appliance can execute the cooking logic in response to detecting the placement of food. For example, the cooking appliance can detect the placement of food by a camera in the cooking appliance, a weight sensor, a temperature probe connected to the cooking appliance, a mechanical connection sensor of a door of the cooking appliance, or any combination thereof. The cooking appliance can also adapt the cooking logic to user-related information, such as preferences entered by the user of learned by the cooking appliance based on prior user activity. For example, if a user selects a level of doneness (e.g., medium rare) but provides feedback to the cooking appliance after the cook indicating that the user desired a different outcome (e.g., feedback through a user interface that the recipe was overcooked; manually instructing the cooking appliance to cook a meat for a longer period of time) then the cooking appliance can adjust the cooking logic to automatically provide the user with the desired result.

The cooking logic can include one or more heating logic sequences represented as state machines. The recipe and cooking logic can be the recipe designed and published in the method 1100. At sub-step 1306, in response to executing the cooking logic, the cooking appliance can determine which portion of the cooking logic specified in the recipe to use. For example, the recipe can specify one or more meal kit package identifiers associated with one or more cooking logic sequences. The cooking appliance can detect, via a camera of the cooking appliance, an optical label of the food target in the cooking appliance. The cooking appliance can match the optical label against the meal kit package identifiers (if any) to select a corresponding cooking logic sequence (e.g., with a corresponding state machine). The cooking appliance can execute the corresponding cooking logic sequence. In various embodiments, the optical label may include a barcode, a Quick Response (QR) code or other optical code that identifies an associated recipe from the meal kit or cloud recipe store, which may include a heating algorithm, recipe instructions, interactive user prompts for recipe options, and other recipe related information.

In one embodiment, the full recipe is encoded on the optical label and uploaded directly to the cooking appliance when it reads the optical label. For example, a user may create a recipe using the cooking appliance, and print out the recipe on a sheet of paper (e.g., using an application on a user device) for sharing with family and friends, including a printed optical code that includes the full recipe (e.g., food preparation instructions and heating algorithm for execution by the cooking appliance). A recipient of the printed recipe may have the optical code scanned by the recipient's cooking appliance to read the recipe from the optical label, allowing the cooking appliance to cook the meal as instructed in the recipe. By encoding recipes in an optical label, the cooking appliance may upload and store new recipes without needing to access a communications network or remote device (e.g., recipe database 140).

The recipe can specify two or more operation modes and two or more cooking logic sequences associated with the operation modes. For example, the operation modes can include a low stress mode and a high speed mode. The high speed mode requires an operating user of the cooking appliance to extract a food target from the cooking appliance at a specific time determined by the cooking logic sequence. The low stress mode corresponds to a cooking logic sequence that enables a range of time during which the operating user can extract the food target without overcooking or undercooking the food target.

In some embodiments, the cooking logic can specify an exception catching logic that monitors one or more sensor feeds, one or more user signals, one or more timers, or any combination thereof, to determine whether an unexpected event has occurred during said executing of the recipe. The cooking appliance can execute the exception catching logic to recover from the unexpected event.

In some embodiments, the recipe specifies one or more heating logic configuration parameters to retrieve from an operating user. In these embodiments, when executing the recipe, the cooking appliance can prompt, via an output component or a network interface of the cooking appliance, the operating user to enter the heating logic configuration parameters. The cooking appliance can receive, via an input component or the network interface, user input associated with the heating logic configuration parameters.

At sub-step 1308, the cooking appliance can configure one or more heating elements of the cooking appliance in accordance with an initial state of the state machine. At sub-step 1310, the cooking appliance can detect a state change based on one or more sensor feeds, one or more timers, one or more user signals, or any combination thereof. At sub-step 1312, the cooking appliance can reconfigure at least one of the heating elements of the cooking appliance in response to the state change according to the state machine. In some embodiments, the cooking appliance can reconfigure the heating elements based on the exception catching logic to recover from the unexpected event.

During said executing of the recipe, at step 1314, the cooking appliance can record data from one or more sensor feeds, one or more user signals, or any combination thereof, relative to the one or more timers. At step 1316, the cooking appliance can prompt for user feedback after said executing of the recipe. At step 1318, the cooking appliance can send the tracked sensor data and user-specific data, including the user feedback and other user-related data determined by the cooking appliance, to a server system for analysis. In various embodiments, the cooking appliance can also (or alternatively) maintain and analyze user-specific information.

Figure 14A:
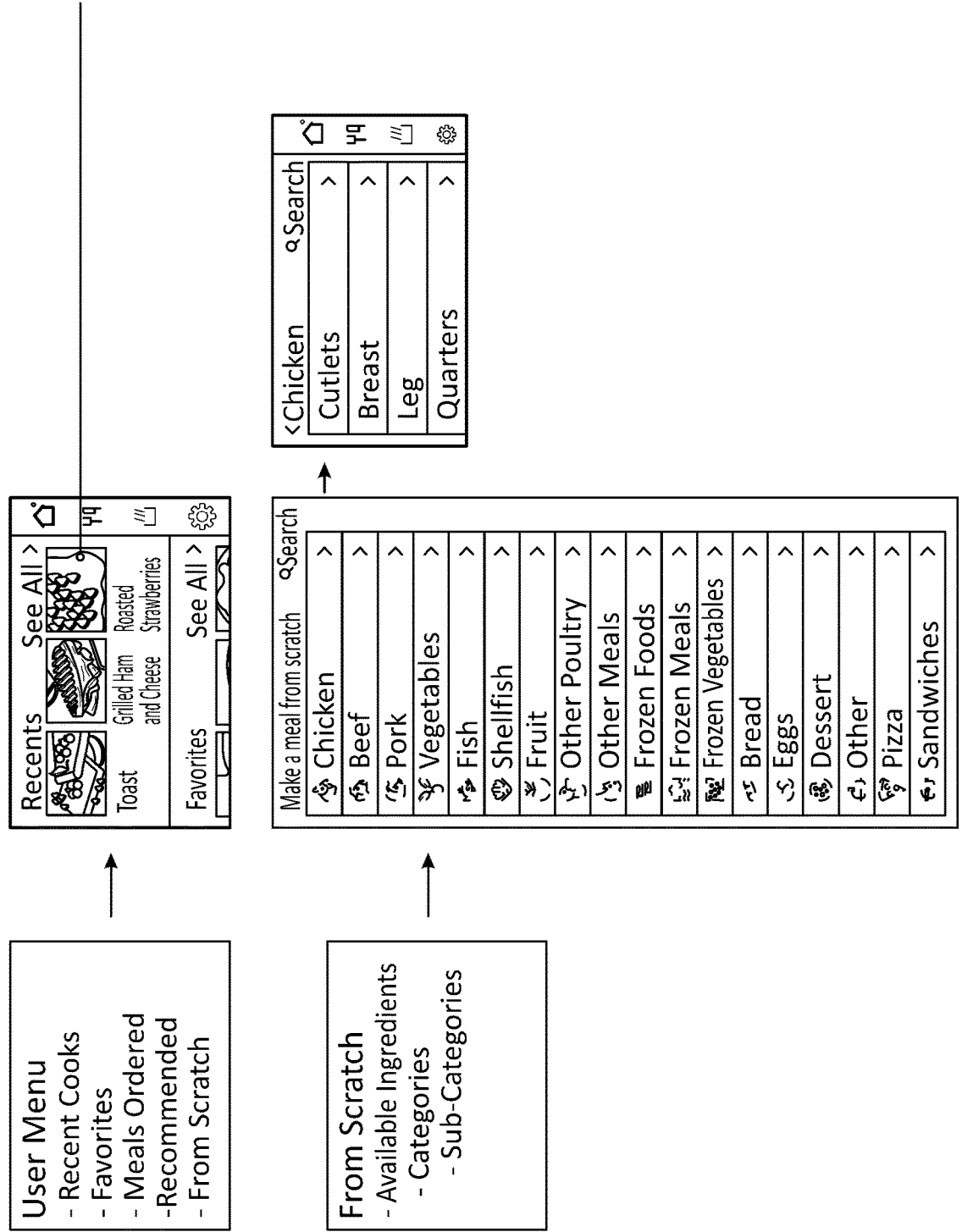
FIGS. 14A-14F illustrates an exemplary oven user interface, in accordance with various embodiments.
Figure 14B:
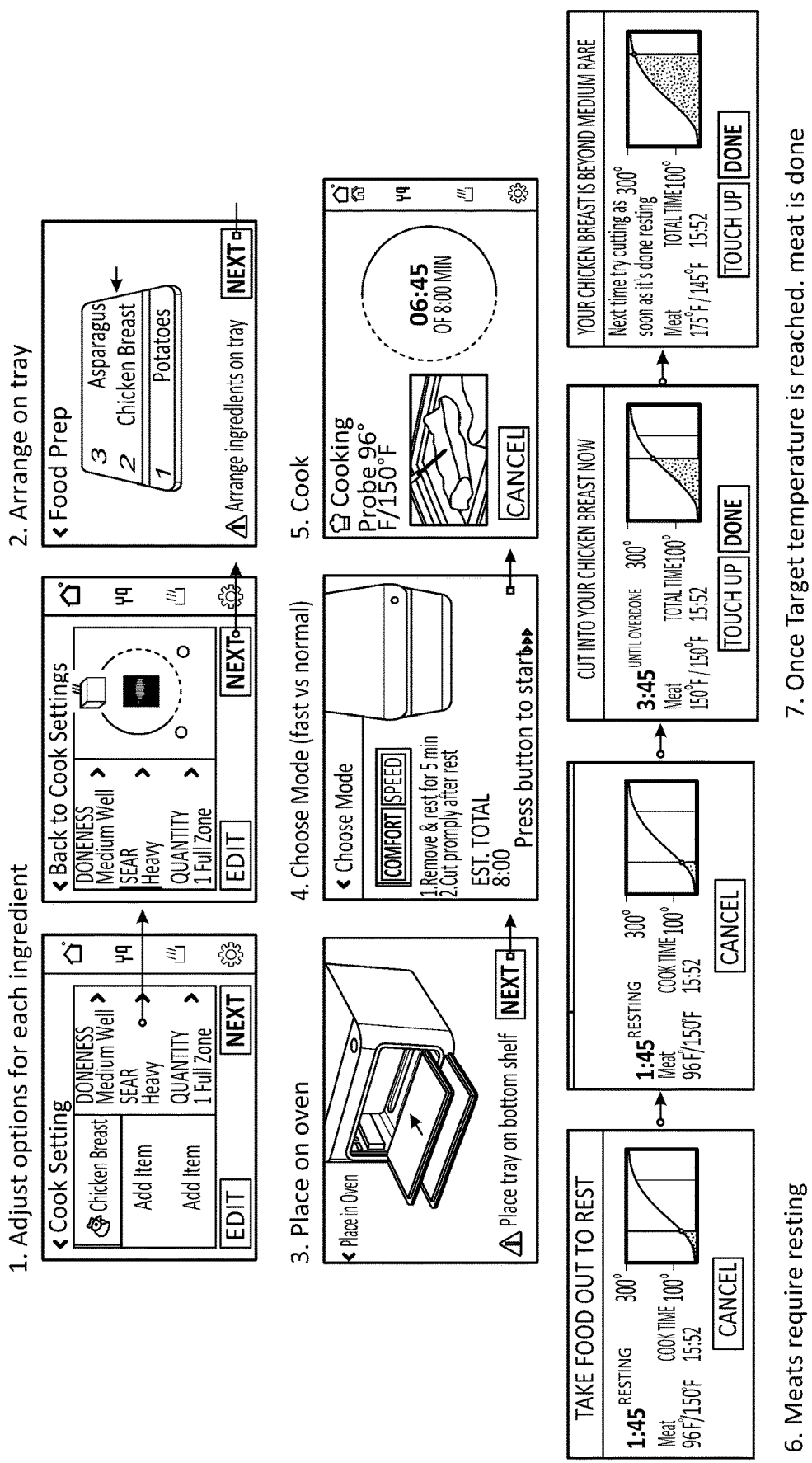

FIGS. 14A-14E illustrate an exemplary oven user interface, in accordance with various embodiments. Referring to FIG. 14A, an oven user interface may include options to display predetermined recipes or prepare a new recipe from scratch. Preexisting recipes may include, for example, recent cooks stored in a memory of the oven, an identification of favorite recipes identified by the use, or recipes associated with meals ordered from vendors (e.g., through a subscription service). In one embodiment, the oven user interface steps a user through the creation of a recipe from scratch, such as by providing the user with categories and subcategories of available ingredients. In various embodiments, the recipe may include oven operating instructions (e.g., temperature, cooking time, etc.), or the oven may generate oven operating instructions from the recipe.

Referring to FIG. 14B, an exemplary user interface for implementing a cooking process is illustrated, in accordance with various embodiments. As illustrated, the user interface walks the user through the cooking process. The user may adjust options for each ingredient, which allows the user to modify the recipe in accordance with user preferences or in accordance with constraints of the ingredients or cooking instruments available to the user.

Next the user interface guides the user through arrangement of the food on the tray and placement of the meal in the oven. In various embodiments, the tray can be made of glass or other material that includes an optically transparent region enabling visible light to substantially travel through two opposing surfaces of the tray. The tray may be used with instructions to aid the user in the preparing the food according to the recipe. For example, a meal kit may include a meal preparation instruction sheet that indicates a desired location for placing the edible substance(s) on the tray. The user of the cooking appliance can place the meal kit instruction sheet beneath the glass tray while arranging the edible substance(s) received from the meal kit on the tray as indicated on the instruction sheet. In some embodiments, the user can directly overlay specific edible substance(s) at desired location(s) as illustrated on the meal kit instruction sheet. In alternate embodiments, instructions may be presented to the user through the user interface that includes an image of the tray with labeled zones and an animation of food being placed at desired locations within those zones.

In various embodiments, the user may select between a normal cooking mode and a fast cooking mode. The user interface displays feedback and status information to the user during cooking and a resting or cool down period and notifies the user when the meal is done.

Figure 14C:
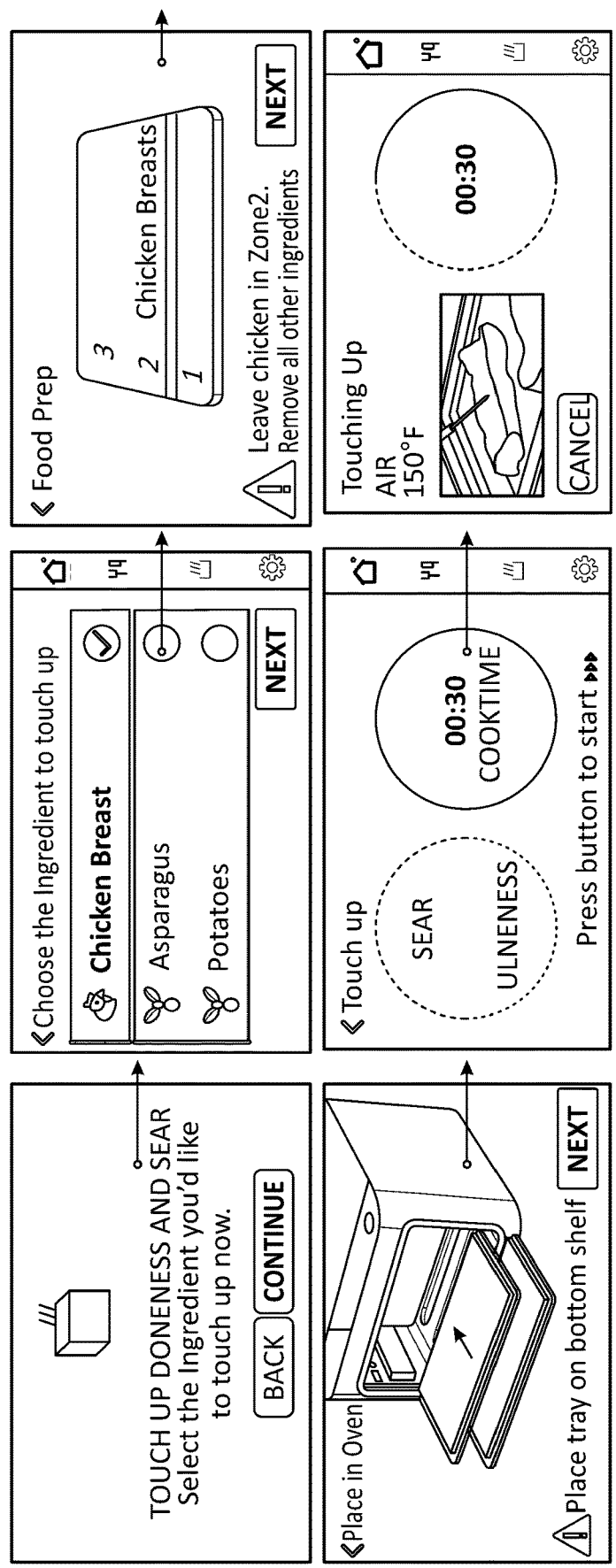

Referring to FIG. 14C, in various embodiments the user may instruct the oven to perform additional cooking operations in accordance with user preferences. For example, the user may be presented with a "touch up" option allowing the user to increase the sear or doneness of the meal. In one embodiment, as illustrated in FIG. 14C, the user may select one or more ingredients for additional cooking (e.g., by presenting the user through a user interface with a list of ingredients in the recipe). The computing device of the cooking appliance may then provide the user with instructions on suggested food modifications (e.g., remove all ingredients from tray except the items that require more cooking) and placement of the items to be further cooked within the oven. The user may also indicate a type of heating algorithm to apply (e.g., sear or doneness) and a level of doneness (e.g., a time or end result). In one embodiment, the user feedback is tracked and associated data is stored with the recipe to automatically perfect the sear or doneness when the recipe is executed in the future.

Figure 14D:
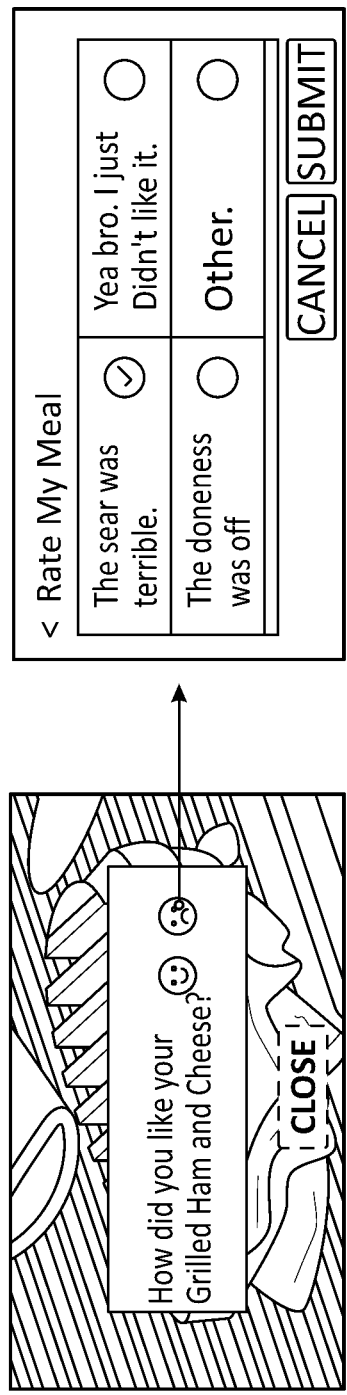

The user may then provide feedback to the oven as illustrated, for example, in FIG. 14D. The feedback may be used in various embodiments to adjust the recipe in accordance with user preferences for future meal preparation. In some embodiments, the computing system of the cooking appliance tracks the user interactions (e.g., touch up interactions to increase the sear or doneness) and user feedback and adjusts the stored recipe to achieve the user's desired result in future implementations of the recipe. As illustrated in FIG. 14D, the user feedback may include a "like" or "dislike" input, with further prompts requesting additional feedback regarding why the recipe was liked or disliked (e.g., "sear was terrible," "doneness was off," "just didn't like it"). In response to the user feedback, the computing system may implement solutions to address the user's feedback. For example, the next time the user selects the recipe, the computing system may suggest recipe adjustments to address the user feedback concerns or suggest an alternate recipe from the cloud recipe store (e.g., based on similar feedback from other users). In some embodiments, the user feedback on a recipe downloaded from the cloud recipe store (or other recipe server) is combined with feedback from other users to give the recipe a community user rating, resulting in a ranking or identification of highly and lowly rated recipes in the cloud recipe store. The cloud recipe server may prominently feature highly rated recipes to users, while deemphasizing poorly rated recipes.

In some embodiments, the user feedback is used to assist the user in generating self-curated recipes, by tracking and implementing user selected recipe changes and suggesting recipe changes from a recipe knowledge based (e.g., the cloud recipe server). The ability of a cooking appliance to adjust to user feedback increases user satisfaction with the oven and the confidence of an unskilled user in preparing complex meals. The user feedback may also be used to generate community consensus about a recipe from a recipe server such that highly rated recipes are prominently displayed to users over lower rated recipes.

Figure 14E:
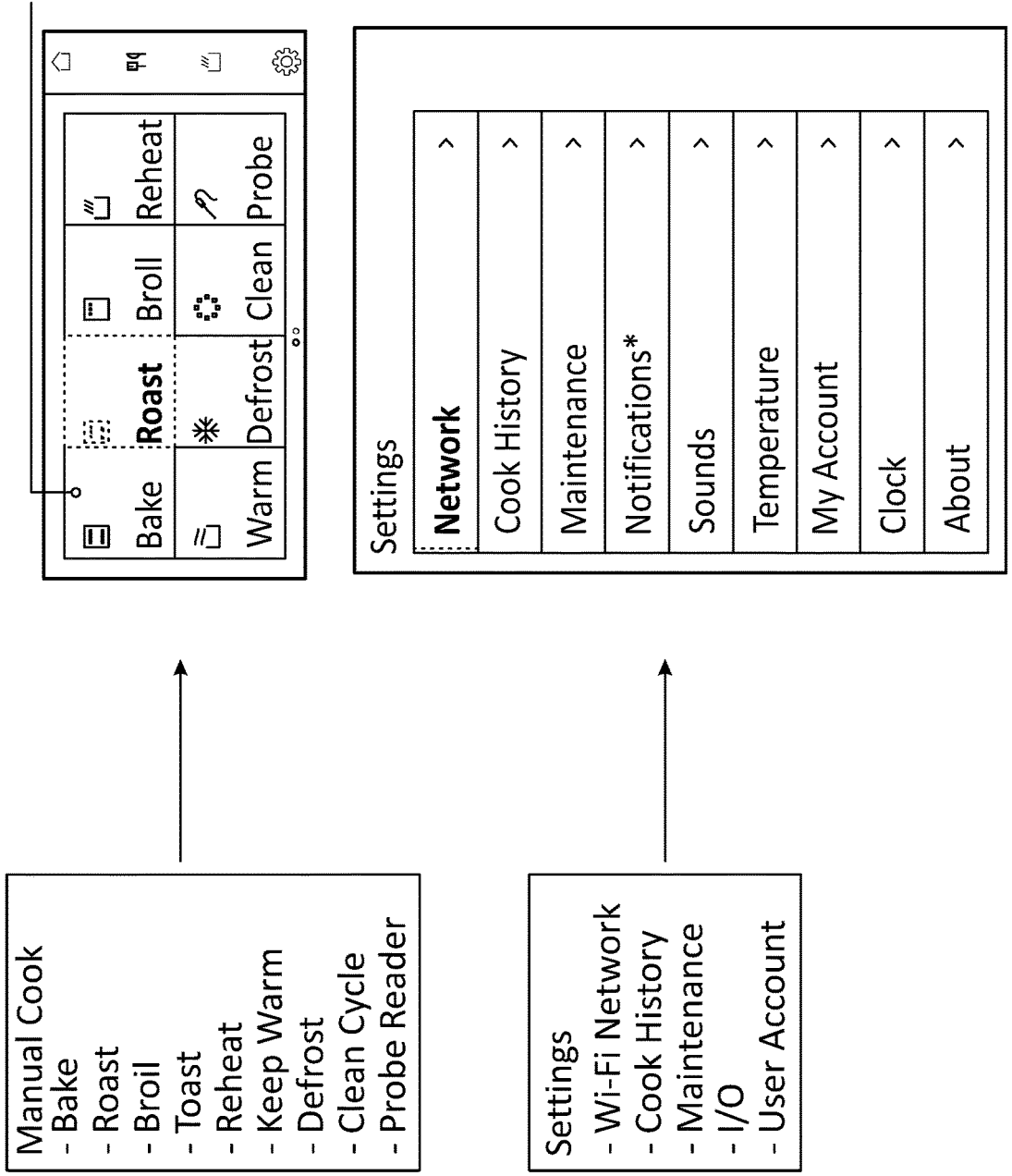
Figure 14F:
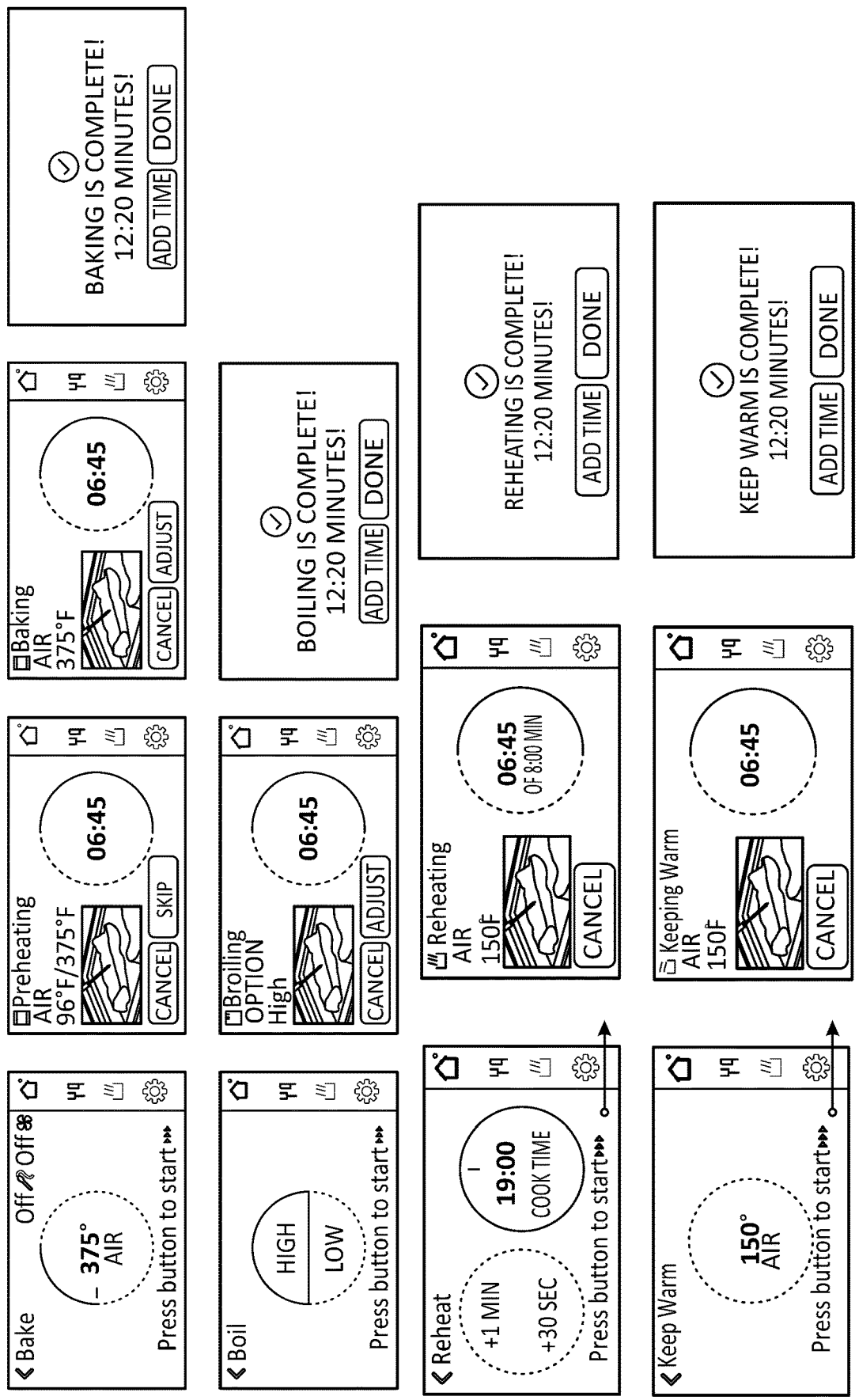

Referring to FIG. 14E, the oven user interface may include additional options, such a manual cooking option and oven settings adjustment. The manual cook option may include cooking options used for various types of ovens, for example, options to instruct the oven to bake, roast, broil, toast, reheat, keep warm and defrost food. Exemplary displays for baking, broiling, reheating and keeping food warm are illustrated in FIG. 14F. In various embodiments, the oven settings may include options such as Wi-Fi network connections, cook history, maintenance, input/output controls (e.g., sounds, display options) and user account information.

Figure 15A:
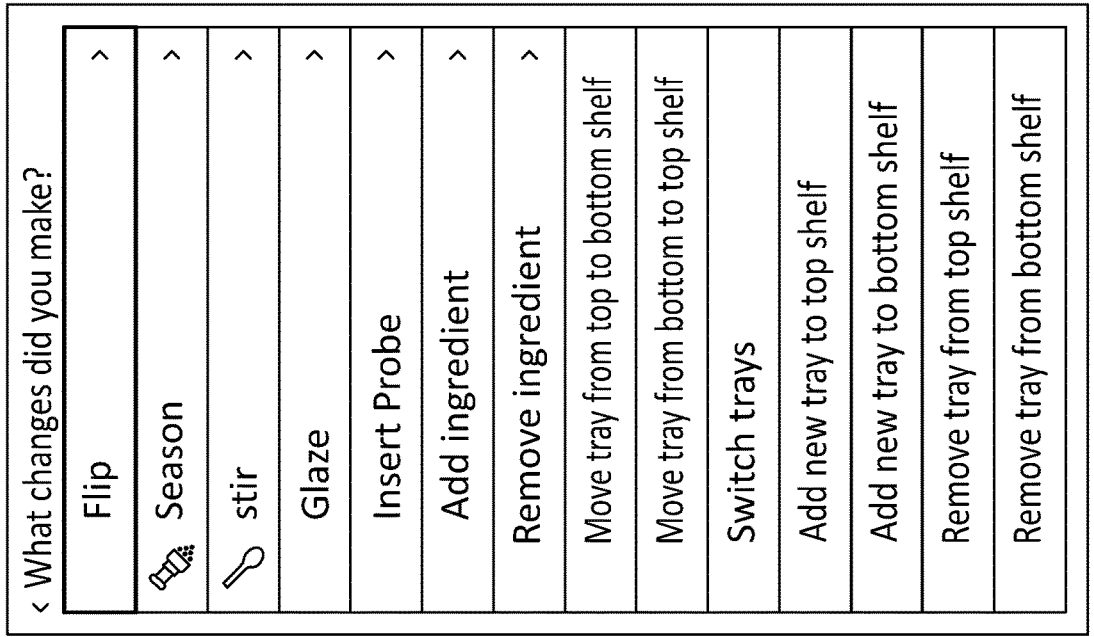
FIGS. 15A-C are example screenshots illustrating a "chef mode", in accordance with various embodiments.
Figure 15A:
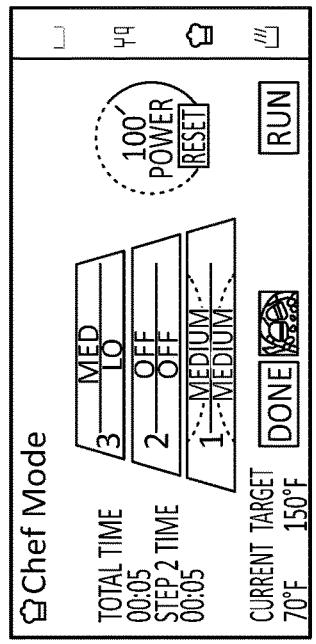
Figure 15A:
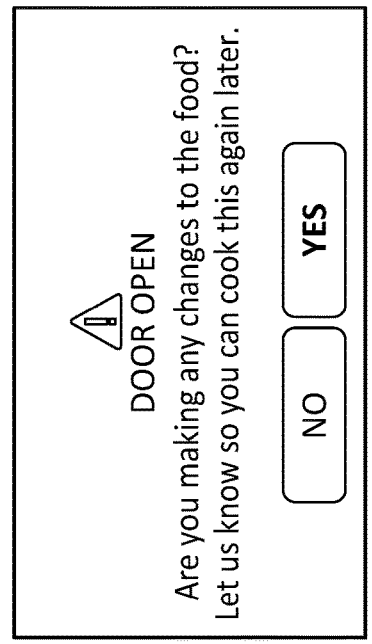
Figure 15A:
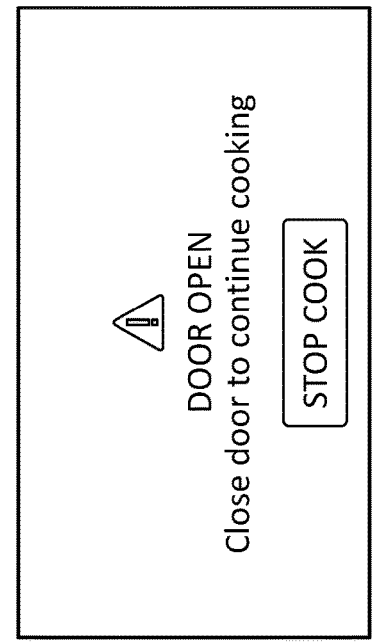
Figure 15B:
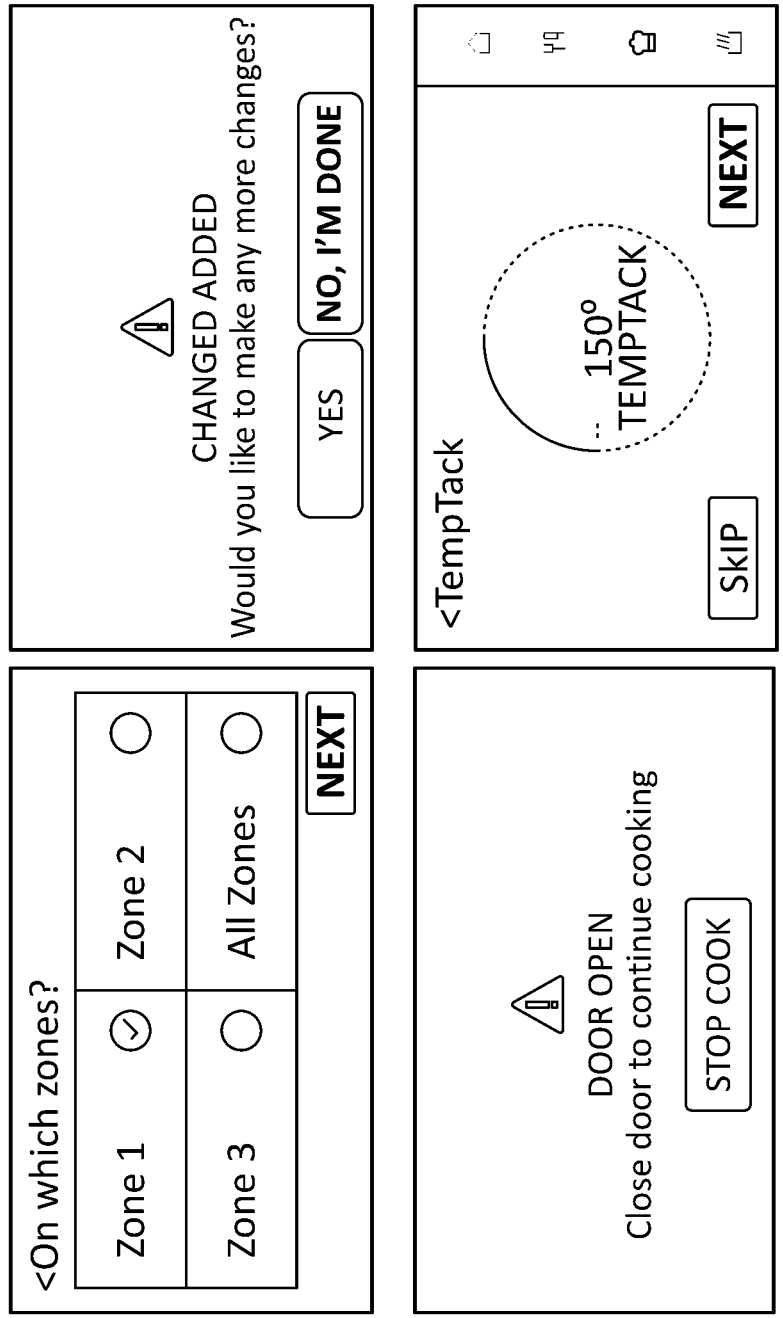
Figure 15C:
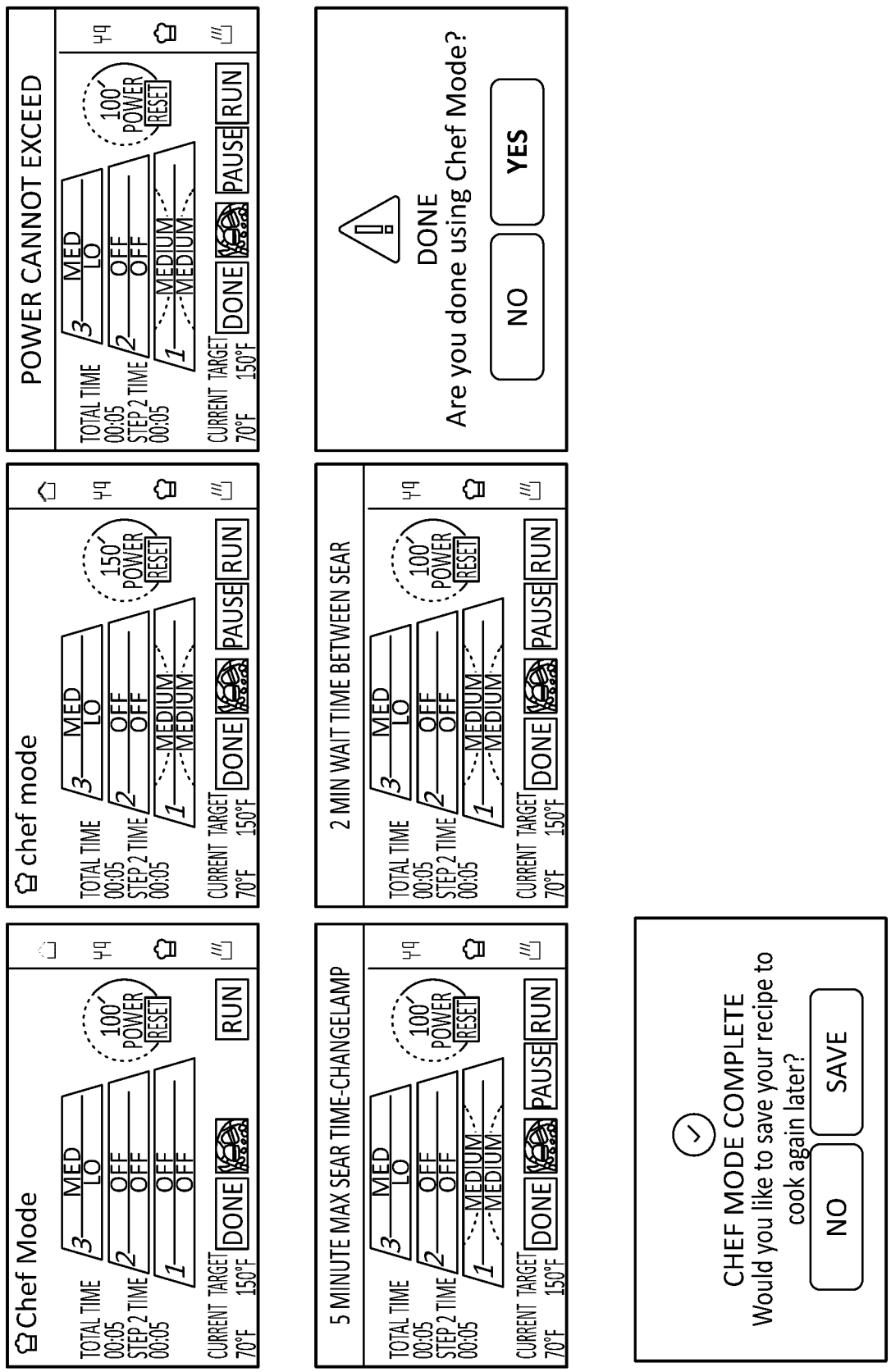

Referring to FIGS. 15A-C, an embodiment of a user interface for selecting heating elements and wavelengths will now be described. In various embodiments, each of the heating elements can separately reach the full power that the power source (e.g., a wall outlet) can provide, and the cooking appliance includes power control systems and/or processes to modulate the power draw such that the total power that is drawn from all heaters doesn't exceed the total amount of power that the power source can provide. The maximum amount of power available to the power source may be a function of maximum amount of current that can be drawn (e.g., in a residential 120 V outlet in the United States). Further, there is a correlation between the power drawn by each individual heating element and the wavelength of light produced. More power to a heating element produces shorter wavelength.

In some embodiments, certain advanced user interface components, such as power control components, may be accessed through a "chef mode" that provides a flexible user interface for creating user-generated recipes. The "chef mode" may include one or more budget indicators for allocating system resources, which indicator may indicate the maximum available amount, or budget, of one or more system resources, such as power budget, current budget, total energy budget, and/or average power budget. In some embodiments, the user (e.g., an experienced chef) may desire to heat food with relatively gentle heat from longer infrared wavelength, and the cooking engine/power control algorithm would operate the heating elements at a low duty cycle with a low cycle period. In other words, fractions of a second pulses spaced seconds apart. In some cases, the pulses may be millisecond sized pulses spaced hundreds of milliseconds apart.

If it is desirable to hit an edible substance with a relatively short wavelength, but not with a high power density, then an appropriate control algorithm may apply short bursts of full power (short wavelength) of several seconds each but spaced out at longer intervals to maintain the average power draw within an available range (i.e., relatively low duty cycle with a large cycle period).

Referring to FIGS. 15A-C, in some embodiments the cooking zones are illustrated graphically to the user through the user interface, mobile app or other device. The cooking zones may further include a graph indicating the total power budget (or other budgets, if any, used by the system). When the power budget is exceeded, the settings may either be automatically edited or the user can be notified that a change is necessary to rebalance the power budget again. The interface may further include a user interface that shows the amount of power that would be programmed into each heater in its respective zone. The user interface can additionally use human intuition by positioning the top heater controls above the cooking target and lower heater control is below the cooking target for each zone as illustrated in FIG. 15. In some embodiments, the interface may indicate the power draw in gradations of red, orange, or yellow colors, or making references to cooking ranges with the low/medium/high settings.

The multispectral heating element approach of the present disclosure operates differently than conventional ovens. Conventional ovens operate by trying to hold a set interior air temperature. These conventional ovens have a simple control, which is the amount of heat to maintain within the oven—the oven can heat up fat, not heat up, or maintain a temperature in-between. Conventional ovens also don't have different heating zones, so the concept of a power budget isn't relevant. In a conventional oven, all or subset of elements are always heated with some pre-determined pattern in order to maintain the most uniform possible interior temperature distribution in the cooking chamber. Maximum power means the entire chamber increases temperature at the fastest rate possible.

While conventional ovens heat a chamber uniformly, the multi-zone cooking approach disclosed herein allows for non-uniform heating—where different food in different zones can experience dramatically different heat. In one embodiment, any of the six heating element in a cooking chamber can take on up to 100% of the power available to the entire oven. This results in the most extreme uneven distribution of heating possible in the chamber.

A chef designing a recipe using the multi-zone cooking of the present disclosure may want to exert maximum control of the heaters to optimize cooking. In various embodiments, the user interface includes a "chef mode" allowing the user to control the individual heaters (e.g., heating components 112 of FIG. 1 or heating/cooling elements 212 of FIG. 2) and/or heating zones if desired. Using the "chef mode," the user is presented with one or more budget indicators for allocating system resources for use in cooking, including multi-zone cooking, such as power budget, current budget, total energy budget, and/or average power budget. For example, in some embodiments any one heater in the cooking chamber can consume up to 100% of the total available power to all heaters at any given step in a heating algorithm (e.g., a time or set of times at which one or more heaters is consuming some or all of the total available system resource, or none of such system resource), and setting that one heater to maximum power means that all other heaters are powered to almost zero power. If the heaters are configured to enable multi-zone cooking, allocation of 100% of the available power to one heater allows the cooking appliance to direct power substantially differently to different cooking zones, allowing the food items in the zone to which the power is being directed to be cooked disproportionately more than the food items in the zone(s) to which power is not being directed, which ultimately enables the cooking appliance to complete the cooking of food items located in different zones at substantially the same time. As another example, setting one heater to 50% of the total available power may mean that the remaining heaters combined can only consume up to the 50% remaining total available power. Referring to FIG. 15, embodiments of screenshots of two different implementations manual heater control are illustrated. In various embodiments, the cooking appliance can automatically adjust the allocation of the system resource to the heaters in accordance with the system resource budget and user multi-zone settings, which settings may include restrictions on the amount of heat that may be directed to a given zone at a given time, and hence to the amount of one or more system resources that may be allocated to one or more heaters.

In various embodiments, the cooking appliance includes a "chef mode" of operation that allows the user to create, modify and/or select a heating algorithm and/or a recipe. The heating algorithm is operable to selectively regulate the allocation of system resources (e.g., power received from power source 260 of FIG. 2), such as power, current, or energy, to one or more of the heating elements (e.g., heating/cooling elements 212 of FIG. 2) within the budget of the system resources that is available to the heating elements collectively, and use this heating algorithm to achieve one or more desired cooking outcomes. The creation and/or modification capabilities of "chef mode" may be instantiated in a user interface that provides to the user an indication of the budget of one or more system resources and/or an indication of the allocation of system resources to one or more heating elements at one or more steps in the heating algorithm, and facilitates user adjustment of the system resources to be delivered to each of the heating elements throughout execution of the recipe.

In various embodiments, a "chef mode" user interface may be configured to include indicators of system resource usage but not power budget usage, but such indicators may nevertheless enable or require the user of "chef mode" to utilize a certain maximum amount of a system resource. In some embodiments, a "chef mode" user interface may require a user that is creating or modifying a recipe in "chef mode" to allocate 100% of a total available current budget to one heater out of a set of two or more heaters at any given step in the heating algorithm, allowing the user to allocate the total budget to different heaters at different steps, but requiring use of the total available current budget in each step. In other embodiments, the "chef mode" user interface may impose the same requirements as set forth in the foregoing sentence, except that the interface will also permit the user to allocate 0% of the available current budget to all of the heaters at any given step in the heating algorithm.

In some embodiments, in lieu of or in addition to indicating the total available system resource budget to a user, the "chef mode" user interface may permit the user to attempt to ostensibly allocate more than the total available system resource budget to one or more heaters at a particular step in the heating algorithm. A computing or processing system with which the user interface communicates may recognize the user's attempt to allocate more than the total available system resource budget during the particular step, calculate an alternative means of achieving the substantially the same results that would obtain if the additional system resources (in excess of the total available budget) were be available, automatically modify the heating algorithm to implement such alternative means, notify the user that the alternative means of achieving the results will be used in lieu of the user-desired means of allocating more than the available system budget, and notify the user of the effect of using the alternative means. For instance, if the user attempts to allocate 100% of the total available power budget to each of two heaters in a given step, the computing or processing system may determine that, to achieve substantially the same desired result, 100% of the total available power budget should be allocated to the first of the two heaters during such step, and 100% of the total available power budget should be allocated to the second of the two heaters during the immediately subsequent step, and the user would be notified via the user interface that the alternative means of achieving the desired will be used in the heating algorithm, and that the ramification of using the alternative means is that the recipe instantiated by the heating algorithm will take a five additional seconds to complete. In such embodiments, the cooking appliance may provide indications to the user concerning the available budget, recipe outcomes and/or automatically adjusts and balances the heating algorithm, and hence the recipe, to stay within the available power budget.

In some embodiments, the interface allows for the selection, creation and/or modification of a heating algorithm and includes a system resource allocation interface for selectively and interactively specifying the delivery of that system resource (i.e. the amount of that system resource to deliver) to each of the heating elements during the execution of the recipe. The "chef mode" interface allows the user to review the steps of a heating algorithm, whether recipe creation is complete or in-process, and the interface may provide an indication of the system resource usage status to the user, including an indication of the total available system resource budget, an indication of the total remaining system resource budget and/or an indication of a the system resource usage by each heater during each step of recipe. In some embodiments, the "chef mode" projects a recipe outcome (e.g. an set of states of food cooked by the cooking appliance using the recipe at the termination of the execution of the recipe, such as states relating to temperature of the food at one or more internal locations, surface color and/or texture of the food, juiciness of the food, and so on) based on the user-configured allocation of system resources throughout the recipe, and provides the user with an indication of the statuses of the system resource as well as an indication of an effect of the user-configured system resource allocation on the recipe outcome. The indication may include a warning, indication of heating algorithm modifications made by the cooking appliance, and/or provide the user with an interface to make further adjustments in response thereto. In some embodiments, the recipe is adjusted in view of the projected recipe outcome, the desired recipe outcome and/or power budget status, and adjustments may include, for example, an adjusted cooking time and/or other recipe adjustments.

In various embodiments, the "chef mode" user interface provides the user with an option to select at least one template of a means to implement a heating algorithm that is operable to selectively regulate the allocation of system resources, and then modify one or more aspects the template. The template may be associated with a full recipe or a set of one or more components a recipe associated with one or more cooking events. Templates may be stored locally on the cooking appliance or downloaded from a server (e.g., a recipe server). After the user has elected a template, the user may edit it by adjusting the allocation of system resource delivery to one or more heaters in one or more steps as described herein.

In various embodiments, the user interface may include a "simulate cook" feature that allows a user to test how the "chef mode" user-generated recipe will cook certain food(s). The user can select the food(s) that the user-generated recipe is to be tested against, and the system will simulate the outcome (e.g. the state(s) of the food at the conclusion of the execution of the recipe), providing information and statistics about the simulated outcome, such as information regarding sear level, distribution of internal temperature, cook time, internal moisture content, etc. The information can be quantitative or qualitative (with respect to the latter, e.g., it could compare the sear to sears obtained via canonical cooking methods, or compare the juiciness to a type of food cooking using a particular and familiar method, e.g. fried chicken). In some embodiments, the system may also simulate the state(s) of the food(s) at one or more points in time during the execution of the recipe, but prior to the conclusion of the execution of the recipe. The system may include a capability (e.g., a user interface) that allows the user to associate the simulated state(s) of the food(s), and the point in time at which the state(s) obtain, with a step in the user-generated recipe, and allow the user to modify the recipe in "chef mode" in light of the simulated state(s).

Referring to FIG. 16, an embodiment of a method 1600 for allocating system resources for operation of the cooking appliance will now be described. The method 1600 may be implemented by the systems disclosed herein (e.g., system 100 of FIG. 1, cooking appliance 200 of FIG. 2), to allocate resources (e.g., power received from power source 260) to a plurality of heating elements (e.g., heating components 112 of FIG. 1, heating/cooling elements 212) during execution of a heating algorithm (e.g., by cooking engine 116 of FIG. 1, cooking engine 270 of FIG. 2). In various embodiments, the user interactions may be facilitated using the user interfaces disclosed herein.

In step 1602, the cooking appliance receives one or more system resources (e.g., power, current, energy), each of the one or more system resources having an associate budget. For example, a cooking appliance may receive electrical power from an electrical outlet, input to the cooking appliance through a power supply (e.g., power source 260 of FIG. 2).

In step 1604, a user interface is provided to facilitate user configured allocation of one or more of the system resources to a plurality of heating elements without exceeding any associate budget for one or more system resources. In various embodiments, the result of the user interaction is a recipe and/or heating algorithm to be executed by the cooking engine to cook one or more food substances. In some embodiments, the user is provided an indication of the associated budget, such as an indication of the available system resource budget remaining and/or an indication of a current system usage during operation of one or more heating elements. In some embodiments, the computing components of the cooking appliance (e.g., controller 220 and memory 230 of FIG. 2) are operable to project a recipe outcome based on user-configured allocation of a budgeted system resource to the plurality of heating elements (e.g., quartz-tungsten-halogen heaters). The indication of the associated budget may include an indication of an effect of the user-configured allocation of the system resource on the recipe outcome. The computing components may also adjust the heating algorithm in view of a projected recipe outcome and/or budgeted system resources. In some embodiments, the indication to the user of budgeted system resources includes an adjusted cooking time and/or other recipe adjustments.

In various embodiments, the computing components are further operable to facilitate user-configured allocation of a system resource to the plurality of heating elements to heat a plurality of zones within a multi-zone cooking chamber. The control components may include logic and circuitry to facilitate automatic allocation of one or more system resources to the plurality of heating elements in accordance with the associated budgets and/or user settings.

The system resources are then applied in step 1606 to the plurality of heating elements to heat one or more food substances within a cooking chamber in accordance with the heating algorithm. For example, the heating elements may comprise (or be controlled by) control components that receive electrical power from an external resource and allocate the received electrical power between the heating elements to implement the heating algorithm.

In step 1608, delivery of the one or more system resources to one or more of the heating elements is regulated such that no more than the associated budget of each of the one or more system resources is delivered to the plurality of heating elements during execution of the heating algorithm. For example, the cooking appliance may be regulate to operate within system power constrains as indicated by the associated resource budget. In various embodiments, the cooking chamber includes a plurality of cooking zones and the heating elements are selectively operable to heat one or more food substances within each of the plurality of cooking zones. In some embodiments, the computing components execute the heating algorithm to cook at least one food substance in the cooking chamber, detect a state change of the at least one food substance, and modify the heating algorithm during the cook to reconfigure the system resources supplied to one or more heating elements in response to the state change and in accordance with the associated budgets for the system resources.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

While some embodiments of the disclosure include processes or methods presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification.

EXAMPLES

1. A cooking system comprising:
a cooking chamber;
a plurality of heating elements arranged within the cooking chamber;
a control system operable to selectively activate one or more of the heating elements in accordance with a recipe, the recipe comprising cooking logic and a heating adjustment algorithm; and
a user interface operable to enable user configuration of the cooking system, including selecting, creating and/or editing the recipe, the cooking logic and/or the heating adjustment algorithm.

2. The cooking system of example 1, further comprising at least one sensor operable to transmit state information to the control system during execution of the recipe.

3. The cooking system of example 2, wherein the sensor comprises a visible light imaging component, an infrared imaging sensor, and/or a temperature sensor.

4. The cooking system of example 1, wherein the control system further comprises communications components facilitating communications with a network server and/or mobile device.

5. The cooking system of example 4, wherein the control system is operable to receive the recipe from the network server, facilitate user selection of a recipe, facilitate user creation of a new recipe, and/or edit the recipe.

6. The cooking system of example 1 wherein the recipe includes a user instruction associated with a cooking state; and wherein the user instruction is displayed to the user after detection of the cooking state.

7. The cooking system of example 6, wherein a cooking state is determine as function of one or more sensor feeds, one or more timers, one or more user signals, and/or any combination thereof.

8. The cooking system of example 1 wherein sensors include a temperature probe inserted into a food substance, a temperature sensor in the cooking chamber, a camera attached within the cooking chamber, and/or any combination thereof.

9. The cooking system of example 1, wherein a user interface is facilitated through a mobile device communicably connected to the cooking system, a button on an external shell of the cooking system, a touchscreen on an external shell of the cooking system, and/or any combination thereof.

10. The cooking system of example 1, wherein the user interface is operable to provide a recipe creation mode allowing a user to define a recipe, including control of heating elements.

11. The cooking system of claim 10, wherein the recipe creation mode includes a simulator for testing a recipe against a known food profile, the simulator operable to provide a visual simulation of a target food and a temperature simulation of the target food; and presenting the simulation via the recipe design interface.

12. The cooking system of example 11, wherein the known food profile specifies how the target food transforms visually in response to ambient or internal temperature change and heat capacity and conductance characteristics of a unit amount of the target food.

13. The cooking system of example 12, wherein the control system is further operable to:
receive a recipe and associated cooking logic from an external device, wherein the cooking logic includes heating logic represented as a state machine;
execute the cooking logic in the cooking appliance in response to a user input, including configuring one or more heating elements of the cooking appliance in accordance with an initial state of the state machine; detecting a state change based on one or more sensor feeds, one or more timers, one or more user signals, or any combination thereof;

and reconfiguring at least one of the heating elements of the cooking appliance in response to the state change according to the state machine.

14. The cooking system of example 13, wherein the control system is further operable to detect placement of food into the cooking appliance, and wherein the cooking logic is executed in response to said food placement.

15. The cooking system of example 14, wherein said detecting is by a camera disposed in the cooking appliance, a weight sensor, a temperature probe connected to the cooking appliance, a mechanical connection sensor of a door of the cooking appliance, or any combination thereof.

16. The cooking system of example 14, wherein the cooking logic includes an exception catching logic that monitors one or more sensor feeds, one or more user signals, one or more timers, or any combination thereof, to determine whether an unexpected event has occurred during said executing of the cooking logic.

17. The cooking system of example 16, further comprising reconfiguring the heating elements based on the exception catching logic to recover from the unexpected event.

18. The cooking system of example 1, wherein the recipe specifies one or more meal kit package identifiers associated therewith, and the method further comprising detecting, via a camera of the cooking appliance, an optical label; and determining whether the optical label corresponds to at least one of the meal kit package identifiers.

19. The cooking system of example 13, wherein the cooking logic specifies one or more cooking logic configuration parameters to retrieve from an operating user; and the method further comprising:
prompting, via an output component or a network interface of the cooking appliance, the operating user to enter the cooking logic configuration parameters; and
receiving, via an input component or the network interface, user input associated with the cooking logic configuration parameters.

20. The cooking system of example 13, wherein the recipe specifies two or more operation modes and two or more cooking logic modes associated with the operation modes; wherein the operation modes include a low stress mode and a high speed mode, wherein the high speed mode requires an operating user of the cooking appliance to extract a target food from the cooking appliance at a specific time determined by the cooking logic.

21. The cooking system of example 1, further comprising: recording data from one or more sensor feeds, one or more timers, one or more user signals, or any combination thereof, during said executing of the cooking logic; and sending the recorded data to a server system for analysis.

22. The cooking system of example 24, further comprising: prompting user feedback after said executing of the cooking logic; and sending the user feedback with the recorded data to the server system for analysis.

23. The cooking system of example 1, wherein the heating elements are quartz tube heating elements.

24. The cooking system of example 1, further comprising a user display disposed on an exterior side of the chamber and/or a user mobile device; and wherein the display is operable to display a real-time image and/or video of the interior of the chamber captured via the camera.

25. The cooking system of example 1, wherein the heating elements include one or more frequency-controllable filament assemblies at one or more locations in the chamber; and wherein each of the one or more frequency-controllable filament assemblies is capable of independently adjusting an emission frequency and/or an emission power.

26. The cooking system of example 1, further comprising a computing device operable to analyze an image from the camera to determine cooking status and preparation outcomes.

27. The cooking system of example 1, wherein the computing device is coupled to a memory; and wherein the computing device is operable to select a heating recipe from a heating recipe library stored in memory based on received recipe information associated with an external event.

28. The cooking system of example 1, wherein the computing device is operable to execute a heating configuration schedule by controlling the heating elements according to the heating recipe.

29. The cooking system of example 1, further comprising a display and an input component; wherein the computing device is operable to display the heating recipe for confirmation; and wherein the input component is operable to receive the confirmation when the heating recipe is displayed.

30. A method comprising:
executing a recipe on a cooking appliance to cook a food substance, the cooking appliance comprising a cooking chamber, a plurality of heating elements disposed within the cooking chamber, and a control system operable to selectively activate each of the heating elements in accordance with the recipe;
providing an indication to a user that execution of the recipe has stopped;
receiving, from the user, a corrective action including selective activation of one or more heating elements; and
executing the corrective action to further cook the food.

31. The method of example 30, further comprising transmitting an image and/or video of the food substance to a user interface.

32. The method of example 30, further comprising stopping execution of the recipe when execution of the recipe has completed, after detecting a certain event, and/or after receiving, through a user interface, user intervention to pause or terminate the recipe execution.

33. The method of example 30, further comprising transmitting sensor data to the user, wherein the sensor data includes temperature data from a temperature probe and/or image data from an in-oven camera.

34. The method of example 30 wherein the cooking appliance executes the corrective action in accordance with user-specified preferences regarding the food substance being cooked, community preferences regarding food substance being cooked, user or community preferences generally, data regarding user or community tendency to make certain errors, and/or data regarding how a specific ingredient tends to cook.

35. The method of example 30 wherein the user has an option to repeat same or different corrective action until desired outcome is achieved.

36. The method of example 30 further comprising reconfiguring one or more heating elements to apply the corrective action to further cook the food substance.

37. An apparatus comprising:
a cooking chamber;
a plurality of heating elements arranged within the cooking chamber;
a control system operable to selectively activate each of the plurality of heating elements to cook a food substance in accordance with a recipe, wherein the recipe includes cooking logic and/or heating algorithms for execution by the control system, and an identification of ingredients, preparation instructions, cooking states, cooking temperature, wavelength and/or cooking time; and a recipe generation interface operable to select and modify the recipe in accordance with user input.

38. The apparatus of example 37 wherein the recipe generation interface is further operable to analyze the user modified recipe and notify the user of expected cooking results.

39. The apparatus of example 38, wherein the recipe generation interface is further operable to annotate the analyzed recipe to indicate information concerning respective phases of the cook.

40. The apparatus of example 37, wherein the recipe generation interface is operable to copy the selected recipe to generate a new recipe for modification by the user.

41. The apparatus of example 37, wherein the recipe is associated with a meal kit, including a collection of ingredients for the recipe; and wherein the user modifies the selected recipe by changing, adding and/or subtracting at least one ingredient.

42. The apparatus of example 37, wherein the recipe generation interface is operable to adapt the cooking logic and/or heating algorithm to user implemented changes to the recipe.

43. The apparatus of example 42, wherein the recipe generation interface is operable to adjust the cooking zone in which the food substance is placed.

43. The apparatus of example 37, wherein the recipe generation interface is operable to download a copy of the recipe from a network device for modification by user.

44. The apparatus of example 37, wherein the recipe generation interface is operable to provide an interface facilitating user modification of the heating algorithm to selectively regulate one or more of the heating elements to achieve a desired cooking result.

45. The apparatus of example 44, wherein the recipe generation interface is operable to provide an indication of the power used by each heating element at one or more time slices during execution of the recipe.

46. The apparatus of example 37, wherein the recipe is a multizone recipe selectively operating each of the heating elements within the cooking chamber to separately cook a plurality of food substances.

47. The apparatus of example 37, wherein recipe generation interface is operable to combine and facilitate modification of two or more recipes, cooking algorithms and heating algorithms to perform various cooking functions within the recipe.

48. The apparatus of example 37, wherein the recipe includes error detection logic operable to define proper probe placement, tray height, food preparation and/or food placement and detect errors during execution of the recipe.

49. The apparatus of example 37, wherein the recipe generation interface is further operable to compute a simulation of the recipe against a known food profile, the simulation including a visual simulation of a target food and a temperature simulation of the target food; and presenting the simulation via the recipe generation interface.

50. The apparatus of example 49, wherein the recipe generation interface is further operable to provide access to one or more heating logic templates defining a heating logic sequence.

51. A cooking system comprising:

a cooking chamber;

a plurality of heating elements arranged within the cooking chamber;

a control system operable to selectively activate one or more of the heating elements in accordance with a recipe, the recipe comprising cooking logic for cooking a food substance; and error detection logic operable detect one or more errors in execution of the recipe.

52. The cooking system of example 51, wherein the error detection logic is further operable to define proper probe placement, tray height, food preparation and/or food placement and detect errors during execution of the recipe.

53. The cooking system of example 51, further comprising a camera operable to image the food substance during execution of the recipe, and wherein the error detection logic is operable to detect errors by analyzing images received from the camera.

54. The cooking system of example 51, wherein error detection logic is operable to detect tray height and generate an error if a minimum or defined tray height is not detected.

55. The cooking system of example 54, further comprising a camera disposed within the cooking chamber to image a portion of the cooking chamber; wherein image data is analyzed to detect error conditions.

56. The cooking system of example 51, wherein the error detection logic is further operable to notify the user of corrective action to fix the detected error.

57. The cooking system of example 56, wherein the error detection logic is operable to detect whether an error has been corrected.

58. The cooking system of example 56, wherein execution of a recipe is paused until the detected error has been addressed by the user.

59. The cooking system of example 58, wherein the user may manually override a detected error condition and continue execution of the recipe.

60. The apparatus of example 51, wherein the control system is operable to automatically adapt the recipe to correct for certain detected errors.

61. A system comprising:

a configurable cooking apparatus comprising a cooking chamber, a plurality of heating elements arranged within the cooking chamber, and a control system operable to selectively activate each of the plurality of heating elements in accordance with a recipe;

a user interface providing user interaction with the configurable cooking apparatus, wherein the user interface includes user specific information and configurations and/or activity;

an association logic to associate devices in the system; and prioritization means for prioritizing recipes on devices associated with the user.

62. The system of example 61, wherein association logic includes user name and password, stored on a network server.

63. The system of example 62, wherein the network server automatically downloads user recipe information to the configurable cooking apparatus based on ingredients purchased, meal kit ordered, online browsing history and/or user preferences.

64. The system of example 63, wherein the interface devices includes computer, phone, tablet, or wearable device.

65. The system of example 63, wherein user interface includes touchscreen, oven, phone.

66. The system of example 63, wherein a recipe of interest includes favorites and/or preferences and/or inferred from browsing activity.

67. The system of example 63, wherein most interesting item is the meal kit that's been ordered by the user via oven, computer, phone, etc.

68. The system of example 63, wherein timing of prioritization onto interface is synced with shipping/delivery data.

69. The system of example 61, further comprising: compiling an error history based on the detected user errors; modifying user recipes in accordance with expected user errors; and modifying global recipes in accordance with expected errors generated by a plurality of users according to the state change history.

70. A cooking apparatus comprising:
a cooking chamber;
a plurality of heating elements arranged within the cooking chamber; and
a control system operable to selectively activate each of the plurality of heating elements in accordance with a recipe;
wherein the control system is operable to determine an end of a cook, collect data associated with cook, analyze collected data and compare to expected recipe outcomes, and adjust the recipe in accordance with the analysis.

71. The cooking apparatus of example 70, wherein the recipe is adjusted for the user and stored on the cooking apparatus and/or transmitted to a recipe server.

72. The cooking apparatus of example 70, wherein the recipe is adjusted globally at a recipe server and wherein recipe changes are provided to other configurable cooking devices.

73. The cooking apparatus of example 70, wherein the expected results are determined based on community data regarding outcomes of same and similar cooks.

74. The cooking apparatus of example 70, wherein the user is informed about user errors detected during the cook.

75. The cooking apparatus of example 70, wherein collected data includes user feedback on the results of the cook.

76. The cooking apparatus of example 70, wherein the collected data includes cooking states, wherein cooking states comprises starting and ending temps, surface qualities and heights, temperatures and surface qualities, amount of time the cook took, and/or amount of time it took to hit certain milestones such as temps and surface qualities and heights within the cook.

77. The cooking apparatus of example 70, wherein after cook is complete, presenting a user interface to solicit user feedback.

78. The cooking apparatus of example 77, wherein user feedback can be entered at a time after the cook.

79. The cooking apparatus of example 70, wherein the control system is operable to store data in a database regarding types and frequency of user errors, and wherein the recipe is adjusted to account for at least one expected user error.

80. The cooking appliance of example 70, wherein user interactions include audio interactions.

81. The cooking appliance of example 70, wherein at least one error is detected using machine vision.

82. The cooking appliance of example 70, wherein the database stores information regarding types and frequency of errors and the recipe is adjusted based on the stored information.

83. The cooking appliance of example 70, wherein the control system is operable to analyze a likelihood that a particular error led to poor feedback or poor outcome, in light of the database information, user feedback and/or the data collected during the cook.

84. The cooking appliance of example 70, wherein the control system is operable to present the user with a list of errors detected during the cook, and wherein the list is ranked from errors that are more likely to affect the cooking result to errors are less likely to affect the cooking results.

85. The cooking appliance of example 70, wherein the control system is operable to track user behavior across multiple cooks, analyze collected data, user feedback and control system feedback to user regarding prior errors, and present the user with updated instructions to correct user errors to improve cooking results.

86. The cooking appliance of example 70, wherein the control system is further operable to prompt user feedback after said executing of the cooking recipe, and send the user feedback with the recorded data to the server system for analysis.

What is claimed is:
1. A cooking appliance comprising:
a cooking chamber;
a plurality of heating elements configured to heat one or more food substances within the cooking chamber, wherein each of the plurality of heating elements is configured to consume up to an allocated power budget;
control components configured to selectively regulate delivery of one or more system resources to one or more of the heating elements;
a user interface configured to allocate the one or more system resources to one or more of the plurality of heating elements within a budget associated with each allocated system resource; and
computing components comprising logic to ensure the control components deliver no more than the associated budget for each of the one or more system resources during execution of a recipe;
wherein the control components are further configured to drive the heating elements with a maximum power density available within the allocated power budget to achieve a desired cooking result, by sequentially or simultaneously powering one or more of the heating elements to spatially cover different regions of the one or more food substances in accordance with a heating algorithm,
wherein, according to the heating algorithm, each heating element of at least a subset of the heating elements is configured to consume a respective portion of the allocated power budget up to the allocated power budget such that a sum of the respective portions of the allocated budget consumed by the subset of the heating elements does not exceed the allocated power budget; and
wherein the interface facilitates user control of the heating elements and associated consumption of a system resource by receiving user input associated with an allocation of power to one or more of the plurality of heating elements to achieve the desired cooking result, and wherein the computing components are operable to adjust the allocation when the user allocation would cause power consumed by the plurality of heating elements collectively to exceed the allocated power budget such that the adjusted allocation of power does not cause power consumed by the plurality of heating elements collectively to exceed the allocated power budget and substantially achieves the desired cooking result.

2. The cooking appliance of claim 1, further comprising a camera configured to capture an image of an interior of the cooking chamber, wherein the computing components are further configured to dynamically adjust the heating algorithm based on the image, wherein one of the one or more system resources is power, current or energy.

3. The cooking appliance of claim 2, wherein the one or more system resources comprise power and the control components comprise power control components; and wherein the power control components are configured to receive electrical power from an external resource and allocate the received electrical power between the plurality of heating elements to implement the heating algorithm, the power control components comprise power control logic for tracking power usage for each of the heating elements and selecting one of the plurality of heating elements for activation.

4. The cooking appliance of claim 2, wherein the one or more system resources comprise power and the control components are power control components; and wherein the power control components are configured to regulate received electrical power in accordance with system power constraints as indicated by the associated budget for the resource.

5. The cooking appliance of claim 1, wherein the cooking chamber includes a plurality of cooking zones; wherein the heating elements are selectively configured to heat one or more food substances within each of the plurality of cooking zones; and wherein the heating algorithm is configured to distribute the associated budget for one or more system resources across multiple heating elements to selectively heat one or more food substances within each of a plurality of cooking zones, without exceeding the associated budget.

6. The cooking appliance of claim 1, wherein the user interface provides an indication of the budget associated with each of the allocated system resources.

7. The cooking appliance of claim 6, wherein the indication to a user of the budget associated with each of the allocated system resources comprises an indication of a remaining system resource budget and/or an indication of a current system usage during operation of one or more of the heating elements; wherein the computing components are configured to project a recipe outcome based on user-configured allocation of system resources to the plurality of heating elements; and wherein the indication to the user of the budget associated with each of the allocated system resources includes an indication of an effect of the user-configured allocation of the system resource on the recipe outcome.

8. The cooking appliance of claim 7, wherein the computing components are further configured to adjust the heating algorithm in view of a projected recipe outcome and/or budgeted system resource status; wherein the indication to the user includes an adjusted cooking time and/or other recipe adjustments; and wherein the computing components are further configured to facilitate user-configured allocation of the one or more system resource to the plurality of heating elements to heat a plurality of zones within a multi-zone cooking chamber.

9. The cooking appliance of claim 1, wherein the user interface does not provide an indication to the user of the budget associated with each allocated system resource.

10. The cooking appliance of claim 1, wherein the control components include logic and circuitry to facilitate automatic allocation of the one or more system resources to the plurality of heating elements in accordance with the associated budget for one or more system resource budget and/or user settings.

11. The cooking appliance of claim 1, wherein the heating elements comprise quartz-tungsten-halogen heaters.

12. A cooking appliance comprising:
a cooking chamber;
a plurality of heating elements configured to heat one or more food substances within the cooking chamber, wherein each of the plurality of heating elements is configured to consume up to an allocated power budget;
control components configured to selectively regulate delivery of one or more system resources to one or more of the heating elements;
a user interface configured to allocate the one or more system resources to one or more of the plurality of heating elements within a budget associated with each allocated system resource; and
computing components comprising logic to ensure the control components deliver no more than the associated budget for each of the one or more system resources during execution of a recipe;
wherein the control components are further configured to drive the heating elements with a maximum power density available within the allocated power budget to achieve a desired cooking result, by sequentially or simultaneously powering one or more of the heating elements to spatially cover different regions of the one or more food substances in accordance with a heating algorithm,
wherein, according to the heating algorithm, each heating element of at least a subset of the heating elements is configured to consume a respective portion of the allocated power budget up to the allocated power budget such that a sum of the respective portions of the allocated budget consumed by the subset of the heating elements does not exceed the allocated power budget,
wherein the computing components are further configured to execute the heating algorithm to cook at least one food substance in the cooking chamber, detect a state change of the at least one food substance based on sensor data from a camera, and modify the heating algorithm to reconfigure the one or more system resources supplied to one or more heating elements in response to the state change and in accordance with the associated budgets for the system resources.

13. The cooking appliance of claim 12, wherein the interface facilitates user control of the heating elements and associated consumption of a system resource by receiving user input associated with an allocation of power to one or more of the plurality of heating elements to achieve the desired cooking result, and wherein the computing components are operable to adjust the allocation when the allocation would cause power consumed by the plurality of heating elements collectively to exceed the allocated power budget such that the adjusted allocation of power does not cause power consumed by the plurality of heating elements collectively to exceed the allocated power budget and substantially achieves the desired cooking result.

14. A method for operating the cooking appliance of claim 1, the method comprising:
facilitating, via the user interface, user allocation of the one or more system resources to the one or more of the plurality of heating elements without exceeding the budget associated with each allocated system resource;
selectively regulating, by the control components, delivery of the one or more system resources to the one or more of the heating elements such that no more than the associated budget of each of the one or more system resources is delivered; and delivering, by the control components, the one or more system resources to the one or more of the plurality of heating elements to heat the one or more food substances within the cooking chamber;

driving, by the control components, the plurality of heating elements with a maximum power density available within the allocated power budget to achieve the desired cooking result, by sequentially or simultaneously powering the one or more of the heating elements to spatially cover different regions of the one or more food substances in accordance with the heating algorithm;

heating, by the plurality of heating elements, the one or more food substances within the cooking chamber, wherein each of the plurality of heating elements consumes up to the allocated power budget, wherein, according to the heating algorithm, each heating element of at least the subset of the heating elements consumes the respective portion of the allocated power budget up to the allocated power budget such that the sum of the respective portions of the allocated budget consumed by the subset of the heating elements does not exceed the allocated power budget; and facilitating user control of the heating elements and associated consumption of a system resource by:
  receiving, via the user interface, user input associated with the allocation of power to one or more of the plurality of heating elements to achieve the desired cooking result; and
  adjusting, via the control components, the allocation when the user allocation would cause power consumed by the plurality of heating elements collectively to exceed the allocated power budget such that the adjusted allocation of power does not cause power consumed by the plurality of heating elements collectively to exceed the allocated power budget and substantially achieve the desired cooking result.

15. The method of claim 14, wherein one of the one or more system resources is power, current or energy.

16. The method of claim 15, wherein one of the one or more system resources is power; wherein the delivering the one or more system resources to the one or more of the plurality of heating elements comprises operating power control components to receive electrical power from an external resource and allocate the received electrical power between the plurality of heating elements to implement the heating algorithm; and wherein the power control components comprise power control logic for tracking power usage for each of the heating elements and selecting one of the plurality of heating elements for activation.

17. The method of claim 15, wherein one of the one or more system resources is power; and wherein the delivering the one or more system resources to the one or more of the plurality of heating elements comprises operating power control components to regulate received electrical power in accordance with system power constraints as indicated by the associated budget.

18. The method of claim 14, wherein the cooking chamber includes a plurality of cooking zones; wherein the heating elements are selectively operable to heat one or more food substances within each of the plurality of cooking zones; and wherein the heating algorithm is operable to distribute the budget associated with each allocated system resource across multiple heating elements to selectively heat one or more food substances within each of a plurality of cooking zones, without exceeding the budget.

19. The method of claim 14, wherein the user interface provides an indication to the user of the budget associated with each allocated system resource; and
  wherein the indication to the user of the budget associated with each allocated system resource comprises an indication of a remaining system resource budget and/or an indication of a current system usage during operation of one or more of the heating elements.

20. The method of claim 19, wherein the computing components are operable to project a recipe outcome based on user-configured allocation of a budgeted system resource to the plurality of heating elements; and wherein the indication of the associated budget of one or more system resource includes an indication of an effect of the user-configured allocation of the system resource on the recipe outcome.

21. The method of claim 20, wherein the computing components are further operable to adjust the heating algorithm in view of a projected recipe outcome and/or budgeted system resource status; wherein the indication includes an adjusted cooking time and/or other recipe adjustments; and wherein the computing components are further operable to facilitate user-configured allocation of a system resource to the plurality of heating elements to heat a plurality of zones within a multi-zone cooking chamber.

22. The method of claim 14, wherein the user interface does not provide an indication to the user of the budget associated with each allocated system resource.

23. The method of claim 14, wherein the user interface facilitates user control of the heating elements and associated consumption of a system resource.

24. The method of claim 14, wherein the control components include logic and circuitry to facilitate automatic allocation of one or more system resources to the plurality of heating elements in accordance with the associated budget and/or user settings.

25. The method of claim 14, wherein the heating elements comprise quartz-tungsten-halogen heaters.

26. The method of claim 14, wherein the computing components are further operable to execute a heating algorithm to cook at least one food substance in the cooking chamber, detect a state change of the at least one food substance, and modify the heating algorithm to reconfigure the system resources supplied to one or more heating elements in response to the state change and in accordance with the associated budgets for the system resources.

* * * * *